US011010424B2

(12) United States Patent
Itoh et al.

(10) Patent No.: US 11,010,424 B2
(45) Date of Patent: May 18, 2021

(54) INFORMATION PROCESSING SYSTEM AND INFORMATION PROCESSING METHOD

(71) Applicants: Atsushi Itoh, Kanagawa (JP); Hidenobu Kishi, Kanagawa (JP); Kunikazu Okajima, Kanagawa (JP); Kohichi Sakamoto, Tokyo (JP)

(72) Inventors: Atsushi Itoh, Kanagawa (JP); Hidenobu Kishi, Kanagawa (JP); Kunikazu Okajima, Kanagawa (JP); Kohichi Sakamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 931 days.

(21) Appl. No.: 15/410,301

(22) Filed: Jan. 19, 2017

(65) Prior Publication Data
US 2017/0206224 A1 Jul. 20, 2017

(30) Foreign Application Priority Data

Jan. 20, 2016 (JP) .............................. JP2016-008764
Feb. 15, 2016 (JP) .............................. JP2016-026436

(51) Int. Cl.
*G06F 17/00* (2019.01)
*G06F 7/00* (2006.01)
(Continued)

(52) U.S. Cl.
CPC ...... *G06F 16/5866* (2019.01); *G06F 16/9535* (2019.01); *G06Q 10/10* (2013.01)

(58) Field of Classification Search
CPC .. G06F 16/5866; G06F 16/9535; G06Q 10/10
(Continued)

(56) References Cited

U.S. PATENT DOCUMENTS 8,566,712 B1 * 10/2013 Varian ................. G06F 16/9535
715/273
9,977,793 B2 5/2018 Ikeda
(Continued)

FOREIGN PATENT DOCUMENTS

JP    2002-183214 A    6/2002
JP    2009-225268      10/2009
(Continued)

OTHER PUBLICATIONS

Extended European Search Report dated Jun. 8, 2017 in European Patent Application No. 17152136.2.
(Continued)

*Primary Examiner* — Pavan Mamillapalli
(74) *Attorney, Agent, or Firm* — Oblon, McClelland, Maier & Neustadt, L.L.P.

(57) ABSTRACT

An information processing system includes an image search system and a customer-side system. The image search system includes a module distributer and a searcher. The module distributer is configured to distribute a search module and module identification information to the customer-side system while associating the search module and module identification information with each other. The search module is used for causing a terminal device to transmit the search request; the module identification information is used for identifying the search module. The searcher is configured to, as a result of causing the search module to run on the terminal device, execute the searching of the databases in accordance with the module identification information. The module distributer distributes, to the customer-side system, the search modules associated with different pieces of module identification information.

15 Claims, 49 Drawing Sheets

(51) Int. Cl.
*G06F 16/58* (2019.01)
*G06F 16/9535* (2019.01)
*G06Q 10/10* (2012.01)

(58) Field of Classification Search
USPC .......................................................... 707/706
See application file for complete search history.

(56) References Cited

U.S. PATENT DOCUMENTS

| | | | |
|---|---|---|---|
| 2005/0020318 A1* | 1/2005 | Yomoda | H04M 1/7243 |
| | | | 455/566 |
| 2007/0160294 A1* | 7/2007 | Asano | G06K 9/72 |
| | | | 382/190 |
| 2007/0172155 A1* | 7/2007 | Guckenberger | G06F 16/583 |
| | | | 382/305 |
| 2011/0099251 A1* | 4/2011 | Tsukada | G06F 16/958 |
| | | | 709/219 |
| 2011/0282906 A1 | 11/2011 | Wong | |
| 2012/0110568 A1* | 5/2012 | Abel | G06F 8/61 |
| | | | 717/178 |
| 2014/0006387 A1 | 1/2014 | Kishi et al. | |
| 2014/0006435 A1 | 1/2014 | Kishi et al. | |
| 2014/0278997 A1* | 9/2014 | Kishi | G06Q 30/0258 |
| | | | 705/14.56 |
| 2014/0362235 A1 | 12/2014 | Kishi et al. | |
| 2015/0016675 A1 | 1/2015 | Kishi | |
| 2015/0381630 A1 | 12/2015 | Kishi et al. | |
| 2016/0034497 A1* | 2/2016 | Ikeda | G06F 16/532 |
| | | | 707/741 |
| 2016/0140704 A1 | 5/2016 | Itoh et al. | |
| 2016/0140715 A1 | 5/2016 | Wakita et al. | |
| 2016/0154827 A1 | 6/2016 | Kishi | |
| 2016/0321303 A1 | 11/2016 | Kishi et al. | |
| 2016/0364415 A1 | 12/2016 | Itoh et al. | |
| 2017/0052980 A1* | 2/2017 | Itoh | G06F 16/51 |

FOREIGN PATENT DOCUMENTS

| | | |
|---|---|---|
| JP | 2014-010722 | 1/2014 |
| JP | 2014-010723 | 1/2014 |
| JP | 2014-238742 | 12/2014 |
| JP | 2014-238815 | 12/2014 |
| JP | 2015-018405 | 1/2015 |
| JP | 2015-038717 | 2/2015 |
| JP | 2016-012207 | 1/2016 |
| JP | 2016-095787 | 5/2016 |
| JP | 2016-095790 | 5/2016 |
| JP | 2017-004380 | 1/2017 |
| JP | 2017-037437 | 2/2017 |
| WO | WO 2011/143065 A1 | 11/2011 |

OTHER PUBLICATIONS

Eva Hörster, et al., "Image Retrieval on Large-Scale Image Databases", CIVR, XP002613833, Jul. 9-11, 2007, pp. 17-24.

Japanese Office Action dated Dec. 17, 2019 in Patent Application No. 2016-026436, 3 pages.

Japanese Office Action dated Dec. 24, 2019 in Patent Application No. 2016-008764, 2 pages.

\* cited by examiner

FIG.18

| CLIENT REGISTRATION/EDIT | |
|---|---|
| CLIENT NAME: | ▢ ~5101 |
| MAX. NO. OF PAGES USABLE: | 25 ▲▼ PAGES ←~5102 |
| E-MAIL: | ▢ ~5103 |
| CLIENT ID: | ▢ ~5104 |
| PASSWORD: | ▢ ~5105 |
| | ISSUE INITIAL PASSWORD ~5106 |
| NOTES: | ▢ ~5107 |
| MODULE ID: | CAS736901<br>CAS005713<br>CAS118285<br>CAS000001<br>CAS794011 ~5108 |

510

OK ~5109    CANCEL ~5110

| CAMPAIGN LIST | | | | | | | | LOGIN USER: user_2222 |
|---|---|---|---|---|---|---|---|---|
| REGISTER NEW | EDIT | DELETE | DISCLOSURE SETTING | | | | | |
| SEARCH KEY | CAMPAIGN NAME ▼ | ENTER SEARCH KEYWORD | | SEARCH | CLEAR | | | |
| CAMPAIGN NAME | CLIENT NAME | CLIENT ID | NO. OF PAGES DISCLOSED | NO. OF PAGES USED | DATE OF LAST UPDATE | STATE | MODULE ID | NOTES |
| PROJECT A | ABC | 0010 | 5 | 10 | 2015/8/3 | PUBLIC | CAS736901 | |
| PROJECT B | DEF | 0123 | 15 | 20 | 2015/8/4 | PRIVATE | DBS847012 | |
| SEMINAR C | GHI | 1357 | 12 | 15 | 2015/8/10 | PUBLIC | ECW958123 | |

END

FIG.33
(a)
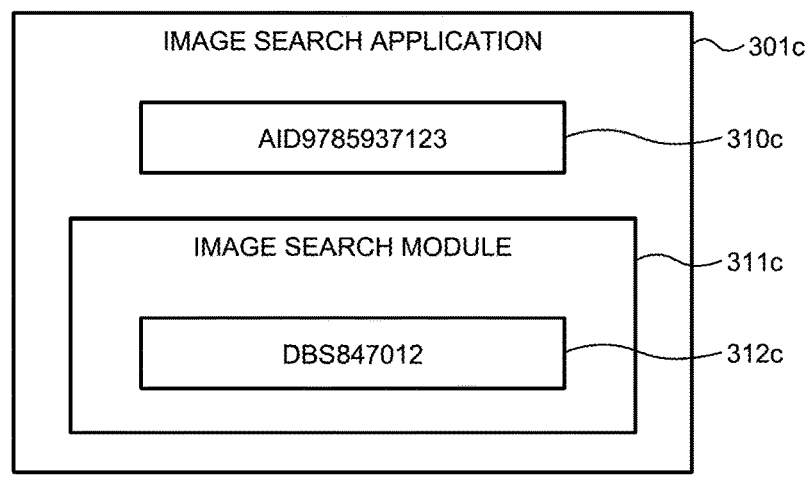
(b)
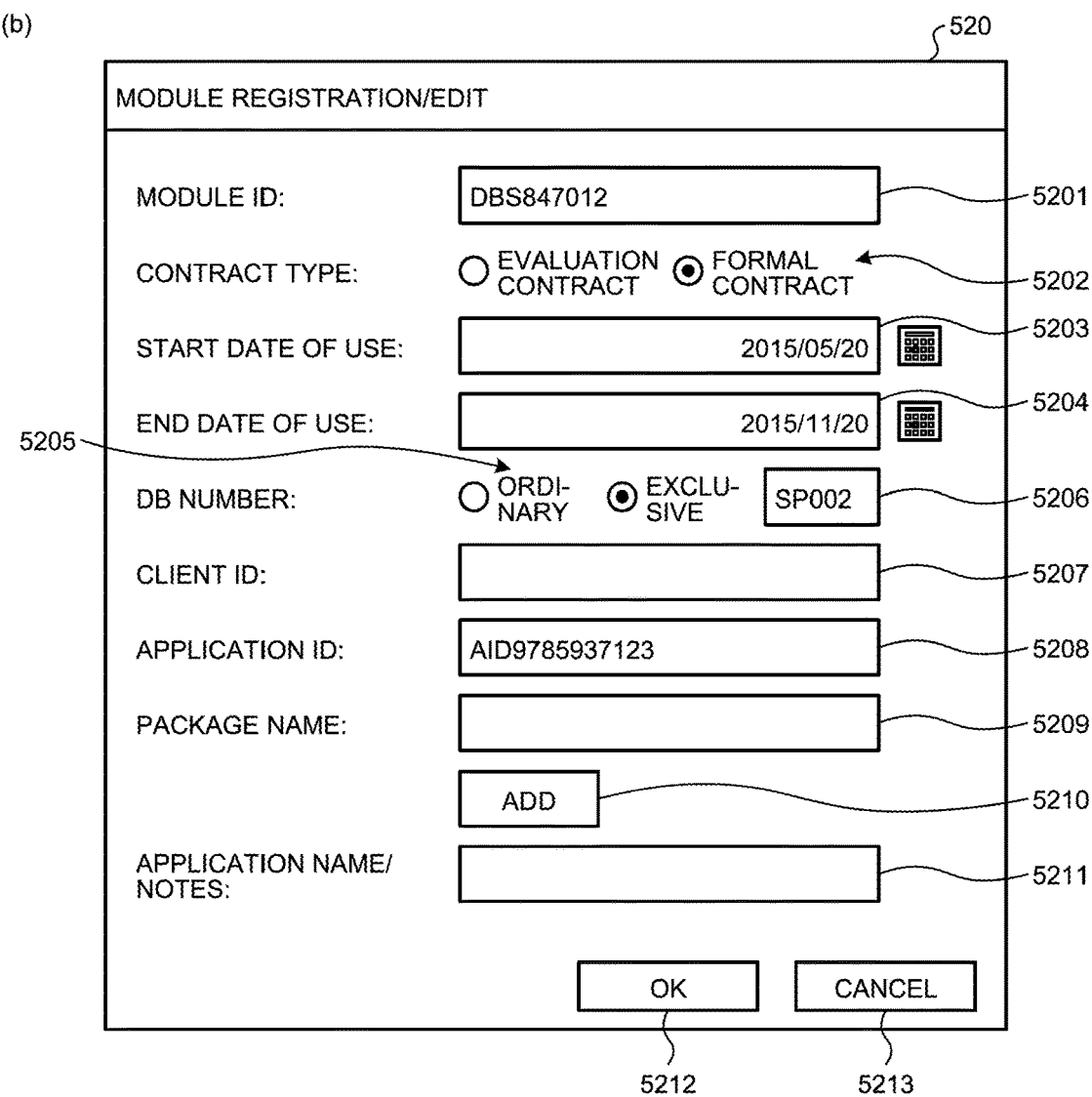

FIG.34
(a) 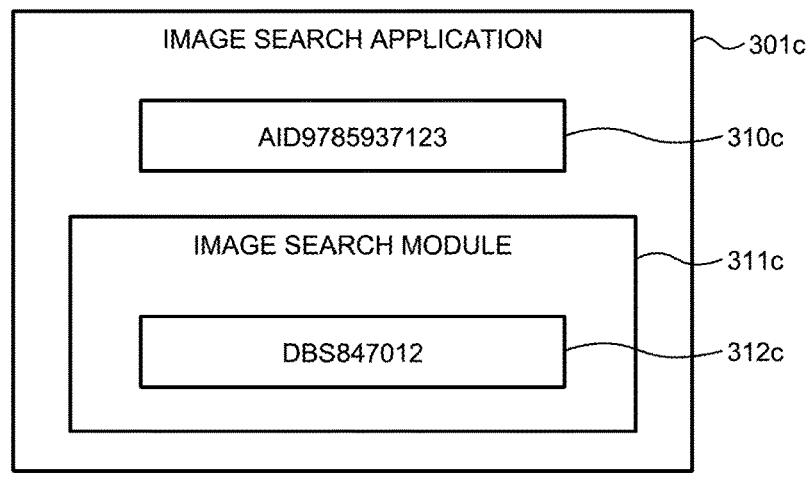
(b) 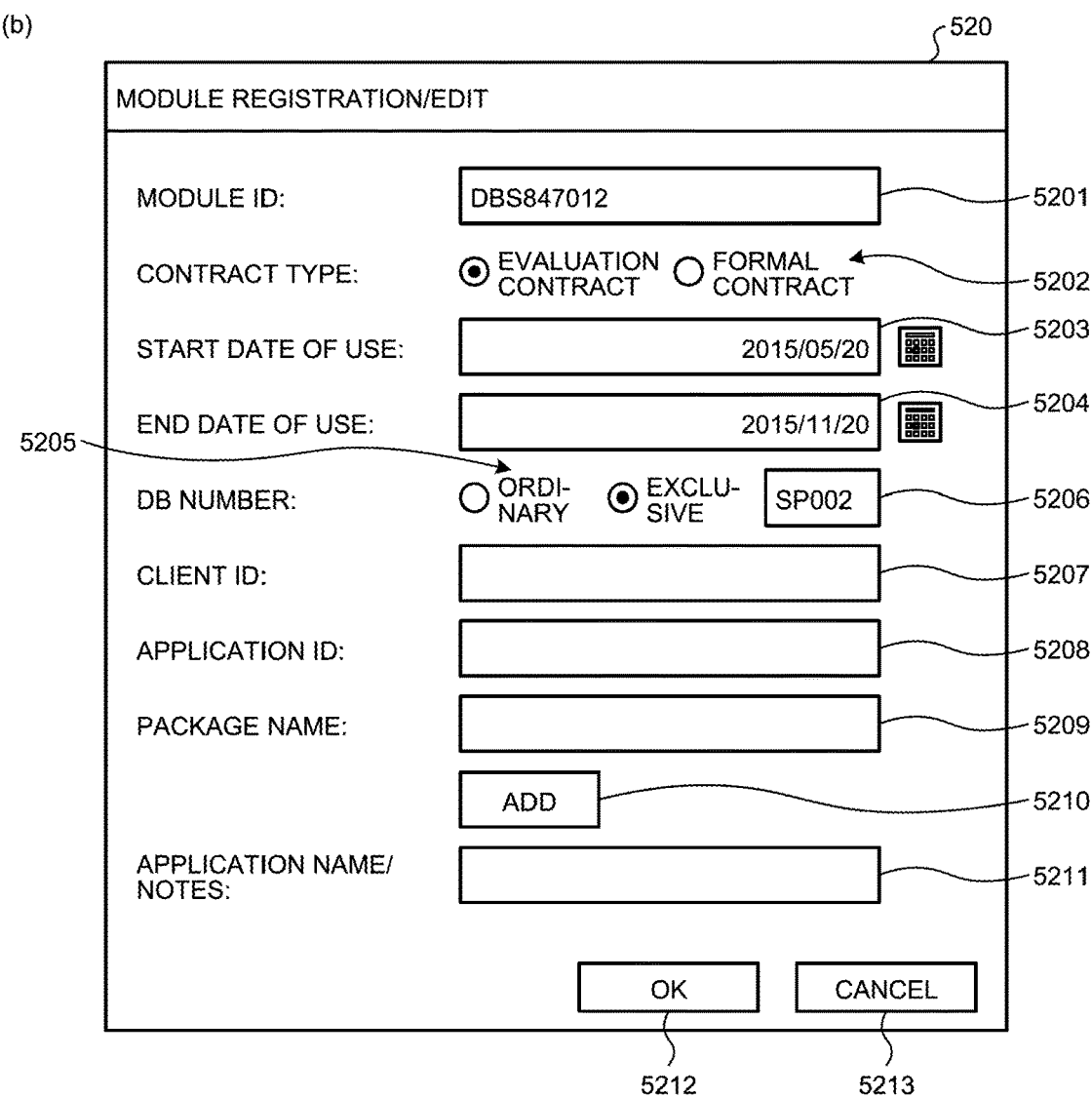

FIG.35
(a)
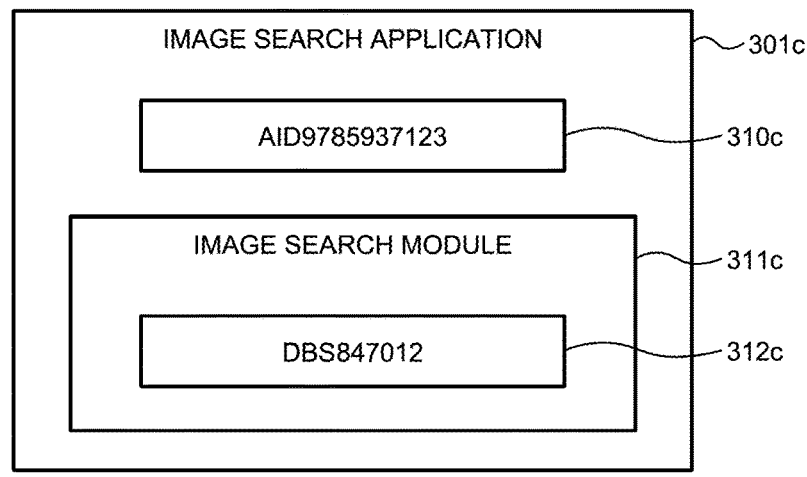
(b)
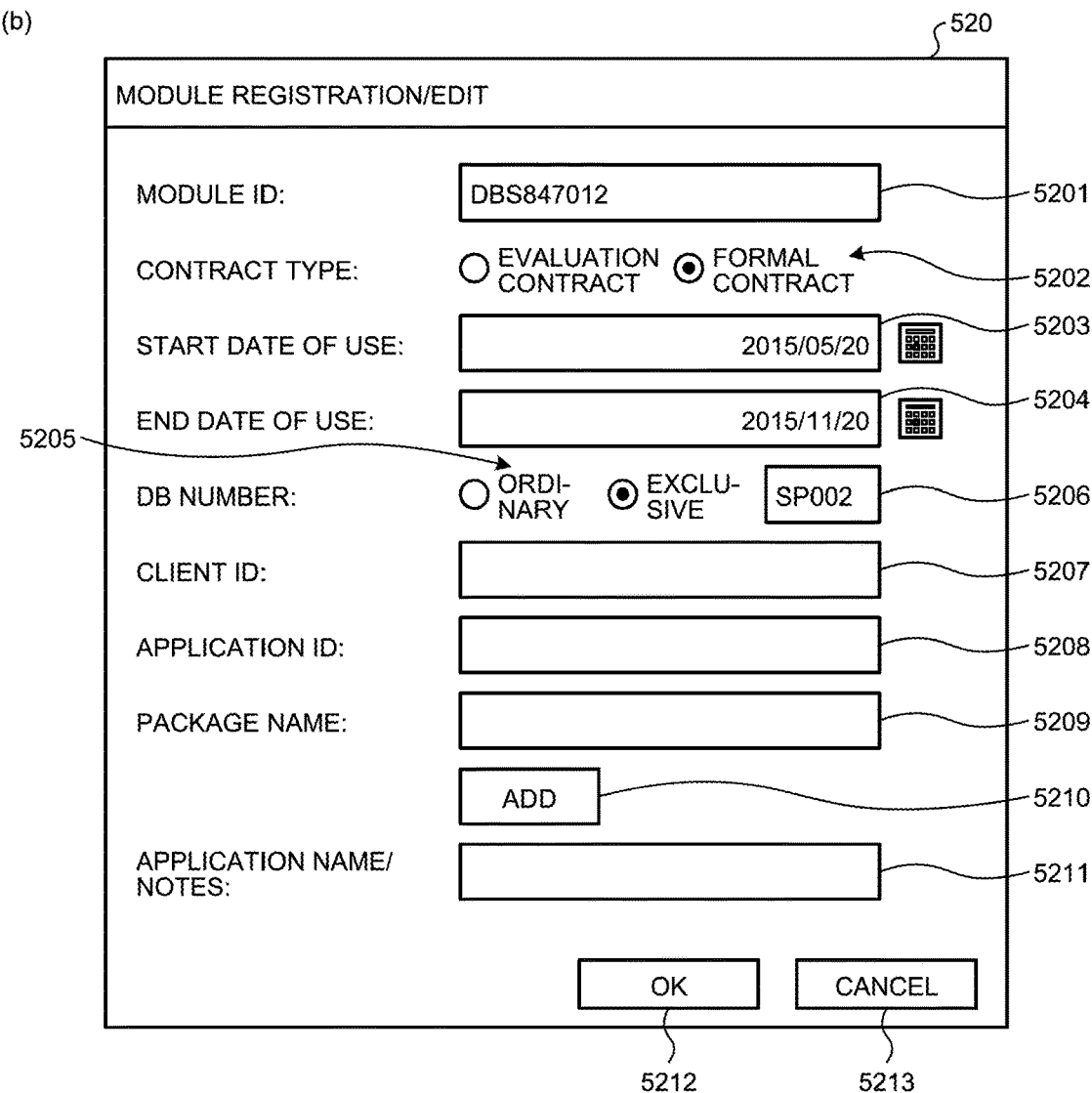

FIG.41
(a) 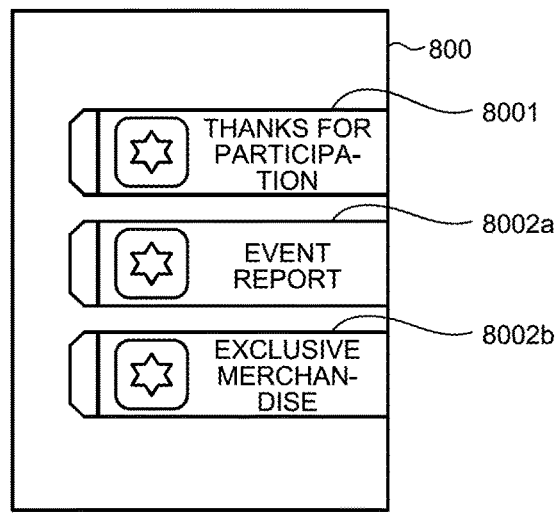
(b) 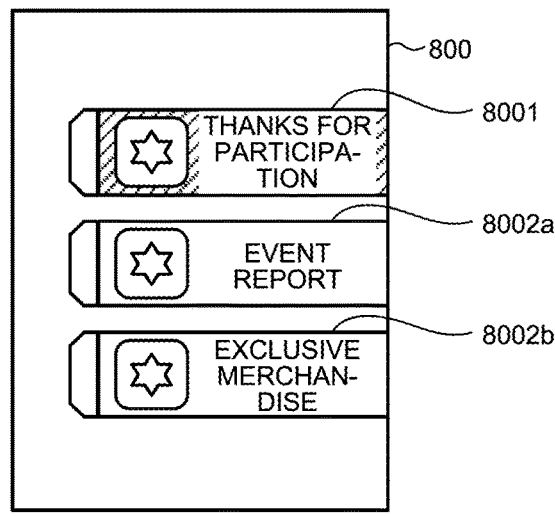
(c) 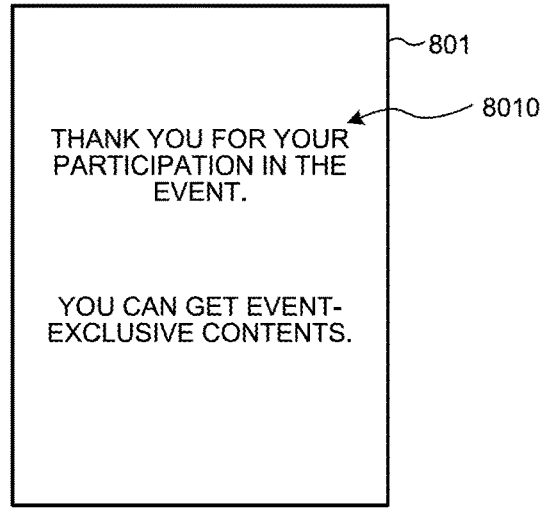

FIG.42
(a) 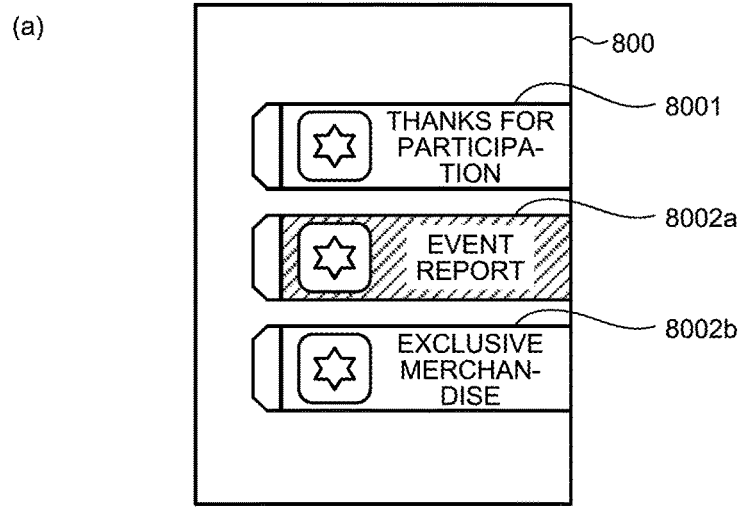
(b) 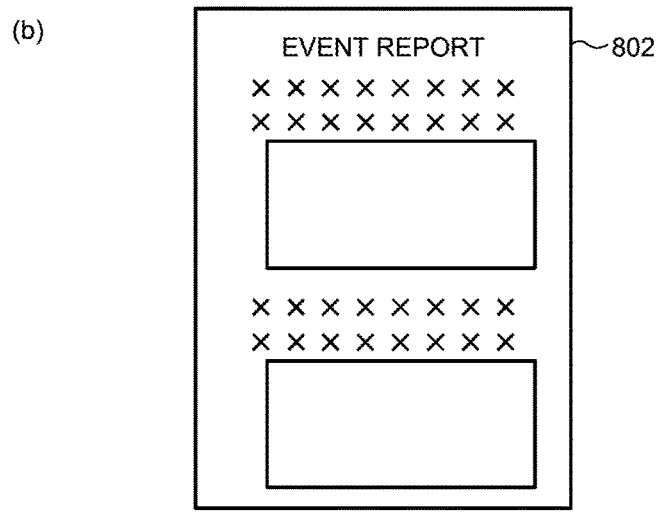
(c) 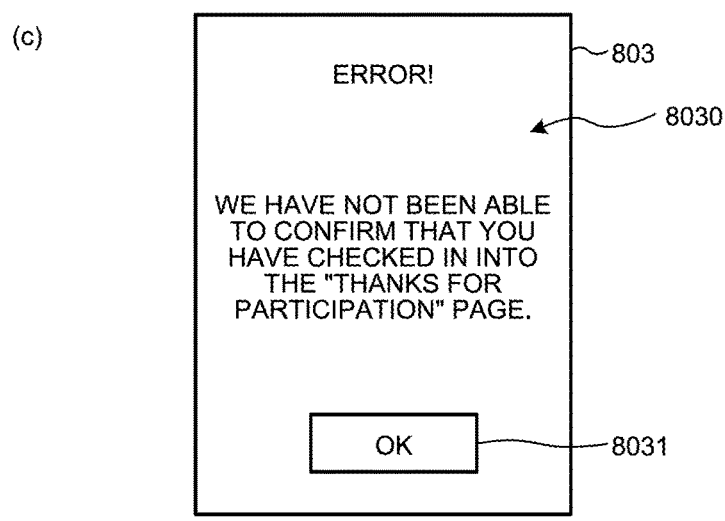

https://1.example.com/idresist.html?<uid>

INFORMATION PROCESSING SYSTEM AND INFORMATION PROCESSING METHOD

CROSS-REFERENCE TO RELATED APPLICATIONS

The present application claims priority under 35 U.S.C. § 119 to Japanese Patent Application No. 2016-008764, filed Jan. 20, 2016 and Japanese Patent Application No. 2016-026436, filed Feb. 15, 2016. The contents of which are incorporated herein by reference in their entirety.

BACKGROUND OF THE INVENTION

1. Field of the Invention

The present invention relates to an information processing system and an information processing method.

2. Description of the Related Art

Image search techniques are known in which features are extracted from, for example, a captured image obtained by image capturing with a camera, and a pre-registered image group is searched for an image having many similar features. Image search systems are known that use such image search techniques to register images of certain photographs or printed materials in a database in association with various kinds of electronic data, to search this database for a similar image using a captured image of any one of these photographs or the printed materials, and to present linkage information associated with the similar image (for example, Japanese Unexamined Patent Application Publication No. 2014-010723).

It is desirable that a service using an image search system as described above be implemented with full consideration given to such issues as convenience of users who use the service and revenues to be earned by a service provider and a linkage information provider. For such provision of the service, a mechanism is called for that enables efficient operation of the image search system.

SUMMARY OF THE INVENTION

According to one aspect of the present invention, an information processing system includes an image search system and a customer-side system. The image search system is configured to search, for an image to be found, databases in accordance with a search request and based on similarity thereof to a search key image. The databases have the image to be found and linkage information registered therein in association with each other. The image search system is also configured to transmit the linkage information associated with the image to be found to a transmitter of the search request when the image to be found is found. The customer-side system is operated by a customer of the image search system. The image search system includes a module distributer and a searcher. The module distributer is configured to distribute a search module and a piece of module identification information to the customer-side system while associating the search module and the piece of module identification information with each other. The search module is used for causing a terminal device to transmit the search request; the piece of module identification information is used for identifying the search module. The searcher is configured to, as a result of causing the search module to run on the terminal device, execute the searching of the databases in accordance with the module identification information included in the search request transmitted from the terminal device. The piece of module identification information is one of a plurality of pieces of module identification information. The search module is one of a plurality of search modules. The module distributer distributes, to the customer-side system, the search modules associated with the different pieces of module identification information.

BRIEF DESCRIPTION OF THE DRAWINGS

FIG. 18 is a diagram illustrating an example of a client registration/edit screen applicable to the embodiments;

FIG. 20 is a diagram illustrating display of a module registration/edit screen applicable to the embodiments;

FIG. 21 is a diagram illustrating an example of a registered information list screen applicable to the embodiments;

FIG. 33 is a diagram for explaining the processing related to a search to be made by the management server in response to a search request from the customer terminal, the processing being applicable to the embodiments;

FIG. 34 is a diagram for explaining the processing related to a search to be made by the management server in response to a search request from the customer terminal, the processing being applicable to the embodiments;

FIG. 35 is a diagram for explaining the processing related to a search to be made by the management server in response to a search request from the customer terminal, the processing being applicable to the embodiments;

FIG. 41 is a diagram illustrating examples of a browse screen to be displayed on the search terminal in the content acquisition processing according to the embodiments and suited for the fourth contract pattern;

FIG. 42 is a diagram illustrating examples of a browse screen to be displayed on the search terminal in the content acquisition processing according to the embodiments and suited for the fourth contract pattern;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
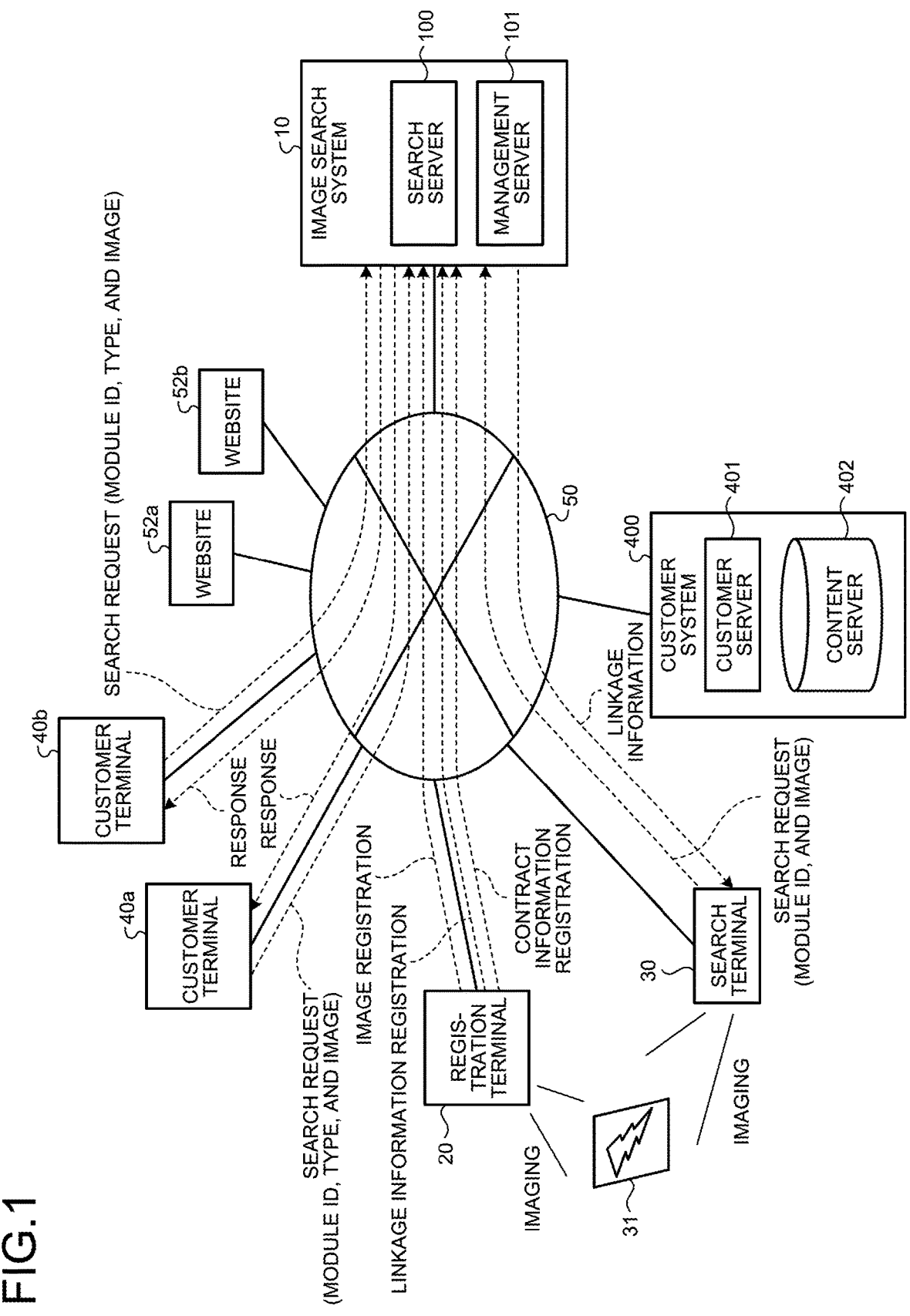
FIG. 1 is a diagram schematically illustrating an exemplary configuration of an information processing system applicable to embodiments.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a mechanism that enables efficient operation of the image search system.

Information Processing System Applicable to Embodiments

FIG. 1 schematically illustrates an exemplary configuration of the information processing system applicable to the embodiments. In FIG. 1, the information processing system includes an image search system 10, a registration terminal 20, a search terminal 30, and customer terminals 40a and 40b. The image search system 10 includes a search server 100 and a management server 101. The search server 100 is enabled to communicate with the registration terminal 20, the search terminal 30, and the customer terminals 40a and 40b through a network 50 such as the Internet. The management server 101 is enabled to communicate with the registration terminal 20 and the customer terminals 40a and 40b through the network 50.

The information processing system can further include a customer system 400. The customer system 400 includes a customer server 401 and a content server 402. The customer system 400 is enabled to communicate with the search server 100 through the network 50.

The search server 100 and the management server 101 are operated and managed by a service provider who provides an image search function performed by the image search system 10. Each of the search server 100 and the management server 101 may be composed of one information processing apparatus, or may be composed of a plurality of interconnected information processing apparatuses with functions distributed thereamong. The search server 100 and the management server 101 can alternatively be configured on one information processing apparatus. The search server 100 includes a plurality of image search databases (DBs).

The registration terminal 20 acquires an image and linkage information to be associated with the image, and transmits them to the image search system 10. The image search system 10 registers the image and the linkage information transmitted from the registration terminal 20 in association with each other in a certain image search DB of the image search DBs included in the search server 100. The linkage information can include, for example, Uniform Resource Locators (URLs) of a website 52a and a website 52b on the network 50.

In the example of FIG. 1, the registration terminal 20 uses a captured image obtained by image capturing of a photographic subject 31 as the image to be registered in the image search DB. The image to be registered in the image search DB is not limited to this example. The registration terminal 20 may use an image supplied from the outside or an image created in the registration terminal 20 as the image to be registered in the image search DB. The registration terminal 20 can use an image captured by the registration terminal 20 as the image to be registered in the image search DB.

In the information processing system in FIG. 1, the service provider of the image search system 10 permits a person or an organization having a particular contract with the service provider to register an image and linkage information in the search server 100. Hereinafter, the person or the organization having a particular contract with the service provider is called the customer. The service provider registers, form the registration terminal 20, the image and the linkage information provided by the customer in the search server 100 in response to a request from the customer. Depending on the terms of the contract, the customer itself can operate the registration terminal 20 to register the image and the linkage information in the search server 100. That is, the registration terminal 20 is a terminal device that the service provider or the customer uses.

The customer terminals 40a and 40b are terminals to be used by the customers, and can be used, for example, to check the images and the linkage information registered in the search server 100. The information processing system applicable to the embodiments is configured so that the customer can customize the image search application to be installed on the search terminal 30. The customer terminals 40a and 40b have, for example, the same functions. Hence, in the description to be given below, the customer terminal 40a represents the customer terminals 40a and 40b unless otherwise stated.

For example, the service provider provides, to the customer having the particular contract, an image search module for performing the function of the image search application needed on terminals (the customer terminals 40a and 40b and the search terminal 30) in order to use the search function performed by the search server 100. This image search module is provided as, for example, a software development kit (SDK) from the service provider to the customer.

The customer can incorporate the provided image search module into, for example, another application program developed by the customer itself. This incorporation can make, for example, a customized application in which the image search application function is added to a customer application into for providing a service by the customer. By distributing the customized application having the image search module incorporated therein to a general user, the customer enables the general user to use the image search function in accordance with the intention of the customer, thereby enabling the customer to provide the service to the general user.

The customer terminal 40a has this customized application installed thereon. For example, the customer uses the customer terminal 40a having this customized application installed thereon to transmit a search request to the image search system 10, and checks whether a search result intended by the customer is obtained. The search request includes an image for which an image search is to be made, a module ID for identifying the image search module, and type information indicating a search pattern. The module ID and the type information are to be described later.

The customer system 400 constitutes a content provision system that presents contents stored in the content server 402 to the network 50 via the customer server 401. Each of the customer server 401 and the content server 402 may be composed of one information processing apparatus, or may be composed of a plurality of interconnected information processing apparatuses with functions distributed thereamong. The customer server 401 and the content server 402 can alternatively be configured on one information processing apparatus. The customer server 401 may be configured so as to include functions of the content server 402. The content server 402 is connected from the network 50 via the customer server 401. This example is not limiting, and the content server 402 may be directly connectable through the network 50.

In the image search system 10, the search server 100 performs the image search according to the search request transmitted from the customer terminal 40a, and transmits the search result as a response to the search request to the customer terminal 40a. Based on this search result, the customer checks, for example, the operation of the customized application, and the image and the linkage information registered in the search server 100. Upon having determined that there is no problem, the customer provides, for example, the customized application and the service using the image search function to the general user.

The search terminal 30 is a terminal device used by a general user, and has an image capturing function. The search terminal 30 is not limited to this example, and may store an image desired to serve as a key in the image search, without having the image capturing function. Needless to say, the search terminal 30 may have the image capturing function and include a unit for storing an image serving as the key in the image search.

The search terminal 30 has an image search application installed thereon that serves as an application program for using the image search by the image search system 10. To install the image search application on the search terminal 30, for example, the following method can be used: on a predetermined download site on the network 50 such as the Internet, the general user specifies and downloads therefrom the image search application as the application program desired to be installed, and installs it on the search terminal 30.

An image search application provided as a customized application with an embedded image search module is customized by a customer, is assigned a module identifier (ID), and is distributed to the general user. In contrast, an image search application distributed from the service provider is not assigned any module ID, or is assigned a module ID indicating that the image search application is distributed from the service provider. That is, the image search system 10 can not only identify each customer and each customized application but also distinguish between the customer and the service provider based on the module ID.

The following description assumes, unless otherwise stated, that the image search application is a customized application that has been customized by the customer and that is distributed with the module ID specific to the customization assigned thereto.

By having the image search application executed, the search terminal 30 is enabled to perform image capturing processing to capture an image of the photographic subject 31 using the image capturing function, and transmit the image of the photographic subject 31 to the image search system 10 through the network 50. The search terminal 30 captures an image of the photographic subject 31, for example, by starting the image capturing function in response to a user operation, and transmits a search request requesting search for an image similar to the captured image to the image search system 10. The search request includes a captured image and the module ID assigned to the image search application. The transmitted search request is received by the search server 100 in the image search system 10.

The customer can set various items, such as a leaflet, a poster, a signboard, a signage, a promotional photograph, a certain scenery, and a product, as the photographic subjects. In other words, to the extent that the image search system 10 functions, all objects determined by the customer can serve as the photographic subjects. This is because the customer only needs to disclose the photographic subjects to the general user, and the general user only needs to capture any of the photographic subjects and use the image search system 10.

In the image search system 10, the search server 100 searches the image search DB for an image similar to the image in response to the search request transmitted from the search terminal 30, and acquires identification information (hereinafter, called image identification information) on the found image as a search result. The search server 100 then can select, in accordance with the module ID included in the search request, an image search DB to be searched. The search server 100 transmits the linkage information associated with the found image to the search terminal 30.

For example, if the linkage information includes a URL, the search terminal 30 can access the website 52a or the website 52b through the network 50 according to the linkage information that has been found on the search server 100 based on the captured image of the photographic subject 31 and that has been transmitted. Hereinafter, a person who operates the search terminal 30 is called the general user.

Figure 2:
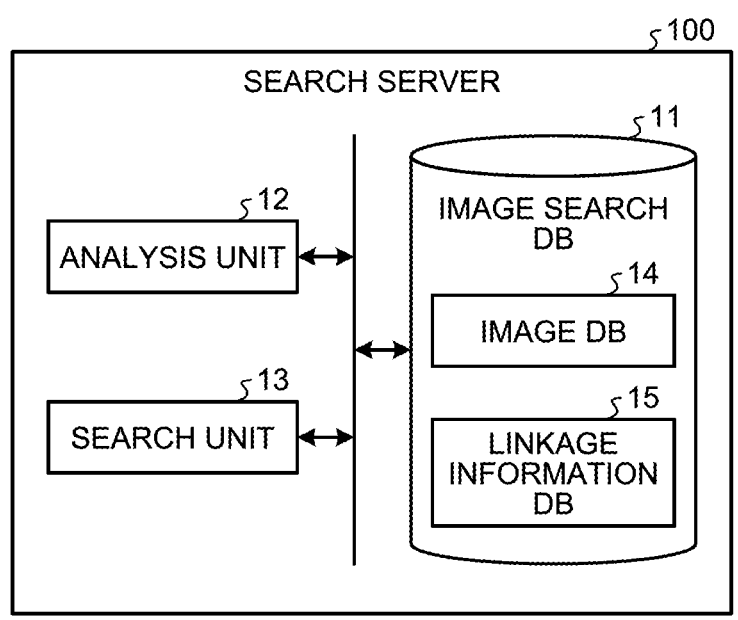
FIG. 2 is an exemplary functional block diagram for explaining functions of a search server applicable to the embodiments.

FIG. 2 is an exemplary functional block diagram for explaining functions of the search server 100 applicable to the embodiments. The search server 100 includes an image search DB 11, an analysis unit 12, and a search unit 13, and performs search processing based on the captured image transmitted from the search terminal 30. The image search DB 11 includes an image DB 14 and a linkage information DB 15. In the image DB 14, images are registered in a manner such that the image DB 14 is searchable for each image. More specifically, in the image DB 14, each image and feature information extracted from the image by the analysis unit 12 are registered in association with each other. In the linkage information DB 15, the linkage information to be linked with the image registered in the image DB 14 is registered in association with the image.

That is, it can be said that the service provider is a user who operates the image search system 10 to provide a search service (search function), that the customer is a user who determines the image or other information to be registered in the image search system 10 to use the search service, and determines also an imaging target (the photographic subject 31) the image of which is to be captured on the search terminal 30 of the general user, and that the general user is a user who captures the imaging target determined by the customer, and transmits the captured image to use the image search system 10. The term "user" herein includes a person and a corporation.

The following describes a specific example of the association between the image and the linkage information. In the embodiments, one or more areas can be specified in the image, and one or more pieces of the linkage information can be associated with each of the specified areas. This area specified in the image for being associated with the linkage information will be hereinafter called the target area.

Information indicating the target area is stored and registered in the linkage information DB 15 in association with the image identification information. In the embodiments, this information indicating the target area is described using, for example, the Extensible Markup Language (XML) that is a kind of markup language that uses tags to define and describe meanings and structures of data. The linkage information DB 15 stores, for example, the file name of a file that stores therein an XML code and the image identification information in association with each other, the XML code describing information that indicates the target area and the linkage information in association with each other.

The search server 100 performs registration processing of an image as schematically described below. The search server 100 uses the analysis unit 12 to analyze an image to be registered, and extracts feature information representing the feature of the image. The search server 100 stores the extracted feature information and the image used as an extraction source from which the feature information has been extracted, in the image DB 14, in association with the image identification information for identifying the image used as the extraction source. The image used as the extraction source corresponds to the image to be registered, and for example, is the same image as the image to be registered.

The search server 100 also stores the linkage information to be provided to the user in the linkage information DB 15 in association with the image identification information. The image and the feature information, and the linkage information are stored in the image DB 14 and the linkage information DB 15, respectively, in association with the image identification information. The image to be registered is thus registered in the image search DB 11.

In general, an original image is irreproducible from the feature information extracted from the image. In other words, the feature information is image information from which an image as a source thereof cannot be reproduced in a form recognizable by human eyes. In contrast, image data is image information from which an image can be reproduced in a form recognizable by human eyes. Thus, the feature information on the image can be clearly distinguished from the image data.

The search server 100 performs the search processing for an image as schematically described below. For example, the search server 100 receives an image transmitted from the search terminal 30, and transfers the received image as an image serving as the extraction source to the analysis unit 12 through the search unit 13. The analysis unit 12 analyzes the transferred image to extract the feature information from the image, and transfers the extracted feature information to the search unit 13. Based on the feature information transferred from the analysis unit 12, the search unit 13 searches the image DB 14 for feature information having a high similarity to the transferred feature information. The search unit 13 acquires the linkage information associated with the image identification information corresponding to the found feature information from the linkage information DB 15. The search server 100 transmits the linkage information acquired from the linkage information DB 15, as a search result to the search terminal 30.

Figure 3:
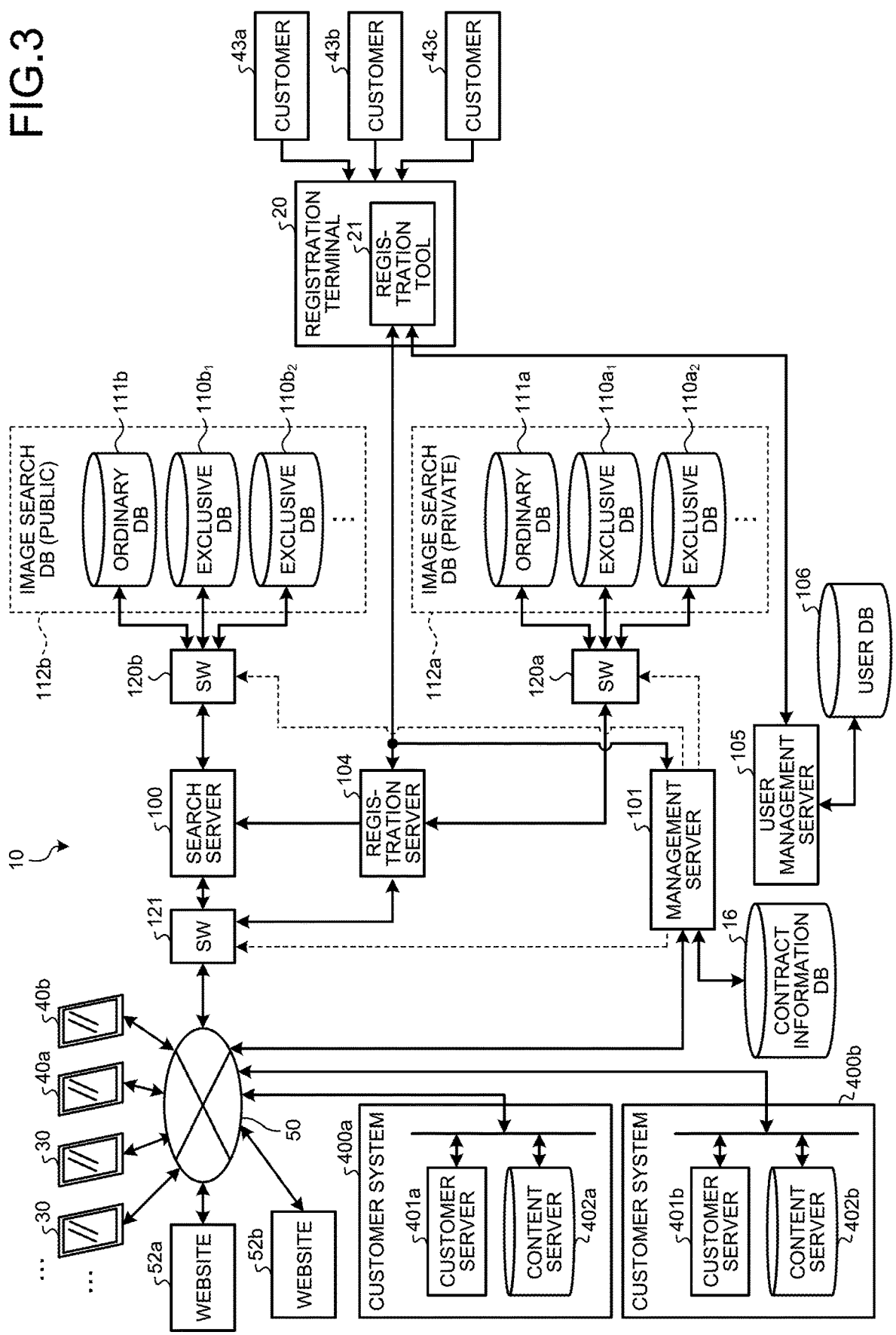
FIG. 3 is a block diagram schematically illustrating an exemplary configuration of the information processing system applicable to the embodiments.

FIG. 3 schematically illustrates an exemplary configuration of the information processing system applicable to the embodiments. In FIG. 3, the same reference numerals are assigned to the same components as those in FIG. 1 or FIG. 2 explained above, and detailed description thereof is omitted.

In FIG. 3, the information processing system includes the image search system 10, the registration terminal 20, the search terminals 30, 30, and so on, customer systems 400a and 400b, the customer terminals 40a and 40b, and a user management server 105. The customer system 400a includes a customer server 401a and a content server 402a. Similarly, the customer system 400b also includes a customer server 401b and a content server 402b. A user DB 106 that stores therein user information is connected to the user management server 105. The image search system 10 includes the search server 100, the management server 101, and a registration server 104. For descriptive purposes, FIG. 3 illustrates an image search DB 112b corresponding to the image search DB 11 of FIG. 2 in a manner such that the image search DB 112b is externally connected to the search server 100.

The image search DB 112b includes a plurality of DBs including an ordinary DB 111b and exclusive DBs 110$b_1$, 110$b_2$, and so on each including the image DB 14 and the linkage information DB 15. The search server 100 performs the image search using, as a search target DB, a DB that is selected from among the DBs included in the image search DB 112b by a switch unit (SW) 120b according to DB specifying information (to be described later) from the management server 101.

As described using FIG. 1 and FIG. 2, the search server 100 uses the analysis unit 12 to analyze the image (captured image) transmitted from the search terminal 30 through the network 50 so as to extract the feature information, and uses the search unit 13 to search the image DB 14 for feature information similar to the extracted feature information. The search server 100 acquires, from the linkage information DB 15, the linkage information corresponding to the image identification information associated with the feature information found from the image DB 14, and transmits the acquired linkage information to the search terminal 30.

The registration server 104 includes an image search DB 112a corresponding to the image search DB 112b, and has an image search function including the functions of the analysis unit 12 and the search unit 13 in the same manner as the search server 100. In the same manner as the image search DB 112b, the image search DB 112a includes a plurality of DBs including an ordinary DB 111a and exclusive DBs 110$a_1$, 110$a_2$, and so on each including the image DB 14 and the linkage information DB 15. The ordinary DB 111a, and the exclusive DBs 110$a_1$, 110$a_2$, and so on correspond to the ordinary DB 111b, and the exclusive DBs 110$b_1$, 110$b_2$, and so on, respectively, included in the image search DB 112b.

Each of the exclusive DBs 110$a_1$, 110$a_2$, and so on and the exclusive DBs DB110$b_1$, 110$b_2$, and so on is a DB in which a customer designated in advance according to a contract can register an image. In contrast, each of the ordinary DBs 111a and 111b is a DB in which a plurality of customers can register images in a shared manner.

Hereinafter, when not needing to be distinguished from one another, the exclusive DBs 110$a_1$, 110$a_1$, and so on and the exclusive DBs DB110$b_1$, 110$b_2$, and so on will be each referred to as the exclusive DB, where appropriate. In the same manner, when not needing to be distinguished from each other, the ordinary DBs 111a and 111b will be each referred to as an ordinary DB, where appropriate.

The registration server 104 performs the image search using, as a search target DB, a DB that is selected from among the DBs included in the image search DB 112a by a switch unit (SW) 120a according to the DB specifying information (to be described later) from the management server 101.

A contract information DB 16 is connected to the management server 101. Contract information serving as information on a contract concluded between the service provider and the customer is stored in the contract information DB 16. The contract information includes, with respect to the contract with the customer, contract pattern information indicating a pattern of contract and the DB specifying information indicating which DB of the DBs included in the image search DBs 112a and 112b is the search target DB.

The management server 101 determines DBs selected by the switch units 120a and 120b based on the contract pattern information and the DB specifying information included in the contract information and on search pattern information included in the search request. The management server 101 switches a switch unit (SW) 121 based on the contract pattern information and the search pattern information so as to select which of the search server 100 and the registration server 104 is connected as an access destination through the network 50. That is, the management server 101 also functions as a control unit that controls the switch units 120a, 120b, and 121 to determine the search target DB.

The registration terminal 20 includes a registration tool 21. The registration tool 21 is implemented in the form of a computer program that runs on a central processing unit (CPU) of the registration terminal 20. The computer program for implementing the registration tool 21 is provided from the registration server 104, for example, as a result of connection of the registration terminal 20 to the registration server 104.

Images and linkage information to be associated with the images are provided from respective customers 43a, 43b, 43c, and so on to the registration terminal 20. The registration terminal 20 uses the registration tool 21 to transmit the images provided from the customers 43a, 43b, and so on and the linkage information associated with the respective images to the registration server 104. The registration terminal 20 can also use the registration tool 21 to transmit the contract information on the respective customers 43a, 43b, and so on to the registration server 104.

The customer systems 400a and 400b are assumed to be operated and managed by the respective customers 43a and 43b. Likewise, the customer terminals 40a and 40b are assumed to be used by the respective customers 43a and 43b.

Figure 4:
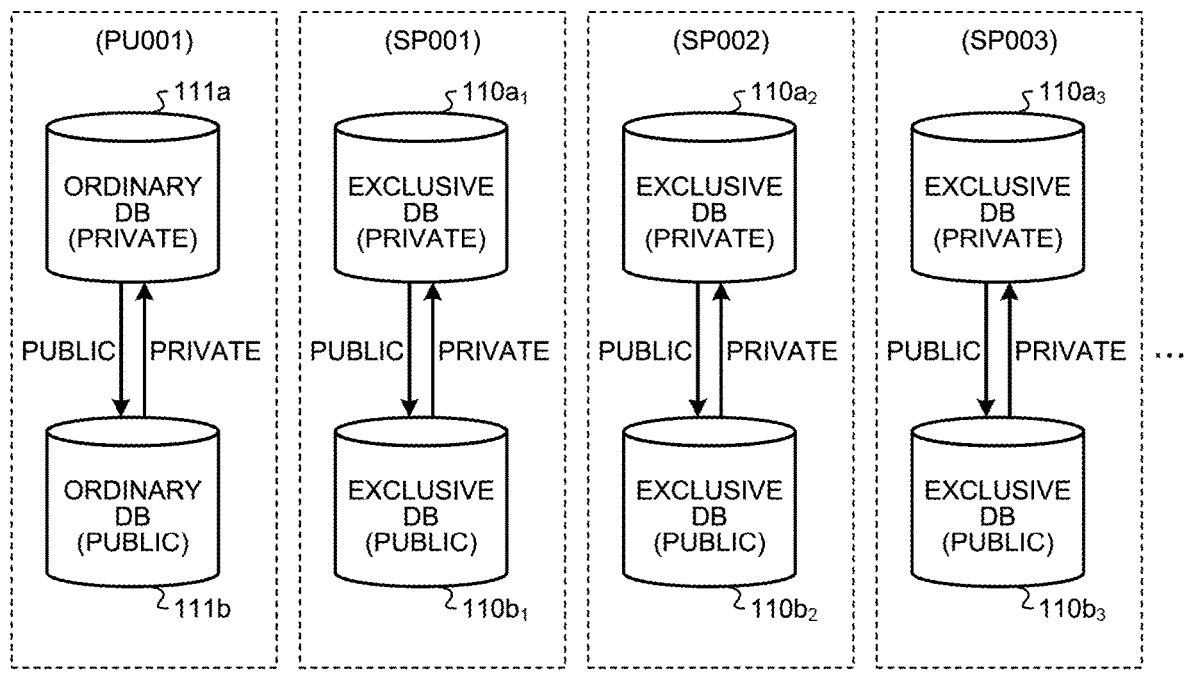
FIG. 4 is a diagram conceptually illustrating configurations of image search databases (DBs) applicable to the embodiments.

FIG. 4 conceptually illustrates configurations of the image search DBs 112a and 112b applicable to the embodiments. The ordinary DB 111a, the exclusive DB $110a_1$ the exclusive DB $110a_2$, and an exclusive DB $110a_3$ included in the image search DB 112a are private DBs that the general user is prohibited to search from the search terminal 30. By registering an image in any one of these private DBs, the customer can use the customer terminal 40a to search for and check the image before disclosure (before presentation) to the general user using this image. That is, the customer can specify the private DB to be a search target when checking the image.

In contrast, the ordinary DB 111b, the exclusive DB $110b_1$, the exclusive DB $110b_2$, and an exclusive DB $110b_3$ included in the image search DB 112b are public DBs that the general user is allowed to search using the search terminal 30, and can be each specified as a search target by the search terminal 30 that the general user uses and by the customer terminal 40a that the customer uses. The customer can move an image registered in the private DB to one of these public DBs. This example is not limiting, and the customer may directly register the image in this public DB.

In each of the pairs of the ordinary DBs 111a and 111b, the exclusive DBs $110a_1$ and $110b_1$, the exclusive DBs $110a_2$, and $110b_2$, and the exclusive DBs $110a_3$ and $110b_3$, the DBs included in the pair are assigned the same DB number. In the example of FIG. 4, the exclusive DBs $110a_1$ and $110b_1$ that form a pair are each assigned a DB number "SP001". In the same manner, the exclusive DBs $110a_2$ and $110b_2$ that form a pair, and the exclusive DBs $110a_3$ and $110b_3$ that form a pair are assigned DB numbers "SP002" and "SP003", respectively. The pair of the ordinary DBs 111a and 111b is assigned a DB number "PU001".

Through disclosure/non-disclosure processing, an image to be disclosed and an image to be undisclosed are moved between two DBs in each pair of the ordinary DBs 111a and 111b, the exclusive DBs $110a_1$ and $110b_1$, the exclusive DBs $110a_2$ and $110b_2$, and the exclusive DBs $110a_3$, and $110b_3$. In an example of the pair of the exclusive DBs 110a, and $110b_1$, through the disclosure processing, an image specified as public among images set private (private images) stored in the exclusive DB $110a_1$ serving as a private DB is moved to the exclusive DB $110b_1$ serving as a public DB. Through the non-disclosure processing, an image specified as private among images set public (public images) stored in the exclusive DB $110b_1$ is moved to the exclusive DB $110a_1$.

In other words, an image to be disclosed that has been stored in the exclusive DB $110a_1$ and thus been set private is moved to the exclusive DB $110b_1$ through the disclosure processing, and thereby becomes available for searching from the customer terminal 40a and the search terminal 30. In contrast, an image to be undisclosed that has been stored in the exclusive DB $110b_1$ is moved to the exclusive DB $110a_1$ through the non-disclosure processing, and thereby becomes unavailable for searching (not specifiable as an image to be found) from the search terminal 30 while remaining available for searching (specifiable as an image to be found) from the customer terminal 40a.

These movements of images to be disclosed and to be undisclosed between the DBs through the disclosure/non-disclosure processing apply in the same manner to the other pairs, that is, the ordinary DBs 111a and 111b, the exclusive DBs 110a2 and 110b2, and the exclusive DBs $110a_3$ and $110b_3$, in the example of FIG. 4.

Although the example of FIG. 4 illustrates that each of the image search DBs 112a and 112b includes three exclusive DBs, the image search DBs 112a and 112b are not limited to this example. For example, each of the image search DBs 112a and 112b is provided with exclusive DBs the number of which corresponds to the number of contracts with the respective customers.

Figure 5:
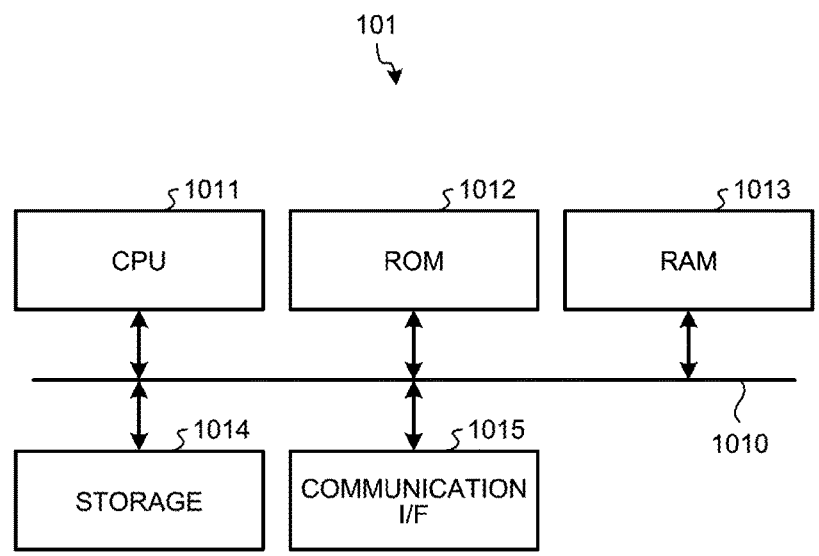
FIG. 5 is a block diagram illustrating an exemplary hardware configuration of a management server applicable to the embodiments.

FIG. 5 illustrates an exemplary hardware configuration of the management server 101 applicable to the embodiments. In FIG. 5, in the management server 101, a CPU 1011, a read-only memory (ROM) 1012, a random access memory (RAM) 1013, a storage 1014, and a communication interface (I/F) 1015 are connected to a bus 1010. The storage 1014 is a storage medium capable of storing data in a nonvolatile manner, and is, for example, a hard disk drive. The storage 1014 is not limited to this example. A nonvolatile semiconductor memory, such as a flash memory, may be used as the storage 1014.

In accordance with computer programs stored in the ROM 1012 and the storage 1014, the CPU 1011 controls the entire operation of this management server 101 using the RAM 1013 as a work memory.

The storage 1014 stores therein computer programs to be executed by the CPU 1011 and various types of data. The contract information DB 16 described above is built using a storage area on this storage 1014. Although FIG. 5 illustrates that the storage 1014 is built of one piece of hardware, the storage 1014 is not limited to this example. For example, a plurality of storage devices may be integrally managed as the single storage 1014.

The communication I/F 1015 performs communication through the network 50 under the control of the CPU 1011.

Although FIG. 5 illustrates that the management server 101 is built of one piece of hardware, the management server 101 is not limited to this example. For example, the management server 101 may be built of a plurality of server devices having the same configuration in a manner such that the server devices are integrally controlled. The search server 100 and the registration server 104 can be built using the same hardware configuration as the management server 101, and description thereof is omitted.

Figure 6:
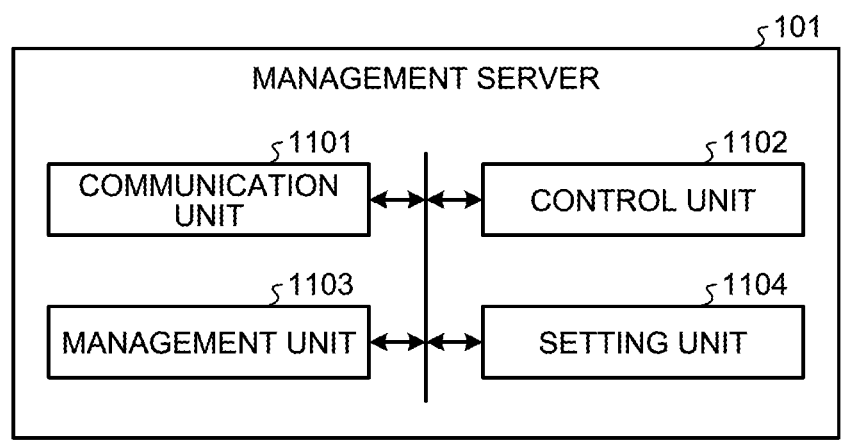
FIG. 6 is an exemplary functional block diagram for explaining functions of the management server applicable to the embodiments.

FIG. 6 is an exemplary functional block diagram for explaining functions of the management server 101 applicable to the embodiments. The management server 101 includes a communication unit 1101, a control unit 1102, a management unit 1103, and a setting unit 1104. The communication unit 1101, the control unit 1102, the management unit 1103, and the setting unit 1104 are implemented in the form of a computer program that runs on the CPU 1011. This example is not limiting, and some or all of the communication unit 1101, the control unit 1102, the management unit 1103, and the setting unit 1104 may be built using hardware circuits that operate in cooperation with one another.

The communication unit 1101 controls communication performed through the network 50 via the communication I/F 1015. The control unit 1102 uses the switch units 120a, 120b, and 121 to control a search path. In addition, the control unit 1102 controls the disclosure/non-disclosure processing described above. The management unit 1103 manages the contract information stored in the contract information DB 16. The setting unit 1104 sets the contract information and the module ID.

Figure 7:
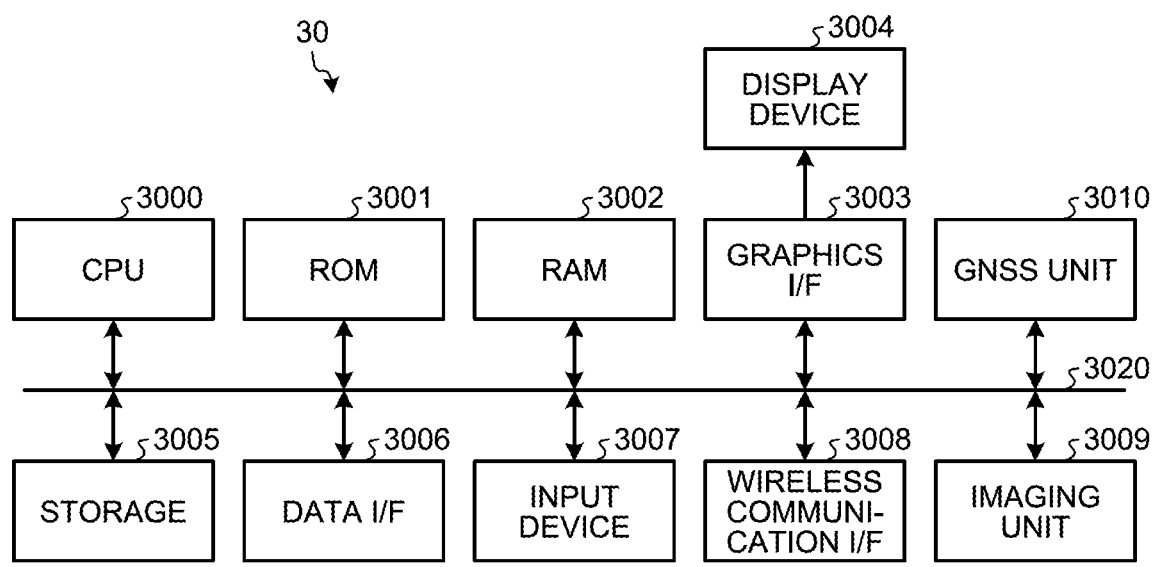
FIG. 7 is a block diagram illustrating an exemplary hardware configuration of a search terminal applicable to the embodiments.

FIG. 7 illustrates an exemplary configuration of hardware of the search terminal 30 applicable to the embodiments. In the search terminal 30 illustrated in FIG. 7, a CPU 3000, a ROM 3001, a RAM 3002, and a graphics I/F 3003 are connected to a bus 3020. A storage 3005, a data I/F 3006, an input device 3007, a wireless communication I/F 3008, an imaging unit 3009, and a global navigation satellite system (GLASS) unit 3010 are also connected to the bus 3020. The search terminal 30 is thus an information processing apparatus equipped with a computer including the CPU 3000, the ROM 3001, and the RAM 3002.

The storage 3005 is a storage medium capable of storing data in a nonvolatile manner, and is, for example, a nonvolatile semiconductor memory such as a flash memory. The storage 3005 is not limited to this example. A hard disk drive may be used as the storage 3005. The storage 3005 stores therein computer programs to be executed by the CPU 3000 and various kinds of data. The storage 3005 and the ROM 3001 may share, for example, one rewritable nonvolatile semiconductor memory or the like.

In accordance with computer programs stored in the ROM 3001 and the storage 3005, the CPU 3000 controls the entire operation of this search terminal 30 using the RAM 3002 as a work memory. The graphics I/F 3003 converts a display control signal generated by the CPU 3000 into a signal that can be displayed by a display device 3004, and outputs the converted signal. The display device 3004 includes, for example, a liquid crystal display (LCD), and is driven by the signal output from the graphics I/F 3003 to perform display according to the display control signal.

The data I/F 3006 receives and outputs data from and to external equipment. An interface, such as a universal serial bus (USB) interface or a Bluetooth (registered trademark) interface, can be used as the data I/F 3006.

The input device 3007 accepts user input. A user can issue an instruction to the search terminal 30, for example, by operating the input device 3007 according to the display on the display device 3004. The input device 3007 and the display device 3004 are preferably integrated into a touchscreen panel that outputs a control signal corresponding to a pressed position and transmits images on the display device 3004.

The wireless communication I/F 3008 performs communication through the network 50 using wireless communication under the control of the CPU 3000.

The imaging unit 3009 includes an optical system, an imaging device, and a control and drive circuit for the optical system and the imaging device, and applies predetermined processing to an imaging signal output from the imaging device to output the result as a captured image formed by a digital signal. The captured image that has been output from the imaging unit 3009 and subjected to image processing can be stored in, for example, the storage 3005. The CPU 3000 can read the captured image from the storage 3005 and transmit it to the network via the wireless communication I/F 3008.

The GNSS unit 3010 measures the current position using a GNSS that measures a current location on the Earth using an artificial satellite wherever on the Earth the current location is. The GNSS unit 3010 is capable of outputting, as measurement results, locational information, that is, coordinates including at least the latitude and the longitude of the current location, and temporal information indicating a clock time when the current location is measured.

Figure 8:
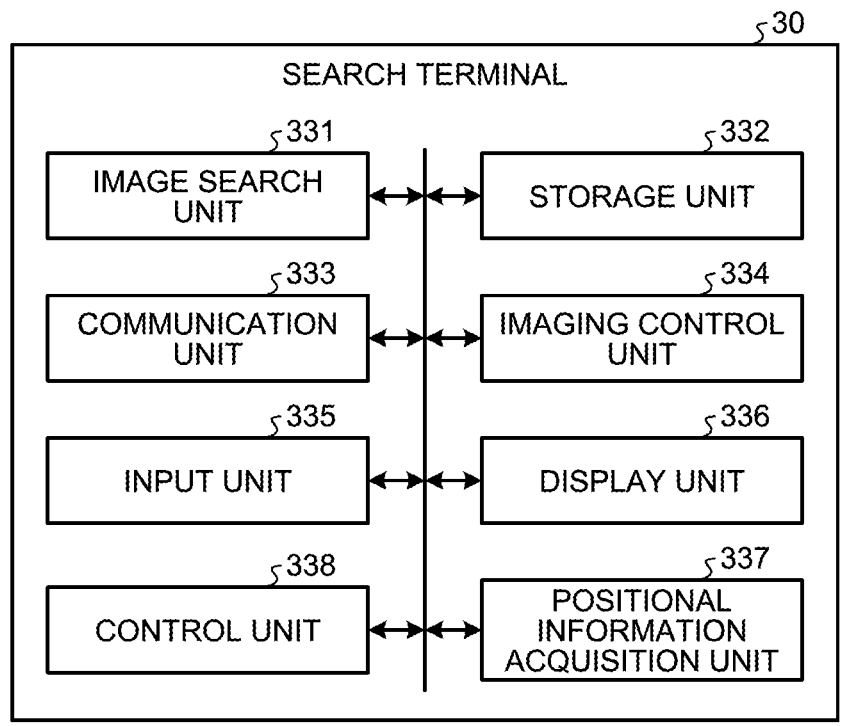
FIG. 8 is an exemplary functional block diagram for explaining functions of the search terminal applicable to the embodiments.

FIG. 8 is an exemplary functional block diagram for explaining functions of the search terminal 30 applicable to the embodiments. The search terminal 30 includes an image search unit 331, a storage unit 332, a communication unit 333, an imaging control unit 334, an input unit 335, a display unit 336, a locational information acquisition unit 337, and a control unit 338. The image search unit 331, the storage unit 332, the communication unit 333, the imaging control unit 334, the input unit 335, the display unit 336, the locational information acquisition unit 337, and the control unit 338 are implemented in the form of a computer program that runs on the CPU 3000. This example is not limiting, and some or all of the image search unit 331, the storage unit 332, the communication unit 333, the imaging control unit 334, the input unit 335, the display unit 336, the locational information acquisition unit 337, and the control unit 338 except the image search unit 331 may be built using hardware circuits that operate in cooperation with one another.

The image search unit 331 performs image search processing on the search terminal 30 according to the embodiments. The image search unit 331 is set up on the search terminal 30 as a result of installing, on the search terminal 30, the image search application distributed by the service provider to the customer having the particular contract, or a customized application that the image search application has been customized into by the customer.

The storage unit 332 controls storage of data in and readout of data from the storage 3005 and the RAM 3002. The communication unit 333 controls communication performed by the wireless communication I/F 3008. The input unit 335 outputs input information according to an input operation on the input device 3007. The display unit 336 generates a display control signal to be supplied to the graphics I/F 3003. The imaging control unit 334 controls the imaging operation of the imaging unit 3009. The locational information acquisition unit 337 controls acquisition of the locational information and the temporal information that is performed by the GNSS unit 3010. The control unit 338 controls the overall operation of the search terminal 30.

The customer terminal 40a can be implemented by a hardware configuration and a functional configuration that are equivalent to those of the search terminal 30, and description thereof is therefore omitted. The customer terminal 40a includes functions corresponding to the respective functions included in the above-described search terminal 30, that is, the image search unit 331, the storage unit 332, the communication unit 333, the imaging control unit 334, the input unit 335, the display unit 336, the locational information acquisition unit 337, and the control unit 338. In the customer terminal 40a, the function of the locational information acquisition unit 337 can be omitted.

Figure 9:
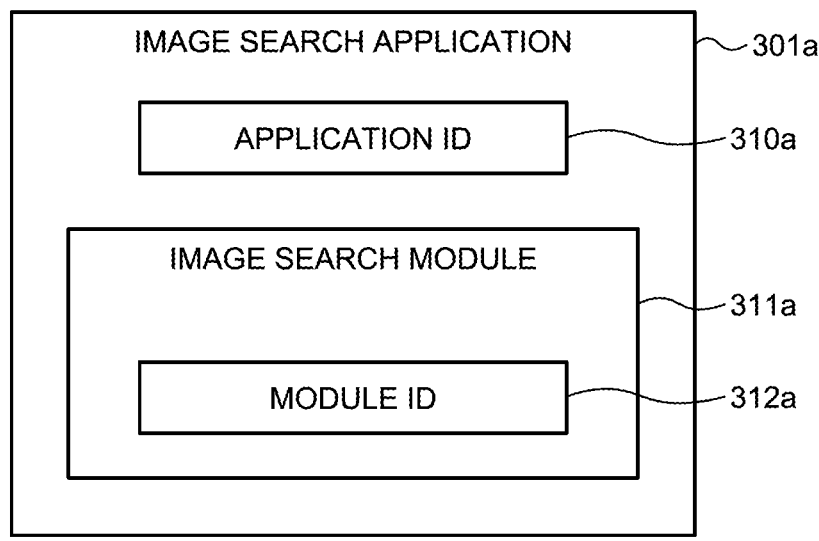
FIG. 9 is a block diagram illustrating an exemplary configuration of an image search application for setting up an image search unit applicable to the embodiments.

FIG. 9 is a block diagram illustrating an exemplary configuration of an image search application for setting up the image search unit 331 applicable to the embodiments. An image search application 301a illustrated in FIG. 9 is applicable both to the search terminal 30 and to the customer terminal 40a. In FIG. 9, the image search application 301a includes an application ID 310a and an image search module 311a. The image search module 311a includes a module ID 312a for identifying the image search module 311a. The image search application 301a corresponds to the above-described customized application, and is configured, for example, in a manner such that the image search module 311a provided by the service provider is incorporated into a certain application provided by the customer.

The application ID 310a is, for example, identification information unique to each image search module 311a that is incorporated in the image search application 301a and is provided to the customer, and identifies a corresponding one of the customized applications created by the customer. Consequently, if one customer creates a plurality of customized applications, the customized applications have different application IDs from one another. Alternatively, one application ID may be assigned to a plurality of customized applications of one customer.

The application ID 310a is assigned by the management server 101, for example, when the image search application 301a is first executed. This example is not limiting. The application ID 310a may be set and incorporated in the image search application 301a by the customer, or may be set in association with the image search module 311a that the service provider provides to the customer and be provided together with the image search module 311a to the customer by the service provider. Using the application ID 310a enables identification of the image search application 301a that has transmitted a search request.

The image search module 311a includes units (to be described later in detail) that serve as cores for performing the image search in cooperation with the image search system 10. The service provider provides the image search module 311a to a customer who has a contract therewith, so that the customer can easily incorporate this image search module 311a in the customer's own application program. This incorporation of the image search module 311a in the customer's own application program is called customization using the image search module 311a. The application program having the image search module 311a incorporated therein through the customization corresponds to the customized application described above.

Figure 10:
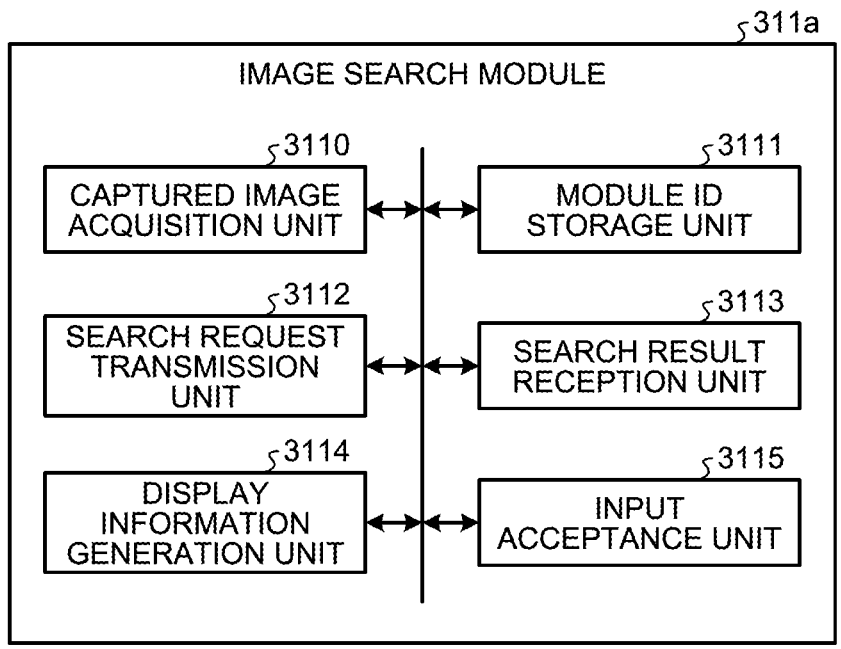
FIG. 10 is an exemplary functional block diagram for explaining functions of an image search module according to the embodiments.

FIG. 10 is an exemplary functional block diagram for explaining functions of the image search module 311a applicable to the embodiments. In FIG. 10, the image search module 311a includes a captured image acquisition unit 3110, a module ID storage unit 3111, a search request transmission unit 3112, a search result reception unit 3113, a display information generation unit 3114, and an input acceptance unit 3115.

The captured image acquisition unit 3110 acquires the captured image captured by the imaging unit 3009 from the imaging control unit 334. The module ID storage unit 3111 controls storage of the module ID 312a into the RAM 3002 or the storage 3005 and reading thereof from the RAM 3002 or the storage 3005. The search request transmission unit 3112 generates a search request for requesting the image search system 10 to search for an image based on the captured image acquired by the captured image acquisition unit 3110. The search request includes the captured image and the module ID 312a. The search request transmission unit 3112 transmits the generated search request to the image search system 10 via the wireless communication I/F 3008.

The search result reception unit 3113 receives the search result transmitted from the image search system 10 in response to the search request transmitted by the search request transmission unit 3112. The display information generation unit 3114 generates display information to be displayed by the display device 3004. For example, the display information generation unit 3114 generates the display information to be displayed in accordance with the search result received by the search result reception unit 3113. The input acceptance unit 3115 accepts the input operation performed on the input device 3007.

The image search module 311a is composed of units that serve as cores for performing the image search in cooperation with the image search system 10. The service provider provides the image search module 311a to a customer who has a contract therewith, so that the customer can easily incorporate this image search module 311a in the customer's own application program. This incorporation of the image search module 311a in the customer's own application program is called customization using the image search module 311a. The application program having the image search module 311a incorporated therein through the customization corresponds to the customized application described above.

An information processing program for performing the functions that the image search module 311a performs is provided by being recorded together with the module ID 312a as a file in an installable format or an executable format on a computer-readable recording medium, such as a compact disc (CD), a flexible disk, or a digital versatile disc (DVD). This example is not limiting, and the information processing program and the module ID 312a may be stored on a computer connected to a network, such as the Internet, and provided by being downloaded through the network. The information processing program and the module ID 312a may alternatively be provided or distributed through a network, such as the Internet.

The information processing program has a modular structure including the above-described units (the captured image acquisition unit 3110, the module ID storage unit 3111, the search request transmission unit 3112, the search result reception unit 3113, the display information generation unit 3114, and the input acceptance unit 3115). The actual hardware is configured such that the CPU 3000 reads the information processing program from a storage medium such as the storage 3005 and executes it so as to load the above-described units into the main memory such as the RAM 3002, and that the captured image acquisition unit 3110, the module ID storage unit 3111, the search request transmission unit 3112, the search result reception unit 3113, the display information generation unit 3114, and the input acceptance unit 3115 are thereby generated in the main memory.

Thus having the information processing program for setting up the image search module 311a executed on, for example, a terminal device (such as the search terminal 30 or the customer terminal 40a) enables transmission of a search request from the search terminal 30 and causes the image search module 311a to function as a search unit that executes search using the search server 100.

Figure 11:
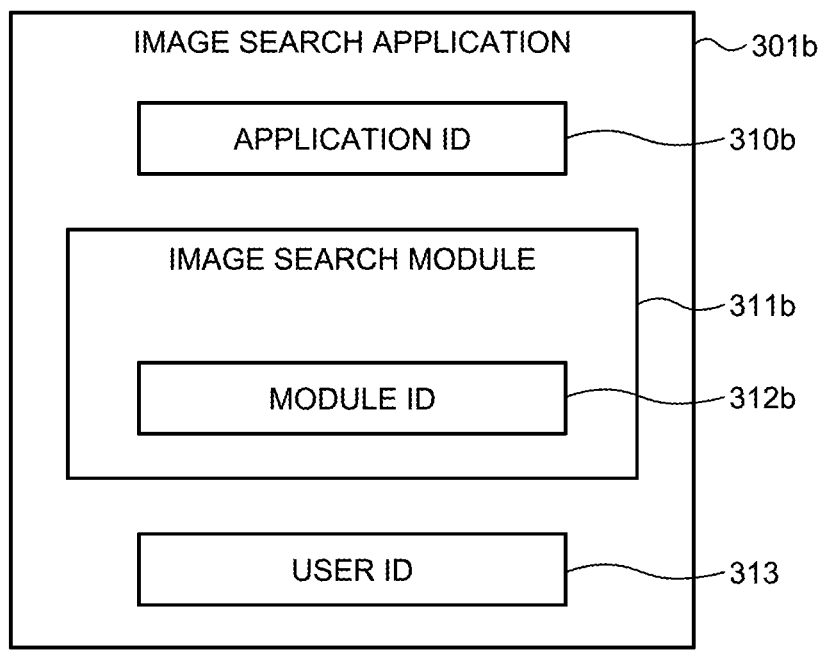
FIG. 11 is a block diagram illustrating an example of configuring, according to the embodiments, the image search application to enable identification of a search terminal that has the image search application installed thereon.

FIG. 11 illustrates an example of configuring, according to the embodiments, the image search application 301a to be capable of identifying a search terminal 30 that has the image search application 301a installed thereon. In FIG. 11, the image search application 301b includes an application ID 310b, an image search module 311b, and a user ID 313. The image search module 311b includes a module ID 312b serving as identification information for identifying the image search module 311b. The image search module 311b includes the functions equivalent to those included in the image search module 311a described using FIG. 10.

The image search application 301b corresponds to the customized application as in the case of the image search application 301a described using FIG. 9, and is obtained, for example, by incorporating the image search module 311b provided by the service provider into a certain application provided by the customer. The image search module 311b includes the module ID 312b serving as identification information for identifying the image search module 311b. The application ID 310b and the image search module 311b in the image search application 301b are equivalent to the application ID 310a and the image search module 311a described using FIG. 9, and detailed description thereof is omitted here.

The user ID 313 is identification information unique to the image search application 301b installed on the search terminal 30. The user ID 313 is assigned by the management server 101, for example, when the image search application 301b installed on the search terminal 30 is first started up. When being first started up in the search terminal 30, the image search application 301b accesses the management server 101 and notifies the management server 101 that it is the first startup in the search terminal 30. The management server 101 generates the unique user ID 313 in response to this notification and transmits the user ID 313 to the search terminal 30.

The search terminal 30 uses the storage unit 332 to store the user ID 313 transmitted from the management server 101, for example, in an area in the storage 3005, the area having been secured as a management area for the image search application 301b. The user ID 313 can be used to identify the image search application 301b that has transmitted the search request and the search terminal 30 that has this image search application 301b installed thereon.

Although the user ID 313 is described as being assigned by the management server 101 herein, this example is not limiting. That is, the user ID 313 may be generated by any other method that generates the user ID 313 unique to the image search application 301b. For example, the user ID 313 may be generated in the search terminal 30. In this case, the user ID 313 possibly can be generated based on information on a clock time by the image search application 301b when it is first started up. The image search application 301b then stores therein the generated user ID 313 and transmits it to the management server 101.

Figure 12:
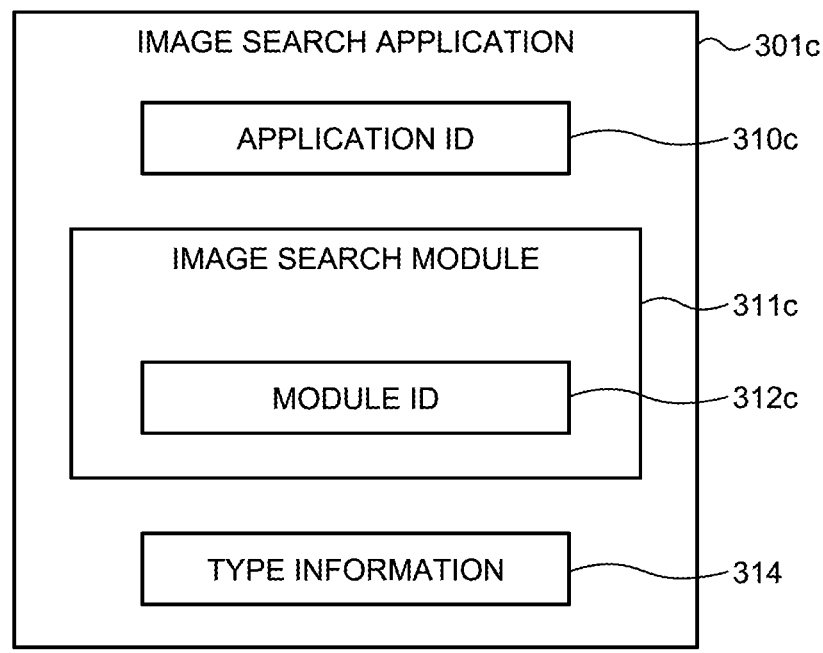
FIG. 12 is a block diagram more specifically illustrating an example of applying, according to the embodiments, the image search application to a customer terminal.

FIG. 12 more specifically illustrates an example of applying the above-described image search application 301a according to the embodiments to the customer terminal 40a. In FIG. 12, an image search application 301c includes an application ID 310c, an image search module 311c, and type information 314. The image search module 311c includes a module ID 312c serving as identification information for identifying the image search module 311c. The image search module 311c includes the functions equivalent to those included in the image search module 311a described using FIG. 10.

The image search application 301c corresponds to the customized application as in the case of the image search application 301a described above, and is obtained, for example, by incorporating the image search module 311c provided by the service provider into a certain application provided by the customer. The application ID 310c and the image search module 311c in the image search application 301c are equivalent to the application ID 310a and the image search module 311a described using FIG. 9, and detailed description thereof is omitted here.

In FIG. 12, the type information 314 is information indicating which of a "trial version" or a "full-use version" the search pattern of the image search application 301c having the image search module 311c incorporated therein is. While the "trial version" is a search pattern such that a search target of the image search application 301c is set to the image search DB 112a serving as a private DB, the "full-use version" is a search pattern such that the search target is set to the image search DB 112b serving as a public DB.

For descriptive purposes, the following description treats each of the above-described image search modules 311a, 311b, and 311c collectively as the image search module 311 and each of the module IDs 312a, 312b, and 312c collectively as the module ID 312 unless otherwise stated. Likewise, the following description treats each of the image search applications 301a, 301b, and 301c collectively as the image search application 301 and each of the application IDs 310a, 310b, and 310c collectively as the module ID 310 unless otherwise stated.

Figure 13:
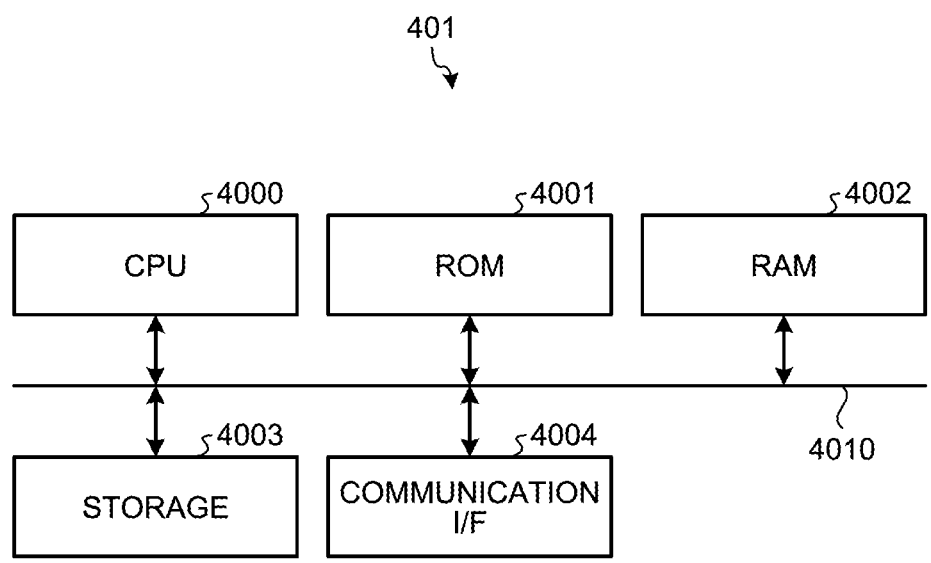
FIG. 13 is a block diagram illustrating an exemplary hardware configuration of a customer server applicable to the embodiments.

FIG. 13 illustrates an exemplary hardware configuration of the customer server 401 applicable to the embodiments. In FIG. 13, in the customer server 401, a CPU 4000, a ROM 4001, a RAM 4002, a storage 4003, and a communication I/F 4004 are connected to a bus 4010. The storage 4003 is a storage medium capable of storing data in a nonvolatile manner, and is, for example, a hard disk drive. The storage 4003 is not limited to this example. A nonvolatile semiconductor memory, such as a flash memory, may be used as the storage 4003.

In accordance with computer programs stored in the ROM 4001 and the storage 4003, the CPU 4000 controls the whole of this customer server 401 using the RAM 4002 as a work memory. The storage 4003 stores therein computer programs to be executed by the CPU 4000 and various kinds of data. The communication I/F 4004 performs communication through the network under the control of the CPU 4000.

Although FIG. 13 illustrates the customer server 401 as being built of one piece of hardware, the customer server 401 is not limited to this example. The customer server 401 may be built in a manner such that a plurality of server devices having the same configuration are integrally controlled. Alternatively, the content server 402 and this customer server 401 may be integrally built. For example, a storage area for contents in the content server 402 may be provided on the storage 4003 in the customer server 401.

Although FIG. 13 illustrates that the storage 4003 is built of one piece of hardware, the storage 4003 is not limited to this example. For example, a plurality of storage devices may be integrally managed as the single storage 4003.

Figure 14:
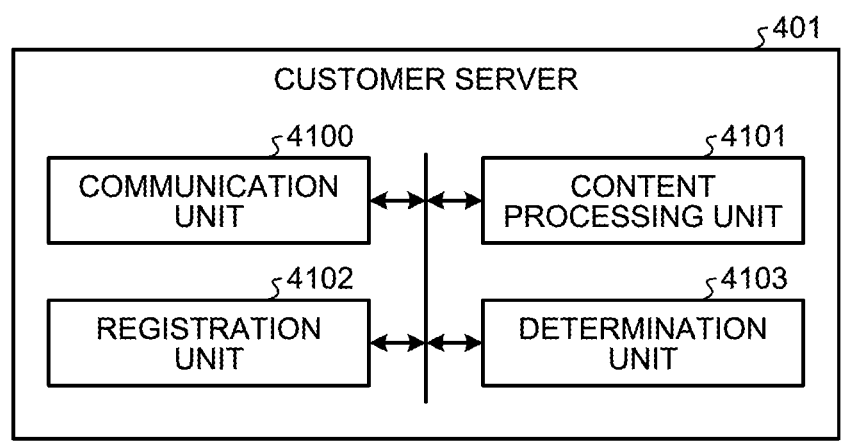
FIG. 14 is an exemplary functional block diagram for explaining functions of the customer server according to the embodiments.

FIG. 14 is an exemplary functional block diagram for explaining functions of the customer server 401 according to the embodiments. The customer server 401 includes a communication unit 4100, a content processing unit 4101, a registration unit 4102, and a determination unit 4103. The communication unit 4100, the content processing unit 4101, the registration unit 4102, and the determination unit 4103 are implemented in the form of a computer program that runs on the CPU 4000. This example is not limiting, and some or all of the communication unit 4100, the content processing unit 4101, the registration unit 4102, and the determination unit 4103 may be built using hardware circuits that operate in cooperation with one another.

The communication unit 4100 controls the communication performed through the network 50 via the communication I/F 4004. The content processing unit 4101 is configured to execute processing related to contents and performs, for example, acquisition of a content stored in the content server 402 and transmission processing of the acquired content. The registration unit 4102 stores the user ID 313 transmitted from the search terminal 30, for example, in the storage 4003, thus registering the user ID 313. The determination unit 4103 performs determinations concerning permission for access to a content, based on information transmitted from the search terminal 30.

The search server 100 and the registration server 104 can be built using the same hardware configuration as the customer server 401, and description of the hardware configuration thereof is omitted.

Registration Processing Applicable to Embodiments

Figure 15:
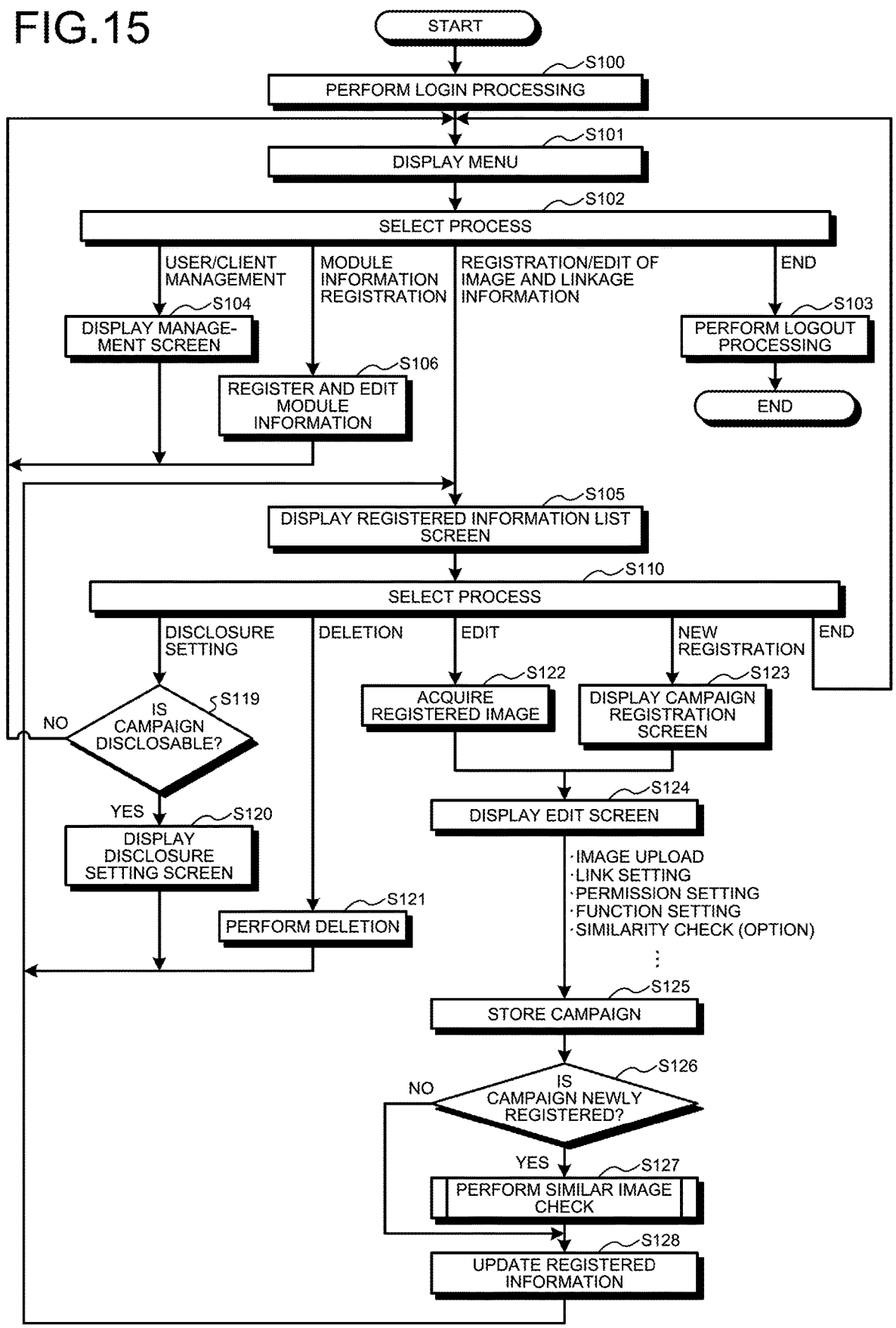
FIG. 15 is an exemplary flowchart illustrating registration processing to be executed by a registration tool, the registration processing being applicable to the embodiments.

The following describes registration processing applicable to the embodiments. FIG. 15 is an exemplary flowchart illustrating the registration processing, applicable to the embodiments, to be performed by the registration tool 21 in the registration terminal 20. Information on a user (a login ID and a password) who uses the registration tool 21 is assumed to have been registered in the user DB 106 by the user management server 105 prior to the processing of the flowchart of FIG. 15. Hereinafter, images are assumed to be registered on a campaign-by-campaign basis in association with campaigns specified by people who register the images.

The following schematically describes campaigns. The campaigns are identified by campaign IDs, and each include one or more images, metadata, and related campaign information. The name "campaign" is a term for customers, and does not limit the scope of the right. When the customer provides some kind of service using the image search function for general users, units each called a "campaign" are prepared so that images, the linkage information, and various type of attribute information can be easily managed on a service-by-service basis.

Each image corresponding to one page in the campaign is called a "page", and includes one or more pieces of the linkage information. The metadata includes attribute information about the campaign. The attribute information about the campaign includes, for example, the campaign ID, the campaign name, the name of a client which has asked for the registration, the date and time of update, and information indicating the state as to whether the campaign is being disclosed or undisclosed, about the campaign. The related campaign information is information indicating other campaigns related to this campaign. These pieces of information indicating the campaign are stored, for example, in the contract information DB 16 by the management server 101.

Figure 16:
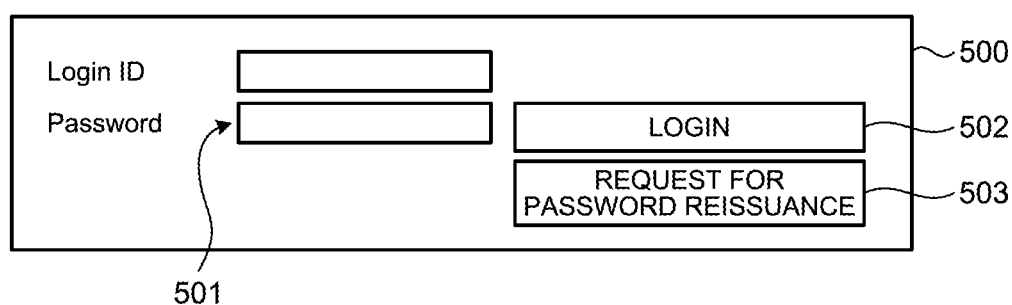
FIG. 16 is a diagram illustrating an example of a login screen applicable to the embodiments.

After the registration tool 21 is started up on the registration terminal 20, the registration tool 21 performs login processing for the user at Step S100. For example, the registration tool 21 displays a login screen 500 illustrated in FIG. 16 on the display device of the registration terminal 20. In the example of FIG. 16, an input section 501 for entering the user information (the login ID and the password), a button 502 for requesting login, and a button 503 for asking for reissue of a password are arranged on the login screen 500.

Hereinafter, expressions such as "display a screen on the registration terminal 20" are used to mean "display a screen on a display device of the registration terminal 20" where appropriate. Likewise, expressions such as "display a screen on the search terminal 30" are used to mean "display a screen on the display device 3004 of the search terminal 30" where appropriate.

For example, in response to entry of a login ID and a password into the input section 501, the registration tool 21 transmits the login ID and the password thus entered to the user management server 105, and requests authentication of the login ID. Upon reception of information indicating that the authentication of the login ID is successful from the user management server 105, the registration tool 21 shifts the processing to Step S101.

Figure 17:
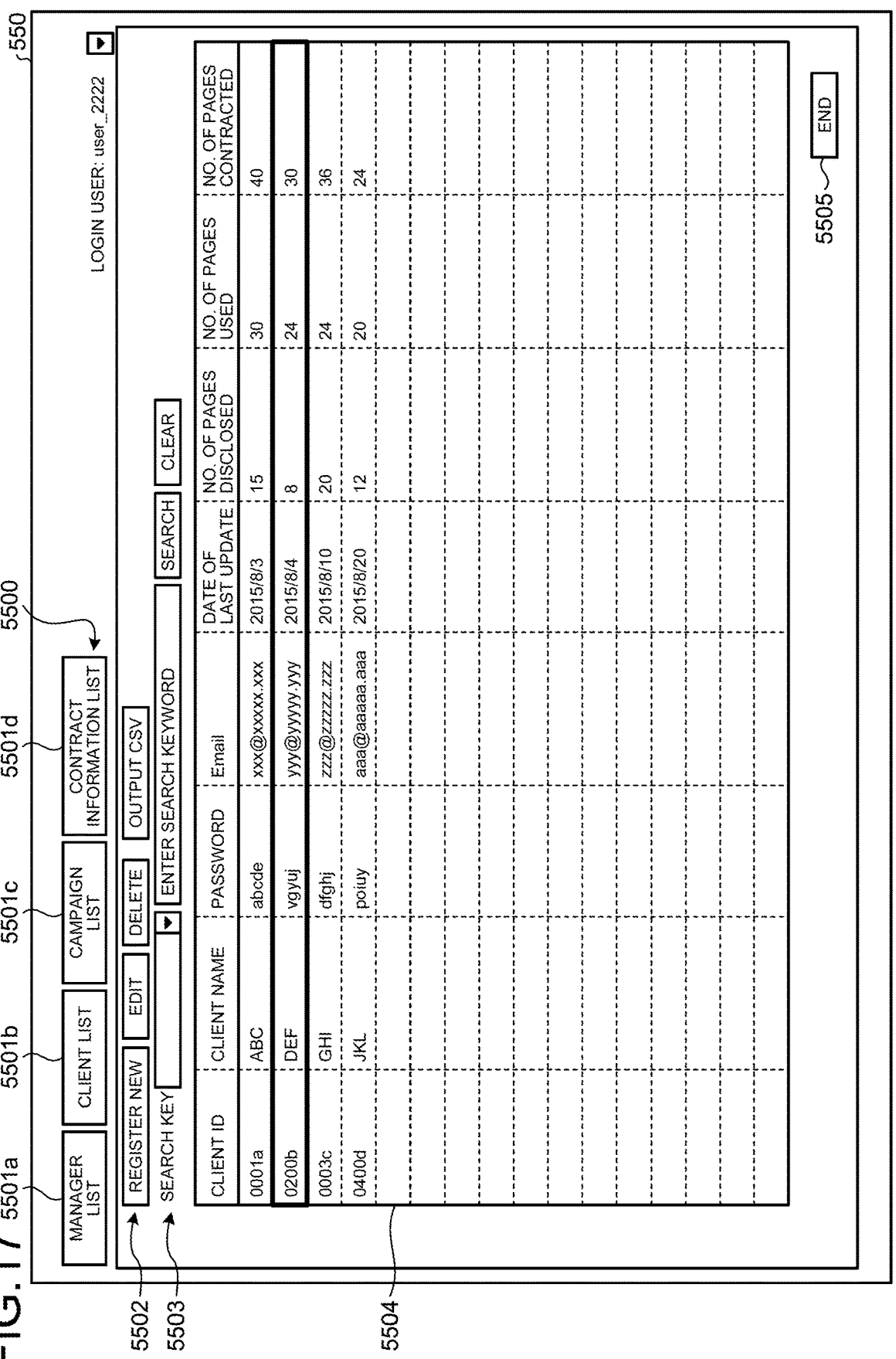
FIG. 17 is a diagram illustrating an example of a client list screen including a menu region, the client list screen being applicable to the embodiments.

At Step S101, the registration tool 21 displays a screen including a menu region on the registration terminal 20. FIG. 17 illustrates an example of a client list screen 550 applicable to the embodiments that includes a menu region 5500. In the example of FIG. 17, the menu region 5500 including tabs 5501a, 5501b, 5501c, and 5501d, a button group 5502, a search input section 5503, a list display region 5504, and an end button 5505 are arranged on the client list screen 550.

The tabs 5501a, 5501b, 5501c, and 5501d included in the menu region 5500 are tabs for selecting a menu item to determine the operational mode of the registration tool 21. The tabs 5501a and 5501b are tabs for switching to a user management mode, and are operated to display a manager list and a client list, respectively. The tab 5501c is a tab for switching to an image registration mode, and is operated to display a campaign list. The tab 5501d is a tab for switching to a module information registration mode, and enables displaying a list of contract information indicating contracts made between the service provider and the customer.

The list display region 5504 is used for displaying a list corresponding to a menu item selected with one of the tabs 5501a, 5501b, 5501c, and 5501d. The example of FIG. 17 illustrates a state brought about by operating the tab 5501b to select the client list. Hereinafter, each row of the list is called a record, and each column thereof is called an item.

The button group 5502 selects a process to be applied to the list displayed in the list display region 5504. In the example of FIG. 17, the button group 5502 includes four buttons, and the respective buttons are assigned functions of "New registration", "Edit", "Delete", and "CSV output" in order from the left. The "New registration" button enables newly adding a record to the list displayed in the list display region 5504. The "Edit" button enables editing information in a record selected in the list displayed in the list display region 5504. The "Delete" button enables deleting the information in the record selected in the list displayed in the list display region 5504. The "CSV output" enables outputting information in the list displayed in the list display region 5504 as a text file in the comma separated value (CSV) format.

The search input section 5503 enables selecting a record from a list displayed in the list display region 5504, based on a search key selected or input. The end button 5505 enables ending the processing performed by the registration tool 21.

In the example of FIG. 17, each record of the client information includes items of "Client ID", "Client name", "Password", "E-mail address (Email)", "Date of last update", "Number of pages disclosed", "Number of pages used", and "Number of pages contracted". The client information may include more items.

The description refers back to FIG. 15. After the menu is displayed at Step S101, the processing is shifted to the next step S102, and the registration tool 21 waits until any one of the tabs 5501a, 5501b, 5501c, and 5501d and the end button 5505 is operated to select a process. If the end button 5505 is operated, the registration tool 21 shifts the processing to Step S103 to perform logout processing for the user, and ends the operation of the registration tool 21.

If the tab 5501a or the tab 5501b is operated at Step S102 to select the user management mode, the registration tool 21 shifts the processing to Step S104. At Step S104, the registration tool 21 displays either a manager list screen or a client list screen (refer to FIG. 17) according to which tab, the tab 5501a or the tab 5501b, has been operated at Step S102. Here, the tab 5501b is assumed to have been operated to display the client list screen 550 illustrated in FIG. 17.

If the "New registration" button or the "Edit" button included in the button group 5502 is operated on the client list screen 550, a client registration/edit screen 510 applicable to the embodiments that is exemplified in FIG. 18 is displayed. In FIG. 18, input regions 5101 to 5108, an "OK" button 5109, and a "Cancel" button 5110 are arranged on the client registration/edit screen 510.

The name of a client to be registered is entered in the input region 5101. The upper limit value of the number of pages usable by the client is entered in the input region 5102. The contact information (e-mail address in this example) of the client is entered in the input region 5103. A client ID for identifying the client is entered in the input region 5104. The password used for authentication is entered in the input region 5105 when the client attempts to use the image search system 10. The input region 5106 is a button for automatically generating an initial value of the password to be entered into the input region 5105. A note is entered into the input region 5107.

The client ID and the password entered into the input regions 5104 and 5105, respectively, are assumed to be registered in the user DB 106 by the user management server 105, for example, in association with the login ID transmitted from the registration terminal 20 to the user management server 105 and entered when the user logged into the registration tool 21.

The module ID 312 associated with the client ID of the client is entered into the input region 5108. The module ID 312 can be manually entered into the input region 5108. This example is not limiting. If the module IDs 312 are already associated with the client ID, the module ID 312 may be selected from among these module IDs 312 associated with the client ID to be entered.

The "OK" button 5109 enables finalizing entries entered into the input regions 5101 to 5108. For example, if the "OK" button 5109 is operated, the registration tool 21 transmits the pieces of information entered into the input regions 5101 to 5108 to the management server 101. The management server 101 receives the pieces of information transmitted from the registration tool 21, and stores the received pieces of information in the contract information DB 16. The "Cancel" button 5110 enables discarding the information entered into the input regions 5101 to 5108 and displaying the client list screen 550.

If an operation is performed indicating the end of the processing on the manager list screen or the client list screen 550, the registration tool 21 returns the processing to Step S101 to display the screen including the menu region 5500.

Figure 19:
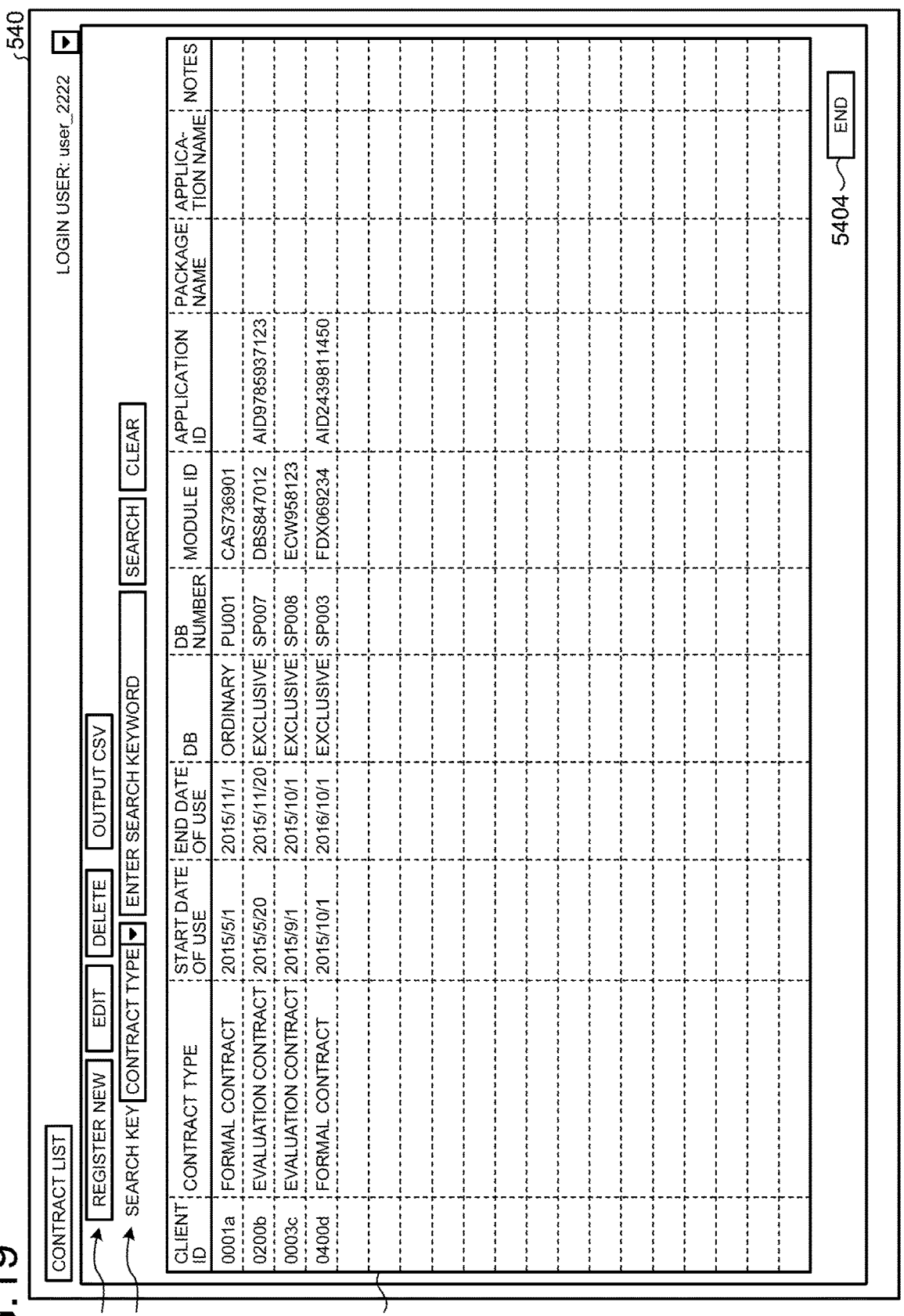
FIG. 19 is a diagram illustrating an example of a contract list screen applicable to the embodiments.

If the tab 5501d is operated at Step S102 to select the module information registration mode, the registration tool 21 shifts the processing to Step S106. At Step S106, the registration tool 21 displays a contract list screen 540 applicable to the embodiments as exemplified in FIG. 19. In FIG. 19, a button group 5401, a search input section 5402, a list display region 5403, and an end button 5404 are arranged on the contract list screen 540. If the end button 5404 is operated, the registration tool 21 returns the processing to Step S101 to display the screen including the menu region 5500.

The list display region 5403 is used for displaying the list of the contract information registered in the management server 101 (contract information DB 16). In the example of FIG. 19, each record in the list displayed in the list display region 5403 is created, for example, on a campaign-by-campaign basis, and includes items of "Client ID", "Contract type", "Start date of use", "End date of use", "Database (DB)", "DB number", "Module ID", "Application ID", "Package name", "Application name", and "Notes". The management server 101 stores the information included in the record in the contract information DB 16. The registration tool 21 communicates with the management server 101 to acquire the contract information stored in the contract information DB 16 and displays the acquired contract information in the list display region 5403.

The button group 5401 includes four buttons, and the respective buttons are assigned functions of "New registration", "Edit", "Delete", and "CSV output" in order from the left. The "New registration" button enables newly adding a record to the list displayed in the list display region 5403. The "Edit" button enables editing information in a record selected in the list displayed in the list display region 5403. The "Delete" button enables deleting the information in the record selected in the list displayed in the list display region 5403. The "CSV output" enables outputting information in the list displayed in the list display region 5403 as a text file in the CSV format.

Figure 20:
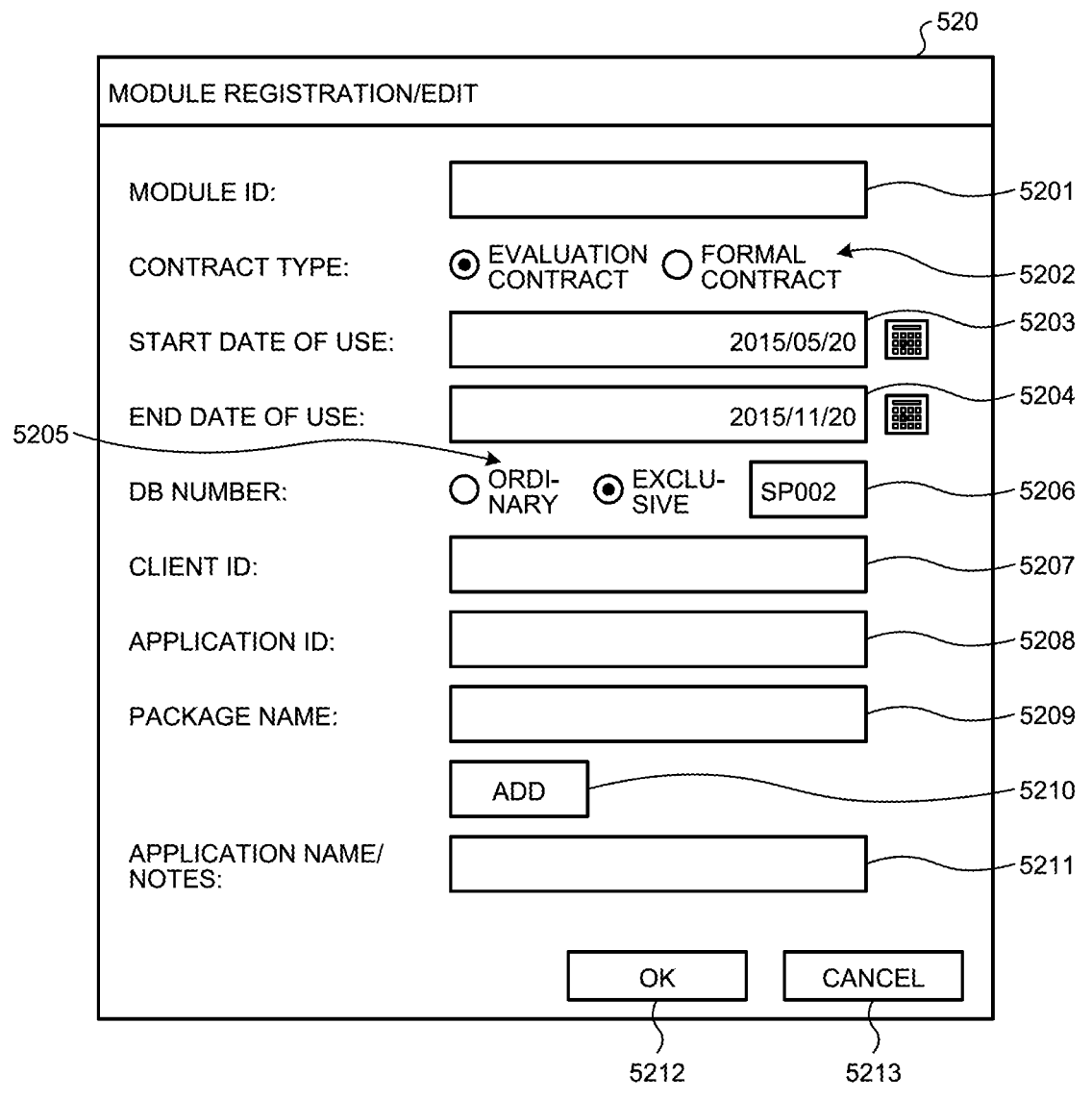

If the "New registration" button or the "Edit" button included in the button group 5401 is operated, a module registration/edit screen 520 applicable to the embodiments that is, for example, exemplified in FIG. 20 is displayed as a screen for newly registering or editing the contract information. In FIG. 20, input regions 5201 to 5211, an "OK" button 5212, and a "Cancel" button 5213 are arranged on the module registration/edit screen 520.

The module ID of the image search module provided to the customer by the service provider is entered into the input region 5201.

Values unique to the respective image search modules 311 provided by the image search system 10 is used as the module IDs 312. For example, the management server 101 uniquely generates each of the module IDs 312. The management server 101 transmits the generated module ID 312 to the registration tool 21. Upon receiving the module ID 312 transmitted from the management server 101, the registration tool 21 enters the received module ID 312 into the input region 5201. This example is not limiting, and the module ID 312 may be manually entered. For example, a contract is made with the customer with respect to each module ID 312.

The contract pattern (contract type) is entered into the input region 5202. In this example, two patterns of contract, that is, an evaluation contract and a formal contract are prepared as the contract patterns. The evaluation contract is of a contract pattern that the customer uses to evaluate the image search system 10, and enables the customer to register images in the image search DB 112a serving as a private DB while not enabling the customer to perform the disclosure processing. The formal contract is a contract that defines a wider scope of authority than the evaluation contract, and enables the customer to register images in the image search DB 112a serving as a private DB and in the image search DB 112b serving as a public DB. The formal contract enables the customer to perform both the disclosure processing and the non-disclosure processing. The evaluation contract or the formal contract is exclusively entered into the input region 5202.

The start date of use and the end date of use, respectively, of the module ID 312 entered into the input region 5201, that is, those of the image search module 311 corresponding to the module ID 312 are entered into the input regions 5203 and 5204. The image search module 311 is made usable within a period from the date entered into the input region 5203 to the date entered into the input region 5204 and is made unusable outside the period. The start date of use and the end date of use correspond to the start date and the end date of the contract for the image search module 311.

The input regions 5205 and 5206 are used for specifying a DB to be used for the image search by the image search module 311 corresponding to the module ID 312 entered into the input region 5201. The input region 5205 is used for specifying which pair, the pair of the ordinary DBs 111a and 111b or any one of the pairs of the exclusive DBs $110a_1$ and $110b_1$, $110a_2$ and $110b_2$, and so on, is used. Entering "Ordinary" specifies the pair of the ordinary DBs 111a and 111b. In contrast, entering "Exclusive" specifies any one of the pairs of the exclusive DBs $110a_1$ and $110b_1$, $110a_2$ and $110b_2$, and so on.

The input region 5206 is used for entering the DB number of the specified pair of DBs. For example, with reference to FIG. 4, if the "Exclusive" is entered into the input region 5205 and the "SP002" is entered into the input region 5206, the pair of the exclusive DBs $110a_2$ and $110b_2$ is specified. If the "Ordinary" is entered into the input region 5205, for example, the DB number assigned to the pair of the ordinary DBs 111a and 111b is automatically entered. A different number is provided as the DB number from the service provider to each customer according to the contract.

A client ID for identifying a customer associated with this contract information is entered into the input region 5207.

The application ID 310a is entered into the input region 5208. The input region 5208 may be left blank. Entering the application ID 310a of the image search application 301a into the input region 5208 enables filtering to find the image search application 301a corresponding to the entered application ID 310a.

The input regions 5209 to 5211 are used for entering optional information, and can be left with no entry. The input region 5209 is used for entering, for example, a package name of the image search application 301a incorporating the image search module 311 including the module ID 312 entered into the input region 5201. The name of the image search application 301a or any note is entered into the input region 5211. The input region 5210 is an "Add" button, which adds the input region 5211.

The "OK" button 5212 finalizes entries entered into the input regions 5201 to 5211. For example, if the "OK" button 5212 is operated, the registration tool 21 transmits the pieces of information entered into the input regions 5201 to 5211, as contract information, to the management server 101. The management server 101 receives the contract information transmitted from the registration tool 21, and stores the received contract information in the contract information DB 16. The "Cancel" button 5213 discards the pieces of information entered into the input regions 5201 to 5211, and, for example, returns the processing to Step S101 to display the screen including the menu region 5500.

Referring back to FIG. 15, if the tab 5501c is operated at Step S102 to select the image registration mode, the registration tool 21 shifts the processing to Step S105. At Step S105, the registration tool 21 displays, on the registration terminal 20, a registered information list screen indicating information on registered campaigns.

FIG. 21 illustrates an example of a registered information list screen 560 applicable to the embodiments that is displayed at Step S105. In FIG. 21, a new registration button 5601a, an edit button 5601b, a delete button 5601c, a disclosure setting button 5601d, a search input section 5602, a list display region 5603, and an end button 5604 are arranged on the registered information list screen 560.

The list display region 5603 is used for displaying a list of campaign information registered in the management server 101 (contract information DB 16). In the example of FIG. 21, each record in the list displayed in the list display region 5603 includes items of "Campaign name", "Client name", "Client ID", "Number of pages disclosed", "Number of pages used", "Date of last update", "State", "Module ID", and "Notes". The management server 101 stores the information included in the record in the contract information DB 16. The registration tool 21 communicates with the management server 101 to acquire the campaign information stored in the contract information DB 16 and displays the acquired campaign information in the list display region 5603.

The new registration button 5601a newly adds a record to the list displayed in the list display region 5603. The edit button 5601b edits information in a record selected in the list displayed in the list display region 5603. The delete button 5601c deletes the information in the record selected in the list displayed in the list display region 5603. The disclosure setting button 5601d sets the state of a record selected in the list displayed in the list display region 5603 to either of the disclosed and undisclosed states.

After the registered information list screen 560 is displayed at Step S105, the registration tool 21 shifts the processing to Step S110 to wait for an operation on any one of the buttons 5601a to 5601d and the end button 5604. The following describes processing corresponding to the operations on the respective buttons in connection with points (1) to (5) given below.

(1) If the end button 5604 is operated at Step S110, the registration tool 21, for example, returns the processing to Step S101 to display the screen including the menu region 5500.

(2) If, at Step S110, the disclosure setting button 5601d is operated while a record is selected in the list display region 5603, the registration tool 21 shifts the processing to Step S119. At Step S119, the registration tool 21 determines, based on the module ID included in the record, whether the campaign in the selected record can be disclosed.

For example, the registration tool 21 requests, from the management server 101, contract information including a module ID that is the same as the module ID included in the selected record among the contract information registered in the contract information DB 16. The registration tool 21 determines that the campaign is disclosable if the contract pattern is the formal contract and the current date is within the contract period according to the contract information transmitted from the management server 101 in response to the request. The registration tool 21 determines that the campaign is undisclosable if the contract pattern is the evaluation contract or the current date is outside the contract period.

If the campaign is determined to be undisclosable at Step S119 ("No" at Step S119), the registration tool 21 returns the processing to Step S101 to display the screen including the menu region 5500. If, instead, the campaign is determined to be disclosable at Step S119 ("Yes" at Step S119), the registration tool 21 shifts the processing to Step S120.

At Step S120, the registration tool 21 displays a disclosure setting screen for setting the campaign indicated by the selected record to be disclosed or undisclosed.

Figure 22:
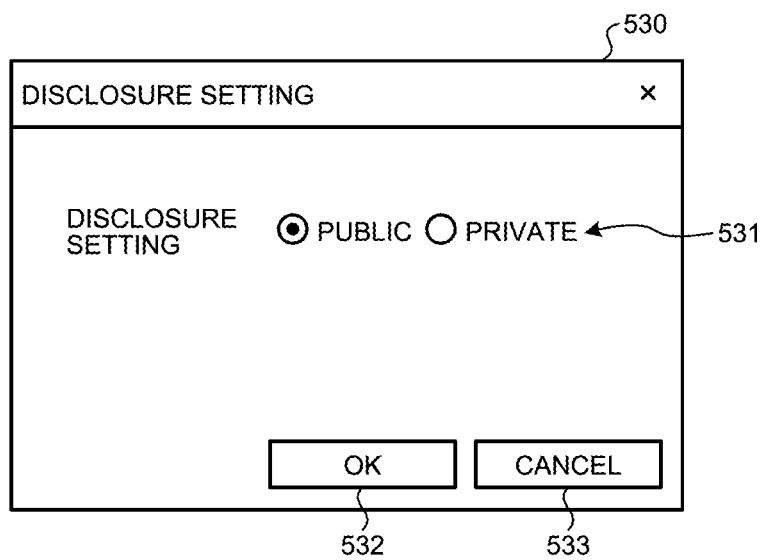
FIG. 22 is a diagram illustrating an example of a disclosure setting screen applicable to the embodiments.

FIG. 22 illustrates an example of the disclosure setting screen applicable to the embodiments. In FIG. 22, an input region 531, an "OK" button 532, and a "Cancel" button 533 are arranged on a disclosure setting screen 530. Whether it is to be disclosed or undisclosed is exclusively entered into the input region 531. Here, the value of the item "State" in the selected record is set as the initial value of the input region 531. The "OK" button 532 finalizes the value entered into the input region 531.

For example, if the "OK" button 532 is operated, the registration tool 21 sets the record to a disclosure state that has been set to be disclosed or undisclosed according to the entry to the input region 531. Images included in a campaign indicated by a record with the disclosure state set to be disclosed serve as images to be disclosed, and images included in a campaign indicated by a record with the disclosure state set to be undisclosed serve as images to be undisclosed. After the disclosure state is set, the registration tool 21 updates the display of the list display region 5603, and returns the processing to Step S105. If the "Cancel" button 533 is operated, the registration tool 21 returns the disclosure state of the record to the state before the disclosure setting screen 530 was displayed, and returns the processing to Step S105.

(3) If, at Step S110, the delete button 5601c is operated while a record is selected in the list display region 5603, the registration tool 21 shifts the processing to Step S121. At Step S121, the registration tool 21 deletes the information in the selected record. At this time, the registration tool 21 preferably displays a confirmation screen asking, for example, whether the record really should be deleted, and/or whether information on images associated with the record should also be deleted with the record. After the record is deleted, the registration tool 21 updates the display of the list display region 5603, and returns the processing to Step S105.

(4) If the edit button 5601b is operated at Step S110, the registration tool 21 shifts the processing to Step S122. At Step S122, the registration tool 21 acquires images included in the campaign indicated by the record selected in the list displayed in the list display region 5603 of the registered information list screen 560 from the registration server 104. If linkage information is associated with the acquired images, the registration tool 21 also acquires this linkage information. After acquiring the images and the linkage information, the registration tool 21 shifts the processing to Step S124.

(5) If the new registration button 5601a is operated at Step S110, the registration tool 21 shifts the processing to Step S123 to execute registration processing for a new campaign. At Step S123, the registration tool 21 displays a campaign registration screen for newly registering a campaign.

Figure 23:
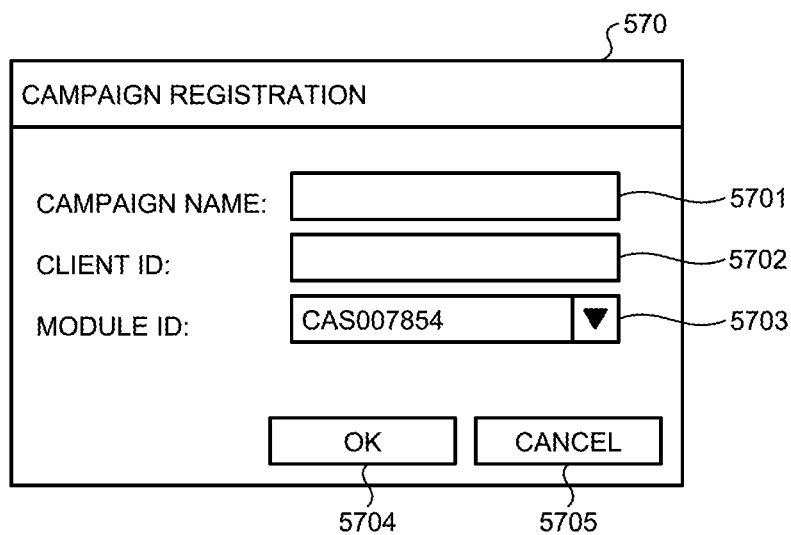
FIG. 23 is a diagram illustrating an example of a campaign registration screen applicable to the embodiments.

FIG. 23 illustrates an example of the campaign registration screen applicable to the embodiments. In FIG. 23, input regions 5701 to 5703, an "OK" button 5704, and a "Cancel" button 5705 are arranged on a campaign registration screen 570. A campaign name is entered into the input region 5701. A client ID for identifying a person/organization (customer) who runs a newly registered campaign is entered into the input region 5702. Values entered into the input regions 5701 and 5702 serve as values of the item "Campaign name" and the item "Client ID", respectively, in the record.

The module ID 312 is entered into the input region 5703. In this case, the module ID 312 associated with the client ID entered into the input region 5702 is entered into the input region 5703. For example, the input region 5703 may be configured such that, if the module IDs 312 are already associated with the client ID, the module ID 312 can be selected from among these module IDs 312 associated with the client ID to be entered.

For example, assume that the client ID entered into the input region 5702 is associated with a first module ID 312 and a second module ID 312, the first module ID 312 corresponding to "Ordinary" specified in the input region 5205 in FIG. 20, the second module ID 312 corresponding to "Exclusive" and "SP002", which indicates the exclusive DBs 110$a_2$ and 110$b_2$, specified in the input region 5205 and the input region 5206, respectively, in FIG. 20. In this case, either one of the first module ID 312 and the second module ID 312 is selected and entered into the input region 5703, so that where to register the campaign can be specified to be either of the pair of the ordinary DBs 111a and 111b and the pair of the exclusive DBs 110$a_2$ and 110$b_2$ in accordance with the entered module ID 312.

If the "OK" button 5704 is operated, the registration tool 21 finalizes the values entered into the input regions 5701 to 5703 on the campaign registration screen 570, and uses the finalized values to add a record to the list display region 5603 on the registered information list screen 560. The registration tool 21 then shifts the processing to Step S124. If, instead, the "Cancel" button 5705 is operated, the registration tool 21 discards the values entered into the input regions 5701 to 5703 and, for example, returns the processing to Step S105.

Figure 24:
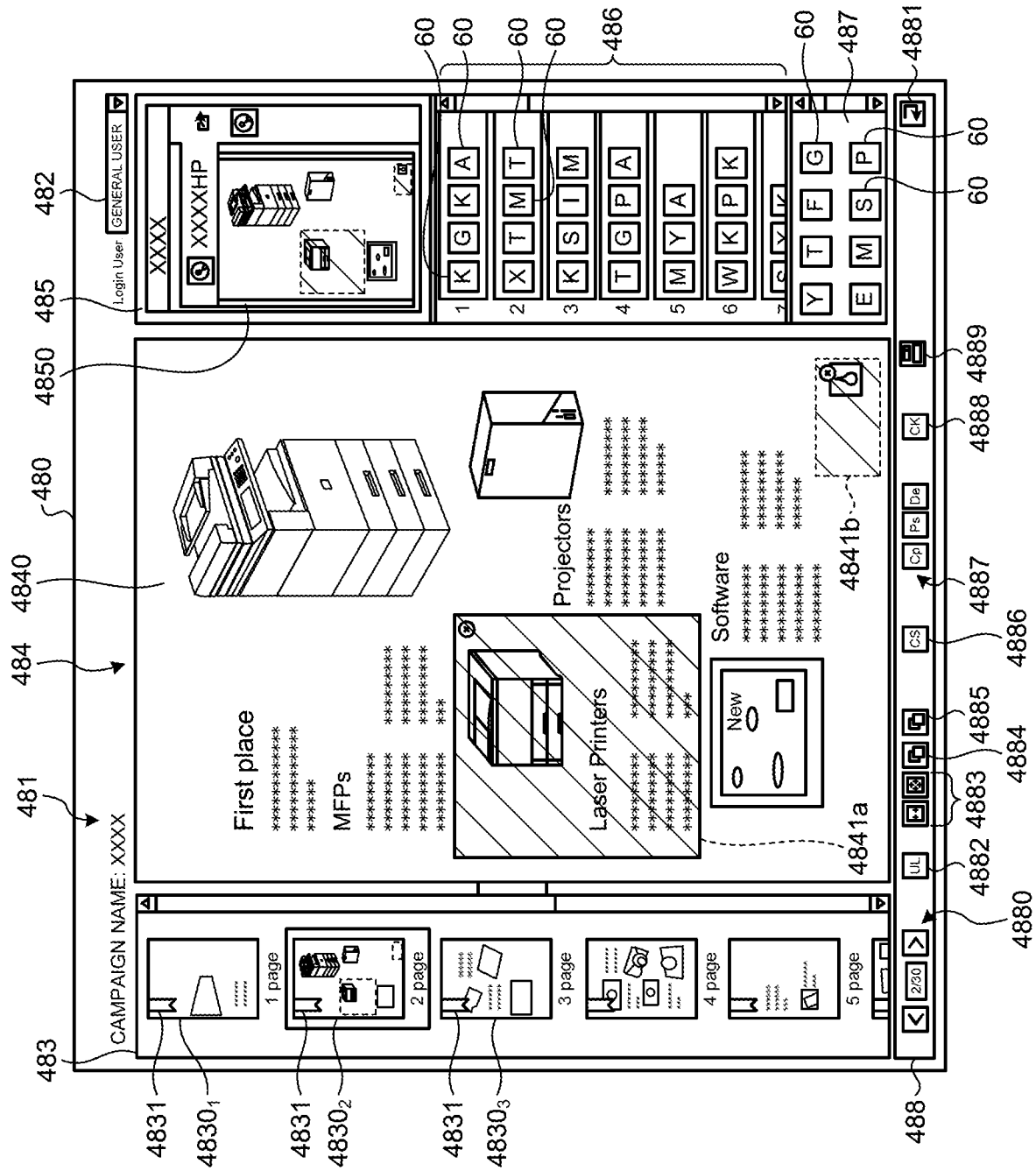
FIG. 24 is a diagram illustrating an example of an edit screen applicable to the embodiments.

At Step S124, the registration tool 21 uses a display of the registration terminal 20 to display an edit screen for editing information about the campaign. FIG. 24 illustrates an example of the edit screen applicable to the embodiments. In FIG. 24, an edit screen 480 includes a header region 481, a thumbnail display region 483, a page edit region 484, a preview region 485, a target area list region 486, a link icon list region 487, and a toolbar 488.

In the header region 481, the name of the campaign subject to the edit on this edit screen 480 is displayed at the left end, and a user menu display section 482 that displays a menu usable on the authority of a user having logged in to the registration tool 21 is placed at the right end.

The thumbnail display region 483 is a region in which thumbnail images obtained by reducing the sizes of images included in the campaign are displayed. For example, if the processing has been shifted from the above-described step S122 for indicating the edit of the campaign information to this step S124, the registration tool 21 acquires images from the image DB 14 of the registration server 104, the images having been acquired from the registration server 104 at Step S122 and being included in the campaign indicated by the record selected from the list display region 5603. The registration tool 21 reduces the sizes of the acquired images to generate the thumbnail images, and displays them in the thumbnail display region 483. In the example of FIG. 24, thumbnail images $4830_1$, $4830_2$, $4830_3$, and so on are displayed in the thumbnail display region 483.

When the processing has been shifted to this step S124 from the above-described step S123 for indicating new registration of the campaign information, the thumbnail display region 483 is left blank. A scroll bar provided at the right end of the thumbnail display region 483 can be operated to sequentially display, in the thumbnail display region 483, other thumbnail images that have been virtually displayed outside the thumbnail display region 483.

The page edit region 484 displays an image 4840 subject to the edit among the images included in the campaign. For example, the registration tool 21 displays the original image of a thumbnail image selected from among the thumbnail images $4830_1$, $4830_2$, $4830_3$, and so on displayed in the thumbnail display region 483, as the image 4840 in the page edit region 484. In the example of FIG. 24, the thumbnail image $4830_2$ is selected in the thumbnail display region 483, and the original image of this selected thumbnail image $4830_2$ is displayed as the image 4840 in the page edit region 484.

The registration tool 21 is capable of setting the specified range as a target area in response to specification of a range on the image 4840 displayed in the page edit region 484. The range is specified, for example, in accordance with an operation performed by the user on an input device connected to the registration terminal 20. For example, specifying any two points in the image 4840 displayed in the page edit region 484 specifies a rectangular range having the specified two points as diagonal vertices. In the example of FIG. 24, target areas 4841a and 4841b are each set as a rectangular range on the image 4840 in the page edit region 484.

The registration tool 21 generates identification information (such as serial numbers) identifying the respective target areas 4841a and 4841b thus set, and associates the identification information with the respective target areas 4841a and 4841b. The identification information is generated so as to be capable of identifying the target areas throughout the respective images included in the campaign subject to the edit. The registration tool 21 is capable of associating one or more pieces of the linkage information with each of the target areas 4841a and 4841b set in the page edit region 484.

Furthermore, the registration tool 21 appends a marker image 4831 to a thumbnail image from among the thumbnail images $4830_1$, $4830_2$, $4830_3$ and so on displayed in the thumbnail display region 483, the thumbnail image corresponding to an image that has been subjected to some kind of edit, such as specification of a target area, in the page edit region 484 and has not yet been stored.

The preview region 485 displays a preview screen 4850 that emulates a screen of the search terminal 30 on which an image being edited in the page edit region 484 is to be displayed by an application program compatible with this information processing system. The registration tool 21 explicitly displays the target areas 4841a and 4841b set in the page edit region 484 in the preview region 485, for example, in a highlighted manner. The registration tool 21 also displays pieces of information indicating the linkage information set for the respective target areas 4841a and 4841b in a manner such that they correspond to the respective target areas 4841a and 4841b, in the preview region 485.

The target area list region 486 displays a list of the linkage information appended to the target areas set on the images included in the campaign subject to the edit, in the form of icon images 60, 60, and so on. In the example of FIG. 24, the registration tool 21 displays the linkage information in the target area list region 486 collectively with respect to each piece of identification information (each serial number) appended to the corresponding target area. A scroll bar provided at the right end of the target area list region 486, can be operated so as to sequentially display, in the target area list region 486, the linkage information for other target areas virtually displayed outside the target area list region 486.

The link icon list region 487 displays a list of linkage information settable for the target areas using the icon images 60, 60, and so on corresponding to the respective pieces of the linkage information. The registration tool 21 is capable of associating the respective pieces of the linkage information corresponding to the icon images 60 with the target area 4841a in response to: movement of each of the icon images 60 displayed in the link icon list region 487 using what is called a drag-and-drop operation; and superimposition of the icon image 60 on, for example, the target area 4841a set inside the page edit region 484. A plurality of pieces of the linkage information can be associated with one target area.

Furthermore, the icon images 60 that correspond to previously determined pieces of the linkage information are selected in the link icon list region 487, so that pieces of the linkage information, including one for registering the user ID 313 and another related to a content such that whether to permit access thereto is controllable, can be set according to the embodiments. The setting of these pieces of the linkage information according to the embodiments is to be described later.

A scroll bar provided at the right end of the link icon list region 487 can be operated so as to sequentially bring other icon images 60 that have been virtually arranged outside the link icon list region 487 into the link icon list region 487 and display the icon images therein.

When the linkage information is associated with the target area, the icon image 60 indicating the associated linkage information can be displayed at a certain location in the target area. This makes it easy to find out which linkage information is associated with the target area 4841a, which is preferable. The association of the linkage information with the target area is reflected in display of the preview region 485.

A page specifying section 4880 for specifying a page (image) displayed in the page edit region 484 and buttons or button groups 4881 to 4889 for causing execution of various functions included in the registration tool 21 are arranged on the toolbar 488. The button 4881 is a button for returning the screen from the edit screen 480 to the registered information list screen 560.

The button 4882 is a button for uploading an image from the registration terminal 20 to the registration server 104. If the button 4882 is operated, the registration tool 21 uses a display device 203 to display a file selection screen. For example, a standard file selection screen provided by an operating system (OS) that runs on a CPU of the registration terminal 20 is adopted as the file selection screen.

The button group 4883 includes two buttons for adjusting the display size of the image 4840 displayed in the page edit region 484.

The button 4884 is a button for switching the area setting mode of setting an area in the page edit region 484 to a target area setting mode of setting the target area. If an area is set in the image 4840 displayed in the page edit region 484 after an edit mode is switched to the target area setting mode in response to an operation on this button 4884, the registration tool 21 sets the area as the target area.

The button 4885 is a button for switching the area setting mode of specifying an area in the page edit region 484 to a mask setting mode of specifying a mask area from which the feature information is not to be extracted by the analysis unit 12. If an area is set in the image 4840 displayed in the page edit region 484 after the edit mode is switched to the mask setting mode in response to an operation on this button 4885, the registration tool 21 sets the area as the mask area.

The button 4886 is a button for displaying a campaign setting screen for setting details of a campaign. On the campaign setting screen, how to disclose a campaign is set. The term "disclosure" or "to disclose" means operation that the search terminal 30 performs when a certain operation is performed on the search terminal 30. For example, the following can be set as the operation: saving information about the campaign into the search terminal 30; posting information about the campaign on a social networking service (SNS); and displaying information about the campaign using an external application program.

The button group 4887 includes three buttons for executing copy, paste, and deletion of information, respectively.

The button 4888 is a button for requesting execution of similar image check to check whether the image search server 100 has already registered therein an image including a portion similar to a part or the whole of the image (page) 4840 that is currently displayed in the page edit region 484 of the edit screen 480. In the embodiments, the similar image check is executed in such a manner as to check whether images registered in the search server 100 includes the similar image. The registration tool 21 displays, on the display of the registration terminal 20, a search result transmitted from the search server 100. The user can re-edit the image based on this search result.

At this time, for example, the registration tool 21 can request searches for similar images by transmitting, to the search server 100, only images in the target area set as images to be used for the check in accordance with the operation on the button 4884. The registration tool 21 can also exclude, from the images to be used for the check, an image in the mask area set in accordance with the operation on the button 4885. Moreover, the registration tool 21 can also divide the image 4840 currently displayed in the page edit region 484, and request searches for similar images by transmitting the respective divided images to the registration server 104 so as to execute the similar image check for the respective images.

An operation on the button 4889 requests storing the campaign currently being edited on the edit screen 480.

Here, referring back to FIG. 15, an operation on the button 4889 causes the registration tool 21 to shift the processing to Step S125 to start storage processing of the campaign. After starting the storage processing, the registration tool 21 shifts the processing to Step S126 to determine whether the campaign to be stored is a newly registered campaign. If the processing has been shifted from Step S122 described above to this step S126, the registration tool 21 determines that the campaign to be stored is not a newly registered campaign ("No" at Step S126), and shifts the processing to Step S128.

If, instead, the processing has been shifted from Step S123 described above to this step S126, the registration tool 21 determines that the campaign to be stored is a newly registered campaign ("Yes" at Step S126), and shifts the processing to Step S127. At Step S127, the registration tool 21 executes, with respect to images that have target areas set therein among images included in the campaign to be stored, the similar image check by which to determine whether any image that includes a portion similar to a part or the whole of any of the above-described images has already been registered in the search server 100. Upon completion of the similar image check, the registration tool 21 shifts the processing to Step S128.

At Step S128, the registration tool 21 transmits the information about the campaign to the registration server 104, and requests the registration server 104 to update the registered information. For example, the registration tool 21 transmits the images included in the campaign, the pieces of the linkage information associated with the respective images, and metadata of the campaign, to the registration server 104. In response to the request from the registration tool 21, the registration server 104 updates the image DB 14, the linkage information DB 15 that are included in the registration server 104, and a metadata DB, based on the pieces of information transmitted from the registration terminal 20.

After transmitting the request for information update to the registration server 104 at Step S128, the registration tool 21 returns the processing to Step S105.

DB Specifying Method Applicable to Embodiments

Figure 25:
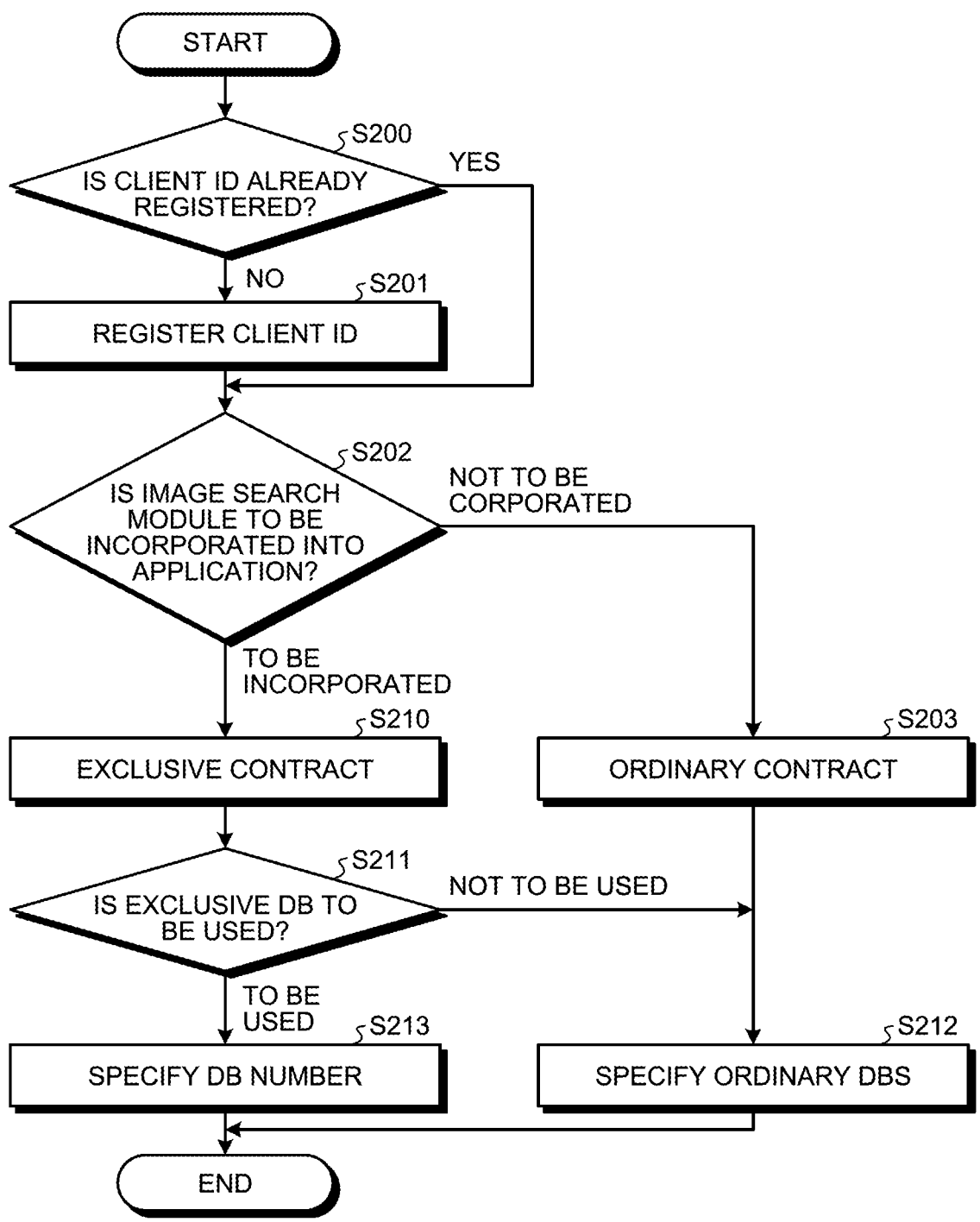
FIG. 25 is an exemplary flowchart for explaining a method for specifying a DB in which an image is to be registered, the method being applicable to the embodiments.

The following schematically describes a method, applicable to embodiments, for specifying a DB in which an image is to be registered, using a flowchart of FIG. 25. For example, the service provider performs processing according to this flowchart of FIG. 25. The processing according to this flowchart of FIG. 25 is executed with respect to each campaign. A contract for using the image search system 10 is assumed to have been concluded in advance in writing or the like between a customer, who is the client, and the service provider.

At Step S200, the service provider determines whether the client ID of the customer under the contract has been registered. For example, the service provider can make an inquiry from the registration terminal 20 to the management server 101 about whether contract information including the client name of the customer under the contract has been registered in the contract information DB 16, and can make this determination based on the result of the inquiry. If the client ID of the customer under the contract is determined to have already been registered ("Yes" at Step S200), the processing is shifted to Step S202.

If, instead, the client ID of the customer under the contract is determined to have not been registered ("No" at Step S200), the processing is shifted to Step S201. At Step S201, the service provider registers the client ID for identifying this customer. For example, the service provider uses the registration terminal 20 to display the client registration/edit screen 510 illustrated in FIG. 18 and enters pieces of information including the client ID of the customer into the input region 5104.

Based on the contract information, the service provider uses, for example, the module registration/edit screen 520 in FIG. 20 to set the module ID 312 that is to be associated with this client ID when the customer assigned this client ID uses the image search module 311, and further enters the module ID 312 thus set into the input region 5108 on the client registration/edit screen 510. The "OK" button 5109 is then operated on the client registration/edit screen 510, so that the pieces of information including the client ID of the customer are registered in the contract information DB 16.

After the client ID is registered at Step S201, the processing is shifted to Step S202. At Step S202, the service provider determines, based on the contract information, whether the customer under the contract is to incorporate the image search module 311 into another application program (application). This other application is, for example, an application provided by the customer.

At Step S202, if the image search module 311 is determined not to be incorporated into the other application ("Not to be incorporated" at Step S202), the processing is shifted to Step S203, and the contract with the customer under the contract is determined to be an ordinary contract. The processing is then shifted to Step S212.

At Step S202 described above, if the image search module 311 is determined to be incorporated into the other application ("To be incorporated" at Step S202), the processing is shifted to Step S210, and the contract with the customer under the contract is determined to be an exclusive contract. At the next step S211, a determination is made as to whether to use an exclusive DB. If no exclusive DB is determined to be used ("Not to be used" at Step S211), the service provider specifies the ordinary DBs 111a and 111b as DBs in which an image is to be registered by the customer under the contract (Step S212).

If, instead, an exclusive DB is determined to used ("To be used" at Step S211), the service provider specifies, for the customer under the contract, the DB number of a DB that is set as a registration target DB from among the pairs of the exclusive DBs $110a_1$ and $110b_1$, the exclusive DBs $110a_2$ and $110b_2$, and so on (Step S213).

The service provider can set a used DB flag for the campaign according to the results of Step S212 and Step S213 described above. As a value of the used DB flag, "Ordinary" is used if Step S212 is executed, or "Exclusive" is used if Step S213 is executed. This example is not limiting, and the DB number of a specified DB may be used as the used DB flag.

Search Processing from Search Terminal, Applicable to Embodiments

Figure 26:
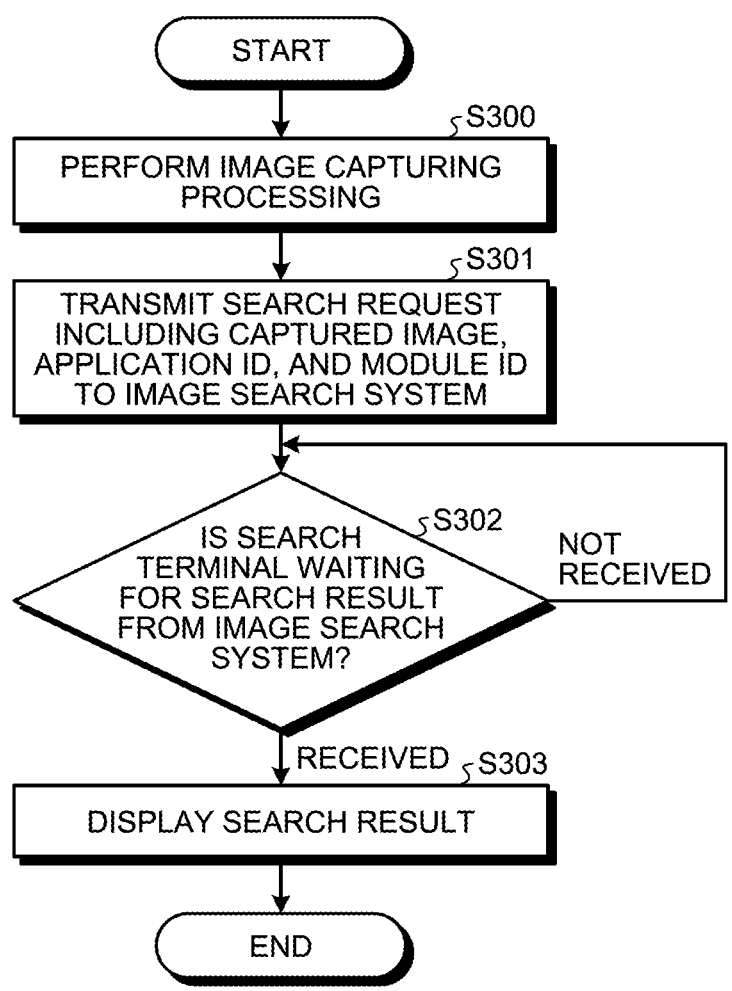
FIG. 26 is an exemplary flowchart illustrating search processing to be executed from the search terminal, the search processing being applicable to the embodiments.

The following describes search processing, applicable to the embodiments, to be executed from the search terminal 30. FIG. 26 is an exemplary flowchart illustrating search processing to be executed from the search terminal 30, the search processing being applicable to the embodiments. At Step S300, the search terminal 30 performs the image capturing processing in response to a user operation. At the next step S301, the search terminal 30 transmits, to the image search system 10, a search request including a captured image and including the application ID 310 and the module ID 312 that are included in the image search application 301. This search request is received by the management server 101 in the image search system 10.

At the next step S302, the search terminal 30 waits for reception of a search result from the image search system 10. If no search result has been received ("Not received" at Step S302), the processing of Step S302 is repeated. If any search result is received from the image search system 10 ("Received" at Step S302), the search terminal 30 shifts the processing to Step S303 to display the received search result.

Upon completion of the processing at Step S303, the sequence of search processing steps to be performed by the search terminal 30 ends.

Figure 27:
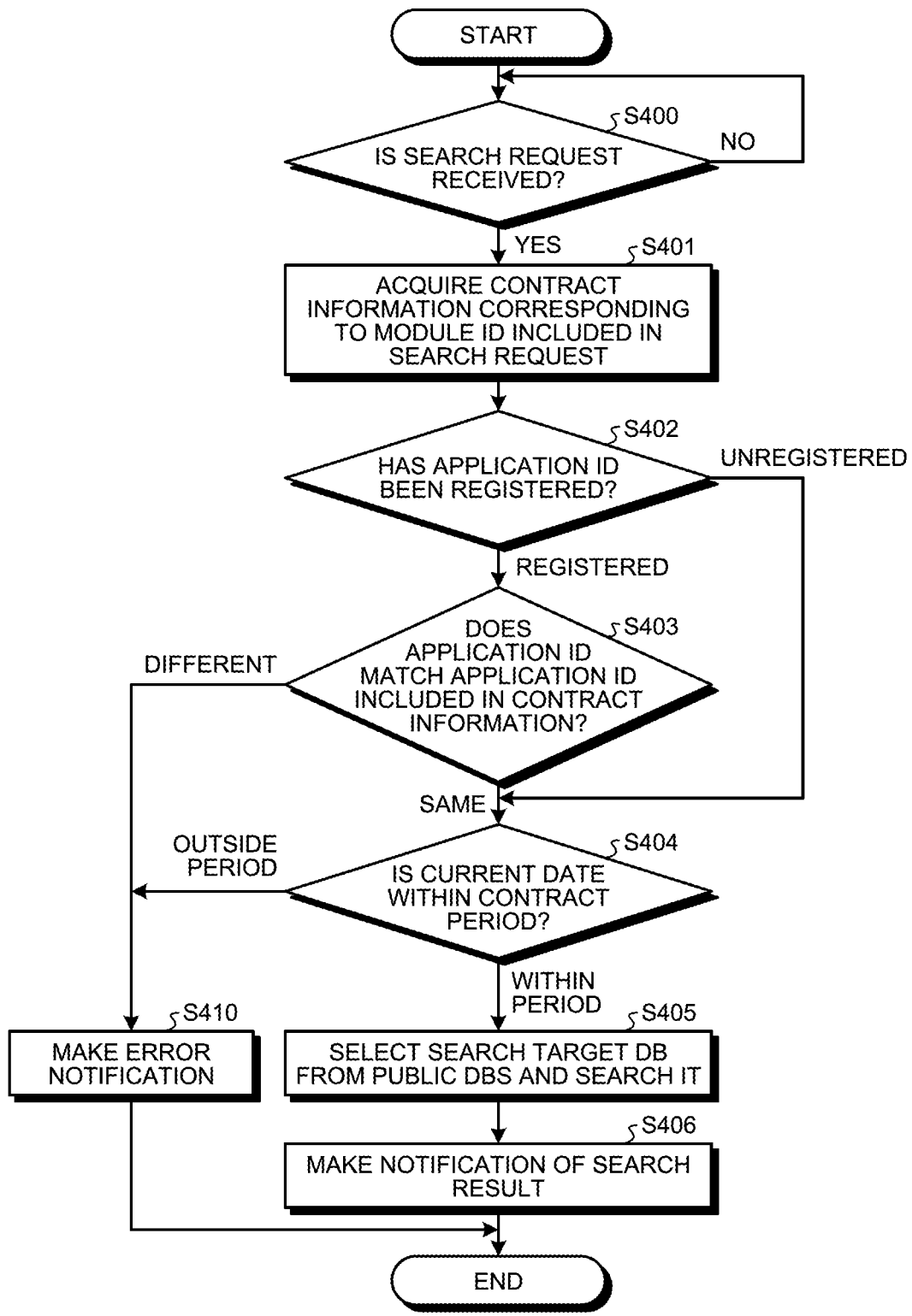
FIG. 27 is an exemplary flowchart illustrating processing related to a search to be made by the management server in response to a search request from the search terminal, the processing being applicable to the embodiments.

The following describes processing related to a search to be made by the management server 101 in response to a search request from the search terminal 30, the processing being applicable to the embodiments. FIG. 27 is an exemplary flowchart illustrating processing related to a search to be made by the management server 101 in response to a search request from the search terminal 30, the processing being applicable to the embodiments. At Step S400, the management server 101 determines whether the search request has been received from the search terminal 30. If the search request is determined not to have been received ("No" at Step S400), the management server 101 repeats the processing of Step S400. If, instead, the search request is determined to have been received from the search terminal 30 ("Yes" at Step S400), the management server 101 shifts the processing to Step S401.

At Step S401, the management server 101 acquires, from the contract information DB 16, the contract information corresponding to the module ID 312 included in the received search request. At the next step S402, the management server 101 determines whether the application ID 310 has been registered in the contract information. If the application ID 310 is determined not to have been registered in the contract information ("Unregistered" at Step S402), the management server 101 shifts the processing to Step S404. If, instead, the application ID 310 is determined to have been registered in the contract information ("Registered" at Step S402), the management server 101 shifts the processing to Step S403.

At Step S403, the management server 101 determines whether the application ID 310 included in the contract information is the same as the application ID 310 included in the image search application 301 installed on the search terminal 30. If the application IDs 310 are determined not to be the same ("Different" at Step S403), the management server 101 shifts the processing to Step S410 to transmit an error notification indicating that the application IDs are not the same, to the search terminal 30, and ends the sequence of processing steps according to the flowchart of FIG. 27.

If, instead, the application IDs 310 are determined to be the same at Step S403 ("Same" at Step S403), the management server 101 shifts the processing to Step S404.

At Step S404, the management server 101 determines whether the current date is within the contract period based on the start date of use and the end date of use included in the contract information acquired at Step S401. If the current date is determined to be outside the contract period ("Outside period" at Step S404), the management server 101 shifts the processing to Step S410 to transmit an error notification indicating that the current date is outside the contract period, to the search terminal 30, and ends the sequence of processing steps according to the flowchart of FIG. 27.

If, instead, the current date is determined to be within the contract period at Step S404 ("Within period" at Step S404), the management server 101 shifts the processing to Step S405. At Step S405, the management server 101 sets a public DB as a search target of the search terminal 30 that has transmitted the search request, and switches the switch units 121 and 120b so as to select the search target DB from among the ordinary DB 111b and the exclusive DBs $110b_1$, $110b_2$, and so on based on the contract information corresponding to the module ID 312 included in the search request. The search server 100 performs the image search on the selected search target DB. The search request may be transferred from the management server 101 to the search server 100, or may have been held in, for example, the switch unit 121.

At the next step S406, the search server 100 notifies, of the search result, the search terminal 30 that has transmitted the search request, and then ends the sequence of processing steps according to the flowchart of FIG. 27.

Example of Displaying Image Search Result on Search Terminal

Figure 28:
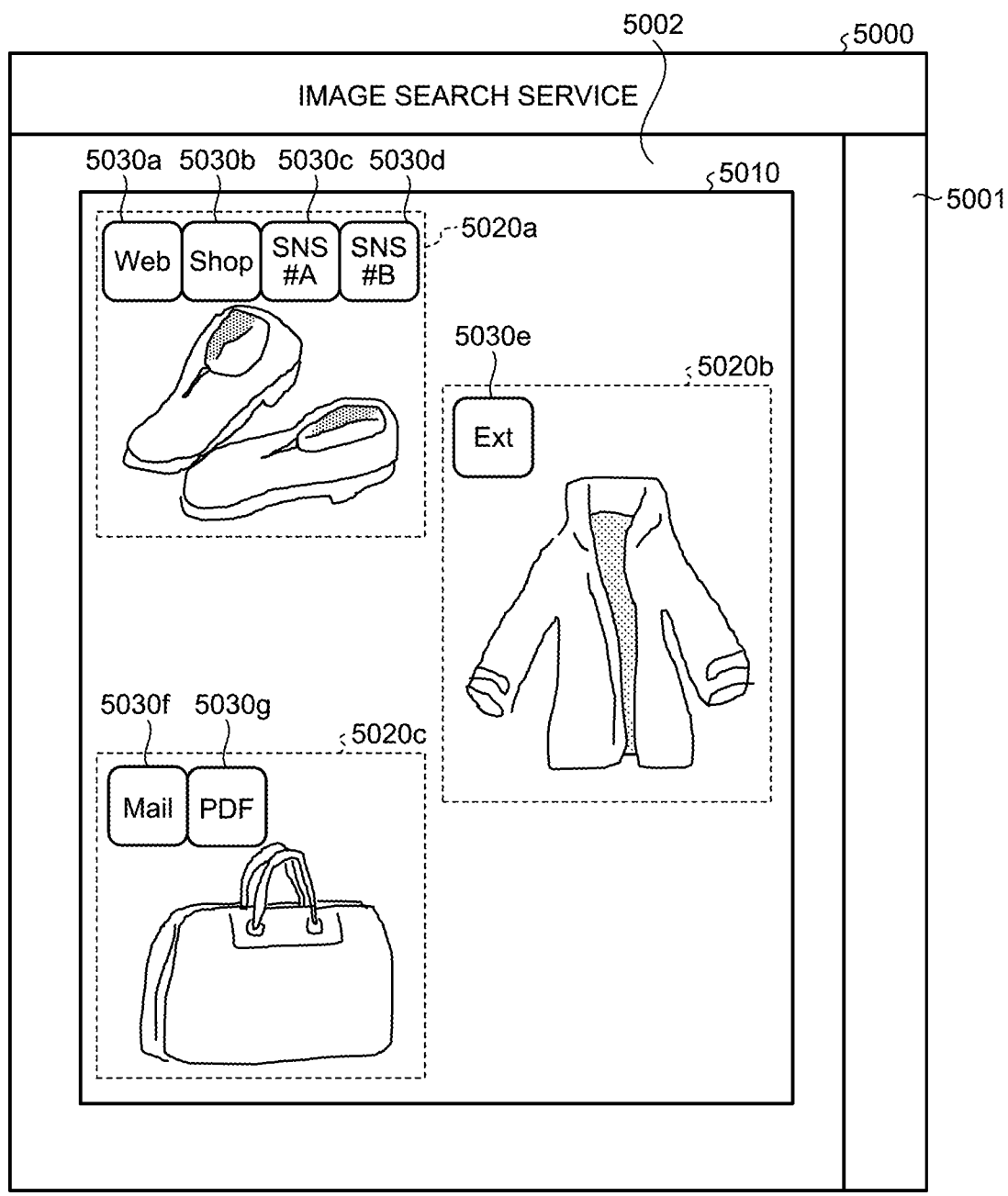
FIG. 28 is a diagram illustrating an example of a browse screen for displaying a search result, the browse screen being applicable to the embodiments.
Figure 29:
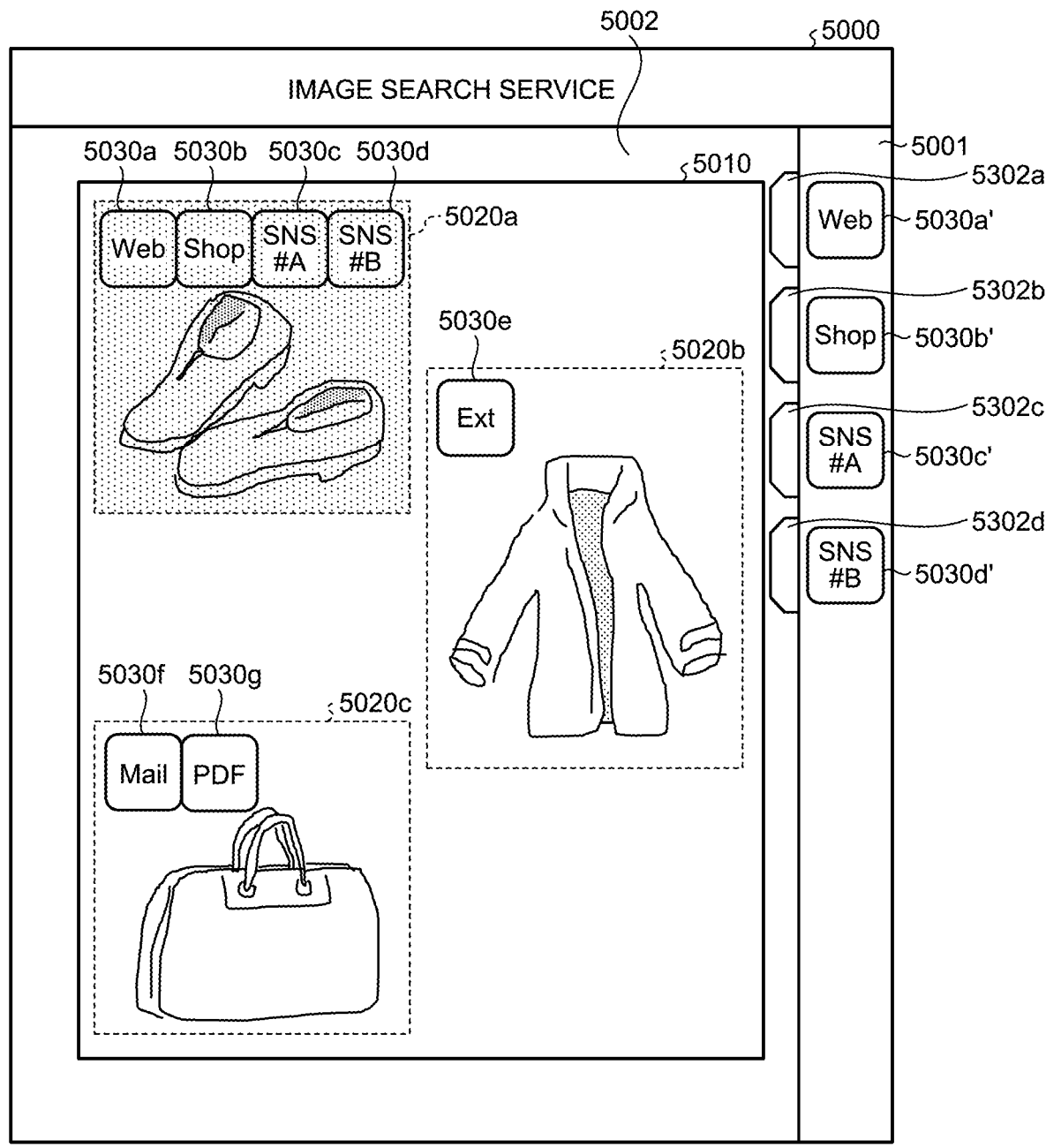
FIG. 29 is a diagram illustrating an exemplary consequence of specifying a target area on the browse screen applicable to the embodiments.
Figure 30:
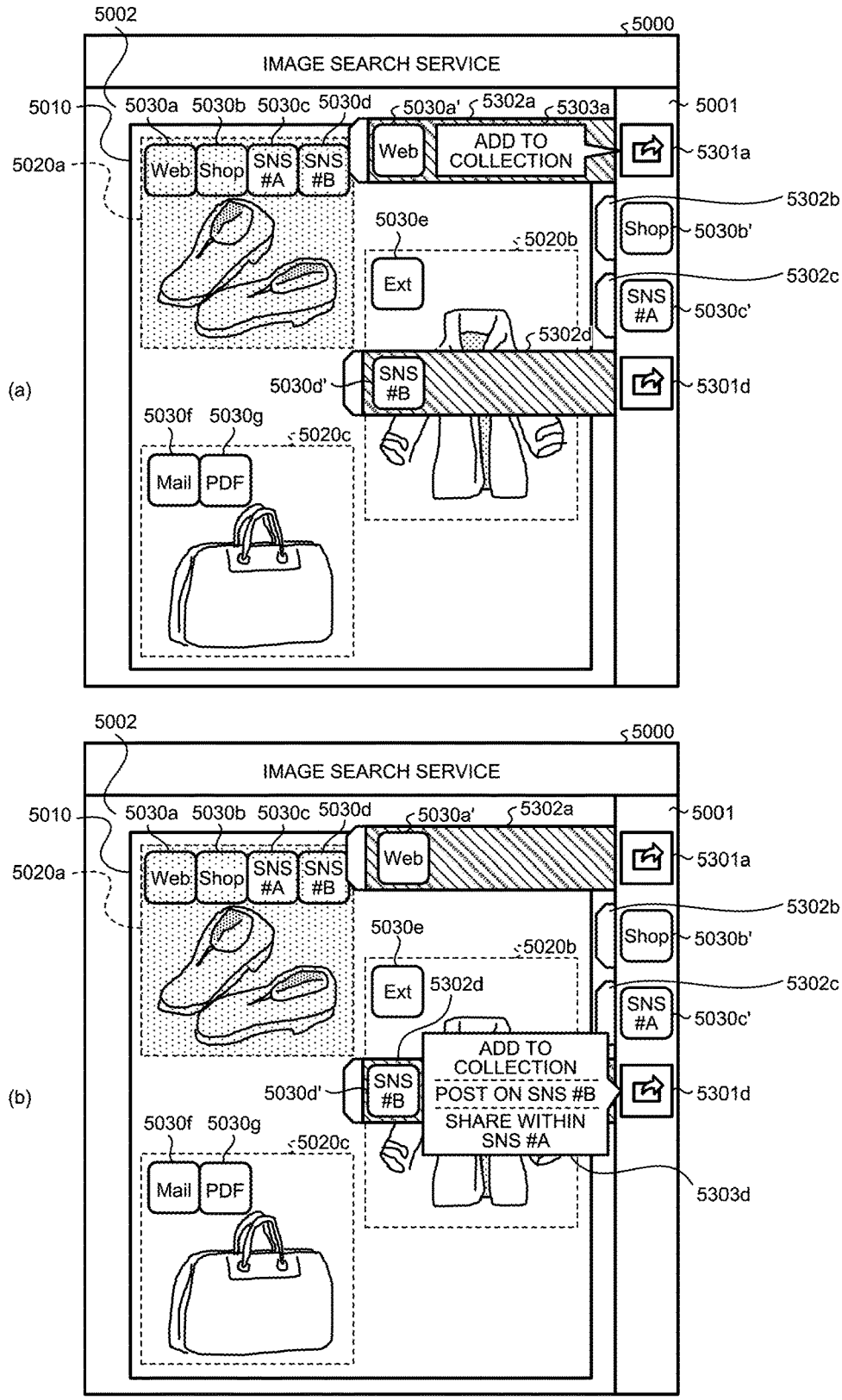
FIG. 30 is a diagram illustrating exemplary consequences of operating tabs on the browse screen applicable to the embodiments.

Using FIG. 28 to FIG. 30, the following describes an example of displaying, on the search terminal 30, the search result transmitted to the search terminal 30 at Step S406 in the above-described flowchart of FIG. 27.

As described above, in the image search system 10, the linkage information has been associated with each target area specified within an image, and information on the association between this target area and the linkage information has been described with an XML code. As a result of the image search, the image search system 10 transmits the search result including this XML code to the search terminal 30. The search terminal 30 uses the search result reception unit 3113 inside the image search module 311 included in the image search application 301 to receive, via the communication unit 333, the XML code included in the search result transmitted from the image search system 10. The search result reception unit 3113 transfers the received search result to the display information generation unit 3114. The display information generation unit 3114 generates display information to be used for displaying a browse screen based on the XML code included in the transferred search result and transfers the display information to the display unit 336. The display unit 336 displays the browse screen on the display device 3004 in accordance with the transferred display information.

FIG. 28 is a diagram illustrating an example of the browse screen applicable to the embodiments, which is displayed according to the display information generated by the display information generation unit 3114. In FIG. 28, the browse screen 5000 includes a link display region 5001 and a page image display region 5002. The page image display region 5002 is a region in which a page 5010 according to the XML code is displayed. The size of the page may be fixed, or may be included in the XML code. The display information generation unit 3114 displays target areas 5020a, 5020b, and 5020c in accordance with description in the XML code.

The display information generation unit 3114 displays images in the respective target areas 5020a, 5020b, and 5020c, the images having been acquired in accordance with pieces of the link information described in the XML code. This example is not limiting, and, when the XML code includes image data, the display information generation unit 3114 can display images according to the image data in the target areas 5020a, 5020, and 5020c.

The display information generation unit 3114 further displays icon images 5030a to 5030g in the target areas 5020a, 5020b, and 5020c, the respective icon images 5030a to 5030g indicating pieces of the linkage information associated with the target areas 5020a, 5020b, and 5020c. In the example of FIG. 28, the four icon images 5030a to 5030d are displayed in the target area 5020a, which indicates that four pieces of the linkage information are associated with the target area 5020a. Similarly, the icon image 5030f and 5030g are displayed in the target area 5020c, which indicates that two pieces of the linkage information are associated with the target area 5020c. Furthermore, the icon image 5030e is displayed in the target area 5020b, which indicates that one piece of the linkage information is associated with the target area 5020b.

While the browse screen 5000 is being thus displayed, operating the input device 3007 to specify one of the target areas enables the user to use any piece of the linkage information associated with the specified target area. FIG. 29 illustrates an exemplary consequence of specifying the target area 5020a on the browse screen 5000 in FIG. 28. In the example of FIG. 29, the target area 5020a specified is highlighted. When the input acceptance unit 3115 receives an operation on the input device 3007 that specifies the target area 5020a, the display information generation unit 3114 displays icon images 5030a', 5030b', 5030c', and 5030d' indicating the respective pieces of the linkage information associated with the specified target region 5020a, in the link display region 5001. These icon images 5030a' to 5030d' correspond to the respective icon image 5030a to 5030d.

The display information generation unit 3114 further displays tabs 5302a, 5302b, 5302c, and 5302d at positions in the page image display region 5002 that correspond to the respective icon images 5030a', 5030b', 5030c', and 5030d'. When each of the tabs 5302a, 5302b, 5302c, and 5302d is operated, a piece of the linkage information indicated by the icon image corresponding to the operated tab is turned usable.

FIG. 30 (a) and FIG. 30 (b) illustrate exemplary consequences of operating the tabs 5302a and 5302d on the display of FIG. 29. In these examples, when the tab 5302a is operated, for example, the image of the tab 5302a is changed into an image such that the tab 5302a appears as if having been elongated toward the page image display region 5002. The icon image 5030a' corresponding to this tab 5302a is displayed in a front-end portion of the elongated image of the tab 5302a. The same applies to the tab 5302d. In the link display region 5001, icon images 5301a and 5301d for specifying intentions to use functions indicated by the respective icon images 5030a' and 5030d' are displayed at positions in which the icon images 5030a' and 5030d' have been displayed. The linkage information indicated by the icon image 5030a' corresponding to the tab 5302a is found available if the image of the operated tab 5302a is thus changed.

A consideration is given to an exemplary case in which, while the image search application 301b is specified as an application program to be started up for the icon image 5030a', a piece of the linkage information indicated by the icon image 5030a' specifies the piece of the linkage information in a manner such that the piece of the linkage information can be stored in the search terminal 30. In this case, as illustrated in FIG. 30 (a), the display information generation unit 3114 displays a message 5303a "Add to collection" on the tab 5302a, thereby prompting the user to store the linkage information indicated by the icon image 5030a' in the search terminal 30. When the input acceptance unit 3115 accepts an operation on the icon image 5301a, the display information generation unit 3114 stores the linkage information indicated by the icon image 5030a', for example, in the storage 3005 in the search terminal 30.

A consideration is given to another exemplary case in which, while the image search application 301' is specified as an application program to be started up for the icon image 5030d', pieces of the linkage information indicated by the icon image 5030d' specify: storing these pieces of the linkage information in the search terminal 30; sharing them in an SNS #A; and posting them on an SNS B. In this case, the display information generation unit 3114 displays a message 5303d that enables selection from "Add to collection", "Post on SNS 14 #B", and "Share within SNS #A" on the tab 5302d, thereby prompting the user to select any of the processes, as exemplified in FIG. 30 (b). The display information generation unit 3114 executes the process selected in response to the message 5303d. For example, when the input acceptance unit 3115 accepts an operation for selecting "Post on SNS #B", the display information generation unit 3114 performs a process for posting on the SNS #B, based on the linkage information indicated by the icon image 5030d'.

In still another exemplary case in which a browser application installed on the search terminal 30 has been specified as an application program to be started up for the icon image 5030a', the image search application 301' invokes and starts up the browser application when the input acceptance unit 3115 accepts an operation on the icon image 5301a corresponding to this icon image 5030a'.

Search Processing from Customer Terminal, Applicable to Embodiments

Figure 31:
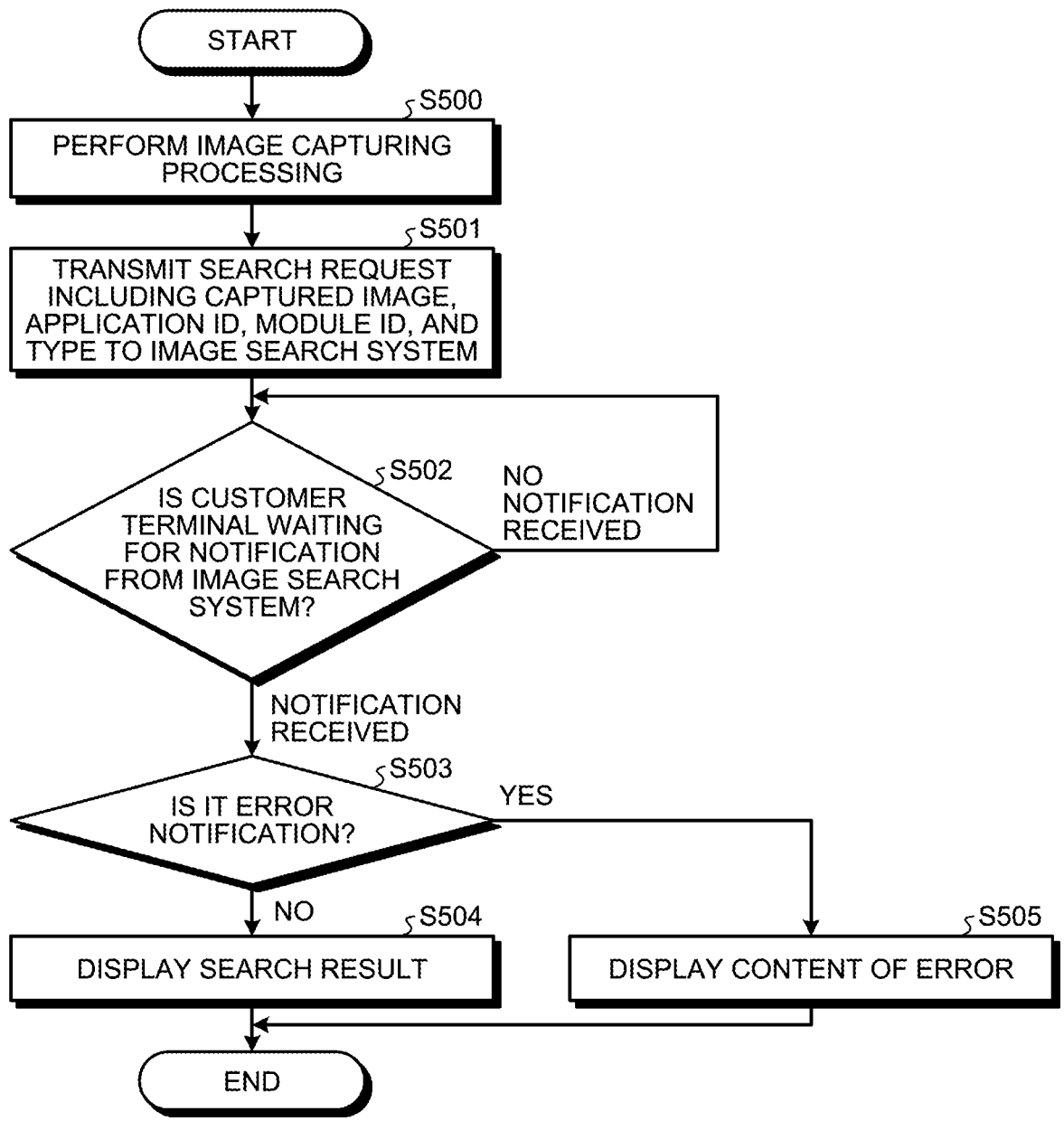
FIG. 31 is an exemplary flowchart illustrating search processing to be executed from the customer terminal, the search processing being applicable to the embodiments.

The following describes search processing to be executed from the customer terminal 40a, the processing being applicable to the embodiments. FIG. 31 is an exemplary flowchart illustrating search processing to be executed from the customer terminal 40a, the processing being applicable to the embodiments. The following assumes that the customer terminal 40a is used by the customer 43a and has the image search application 301c installed thereon that is a customized application customized by the customer 43a.

At Step S500, the customer terminal 40a performs the image capturing processing in response to a user operation. A captured image is stored in a storage, such as a nonvolatile semiconductor memory or a hard disk drive, included in the customer terminal 40a. At the next step S501, the customer terminal 40a transmits, to the image search system 10, a search request including: a captured image; and the application ID 310c, the module ID 312c, and the type information 314 that are included in the image search application 301c. This search request is received by the management server 101 in the image search system 10.

At the next step S502, the customer terminal 40a waits for a notification from the image search system 10. If no notification has been received ("No notification received" at Step S502), the processing of Step S502 is repeated. If any notification has been received from the image search system 10 ("Notification received" at Step S502), the customer terminal 40a shifts the processing to Step S503 to determine whether the received notification is an error notification.

If the received notification is determined not to be an error notification ("No" at Step S503), the customer terminal 40a shifts the processing to Step S504 to display a search result. The customer terminal 40a can display the search result using, for example, a screen equivalent to the browse screen 5000 described using FIG. 28 to FIG. 30. If, instead, the received notification is determined to be an error notification ("Yes" at Step S503), the customer terminal 40a shifts the processing to Step S505 to display what specifically the error is.

Upon completion of the processing at Step S504 or Step S505, the series of search processing steps performed by the customer terminal 40a ends.

Using a flowchart of FIG. 32 and FIG. 33 to FIG. 35, the following describes processing, applicable to the embodiments, related to a search to be made by the management server 101 in response to a search request from the customer terminal 40a. In FIG. 33 to FIG. 35, the same reference numerals are assigned to the same components as those in FIG. 12 or FIG. 20 explained above, and detailed description thereof is omitted. Although FIG. 33 to FIG. 35 omit illustration of the type information 314, the type information 314 has a value for either of the "trial version" and the "full-use version".

Figure 32:
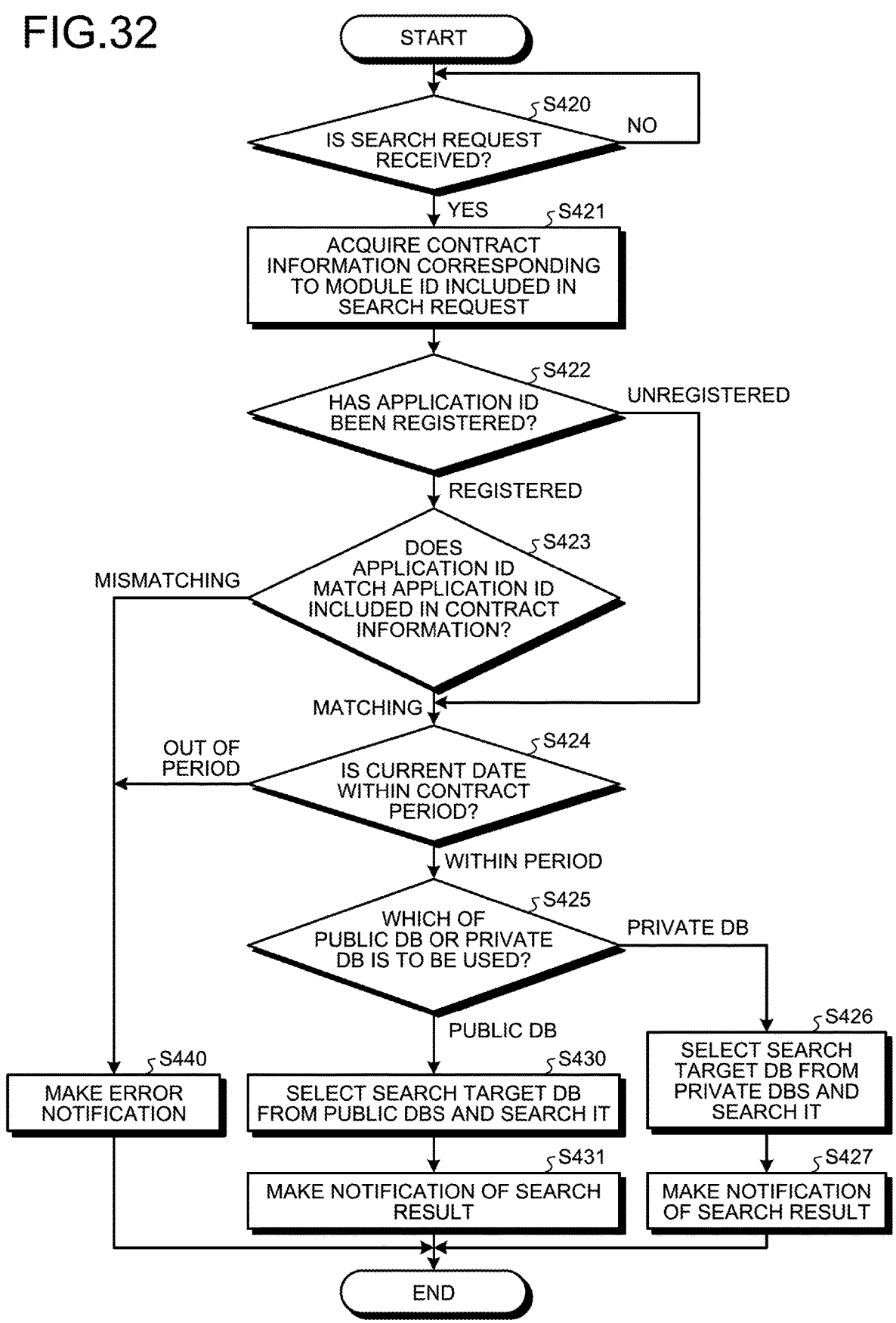
FIG. 32 is an exemplary flowchart illustrating processing related to a search to be made by the management server in response to a search request from the customer terminal, the processing being applicable to the embodiments.

In the flowchart in FIG. 32, the processing at Step S420 to Step S424 corresponds to the processing at Step S400 to Step S404 in FIG. 27. At Step S420, the management server 101 determines whether the search request has been received from the customer terminal 40a. If the search request is determined not to have been received ("No" at Step S420), the management server 101 repeats the processing of Step S420. If, instead, the search request is determined to have been received from the customer terminal 40a ("Yes" at Step S420), the management server 101 shifts the processing to Step S421.

At Step S421, the management server 101 acquires, from the contract information DB 16, the contract information corresponding to the module ID 312c included in the received search request. At the next step S422, the management server 101 determines whether the application ID 310c has been registered in the contract information. If the application ID 310c is determined not to have been registered in the contract information ("Unregistered" at Step S422), the management server 101 shifts the processing to Step S424. If, instead, the application ID 310c is determined to have been registered in the contract information ("Registered" at Step S422), the management server 101 shifts the processing to Step S423.

FIG. 33 illustrates an example in which the contract information has the application ID 310c registered therein. FIG. 33 (a) and FIG. 33 (b) illustrate examples of the image search application 301c installed on the customer terminal 40a and the module registration/edit screen 520 on which the module ID 312c that is the same as the module ID 312c included in the image search application 301c is registered. As illustrated in FIG. 33 (a), the application ID 310c is assigned to and embedded into the image search application 301c, for example, when the image search application 301c is first started up.

On the other hand, the module registration/edit screen 520 illustrated in FIG. 33 (b) has the application ID 310c entered into the input region 5208 thereon. In this case, the application ID 310c is registered in the contract information. If, instead, the input region 5208 is left blank, the application ID 310c is not registered in the contract information.

At Step S423, the management server 101 determines whether the application ID 310c included in the contract information is the same as the application ID 310c included in the image search application 301c installed on the customer terminal 40a. If the application IDs 310c are determined not to be the same ("Different" at Step S423), the management server 101 shifts the processing to Step S440 to transmit an error notification indicating that the application IDs 310c are not the same, to the customer terminal 40a.

If, instead, the application IDs 310c are determined to be the same at Step S423 ("Same" at Step S423), the management server 101 shifts the processing to Step S424.

At Step S424, the management server 101 determines whether the current date is within the contract period based on the start date of use and the end date of use included in the contract information acquired at Step S421. If the current date is determined to be outside the contract period ("Outside period" at Step S424), the management server 101 shifts the processing to Step S440 to transmit an error notification indicating that the current date is outside the contract period, to the customer terminal 40a.

If, instead, the current date is determined to be within the contract period at Step S424 ("Within period" at Step S424), the management server 101 shifts the processing to Step S425. At Step S425, the management server 101 determines, based on the contract pattern included in the contract information acquired at Step S421 and the type information 314 included in the search request received from the customer terminal 40a, which of a public DB and a private DB is set as a search target corresponding to the search request.

Search targets are classified based on the contract pattern and the type information in the following manner. The type information 314 indicates the two types, that is, the "trial version" type and the "full-use version" type, as described above. If the type information 314 indicates the "trial version", a private DB is selected as the search target. The image search application 301c for which this type information 314 indicates the "trial version" is to be installed and used on the customer terminal 40a.

If the type information 314 indicates the "full-use version" instead, a public DB is selected as the search target. The image search application 301c for which this type information 314 indicates the "full-use version" is usable on the customer terminal 40a and also is to be distributed to the general user to be installed and used on the search terminal 30.

If the contract pattern is the "evaluation contract" type, images can be registered in the image search system 10, but the disclosure processing is not allowed. Consequently, only private DBs can be set as search targets in the case of the evaluation contract. In contrast, if the contract type is the "formal contract" type, images can be registered in the image search system 10, and moreover, the disclosure/non-disclosure processing is allowed. Consequently, private DBs and public DBs can be set as the search targets in the case of the formal contract.

In accordance with the above categorization, the following conditions are used for determination as to which of public DBs and private DBs should be set as search targets. That is, if the contract pattern is the "evaluation contract" type or if the contract pattern is the "formal contract" type while the type information indicates the "trial version", public DBs are set as the search targets. Otherwise, if the contract pattern is the "formal contract" while the type information indicates the "full-use version", public DBs are set as the search targets. The type information for the image search application 301c included in the search terminal 30 used by the general user is limited to the "full-use version".

At Step S425, if, based on the above-described conditions for determination, determining private DBs to be set as the search targets ("Private DB" at Step S425), the management server 101 shifts the processing to Step S426. For example, as illustrated in FIG. 34 (a) and FIG. 34 (b), if the module registration/edit screen 520 of FIG. 34 (b) has "Evaluation contract" entered into the input region 5202 thereon, a private DB is set as the search target of the image search application 301c illustrated in FIG. 34 (a) that includes the module ID 312c that is the same as the module ID 312c entered into the input region 5201.

At Step S426, the management server 101 sets a public DB as the search target of the customer terminal 40a that has transmitted the search request, and switches the switch units 121 and 120a so as to select the search target DB from among the ordinary DB 111a and the exclusive DBs $110a_1$, $110a_2$, and so on based on the contract information corresponding to the module ID 312c included in the search request. The registration server 104 performs the image search on the selected search target DB. The search request may be transferred from the management server 101 to the registration server 104, or may have been held in, for example, the switch unit 121.

In the setting example of FIG. 34 (b), "Exclusive" is entered into the input region 5205, and the DB number "SP002" is specified in the input region 5206, so that the management server 101 selects, as the search target DB, a DB having the DB number "SP002" from among the exclusive DBs $110a_1$, $110a_2$, and so on.

At the next step S427, the registration server 104 notifies, of the search result, the customer terminal 40a that has transmitted the search request.

At Step S425, if, based on the above-described conditions for determination, determining public DBs to be set as the search targets ("Public DB" at Step S425), the management server 101 shifts the processing to Step S430. For example, as illustrated in FIG. 35 (a) and FIG. 35 (b), if the module registration/edit screen 520 of FIG. 35 (b) has "Formal contract" entered into the input region 5202 thereon, a private DB is set as the search target of the image search application 301c illustrated in FIG. 35 (a) that includes the module ID 312c that is the same as the module ID 312c entered into the input region 5201.

At Step S430, the management server 101 sets a public DB as the search target of the customer terminal 40a that has transmitted the search request, and switches the switch units 121 and 120b so as to select the search target DB from among the ordinary DB 111b and the exclusive DBs $110b_1$, $110b_2$, and so on based on the contract information corresponding to the module ID 312c included in the search request. The search server 100 performs the image search on the selected search target DB. The search request may be transferred from the management server 101 to the search server 100, or may have been held in, for example, the switch unit 121.

In the setting example of FIG. 35 (b), "Exclusive" is entered into the input region 5205, and the DB number "SP002" is specified in the input region 5206, so that the management server 101 selects, as the search target DB, a DB having the DB number "SP002" from among the exclusive DBs $110b_1$, $110b_2$, and so on.

At the next step S431, the search server 100 notifies, of the search result, the customer terminal 40a that has transmitted the search request.

If acquisition of the contract information corresponding to the module ID 312c from the contract information DB 16 has failed at Step S421, the ordinary DB 111a or the ordinary DB 111b can be set as the search target DB. For example, it is conceivable that, when acquisition of the contract information corresponding to the module ID 312c has failed, the private ordinary DB 111a is set as the search target DB if the type information indicates the "trial version", and the public ordinary DB 111b is set as the search target DB if the type information indicates the "full-use version".

As described above, in the embodiments, the search target DB can be selected using information identified based on the module ID 312c included in the image search module 311c. Consequently, the search processing for a registered image can be controlled with respect to each person or organization (for example, each customer) who has registered the image.

Embodiments

The following describes embodiments. The embodiments are aimed at efficient operation of the above-described information processing system, and the following description particularly discusses a structure thereof that can be profitable both to a service provider who provide a service using the image search system 10, and to each of the customers 43a, 43b, and so on.

Figure 36:
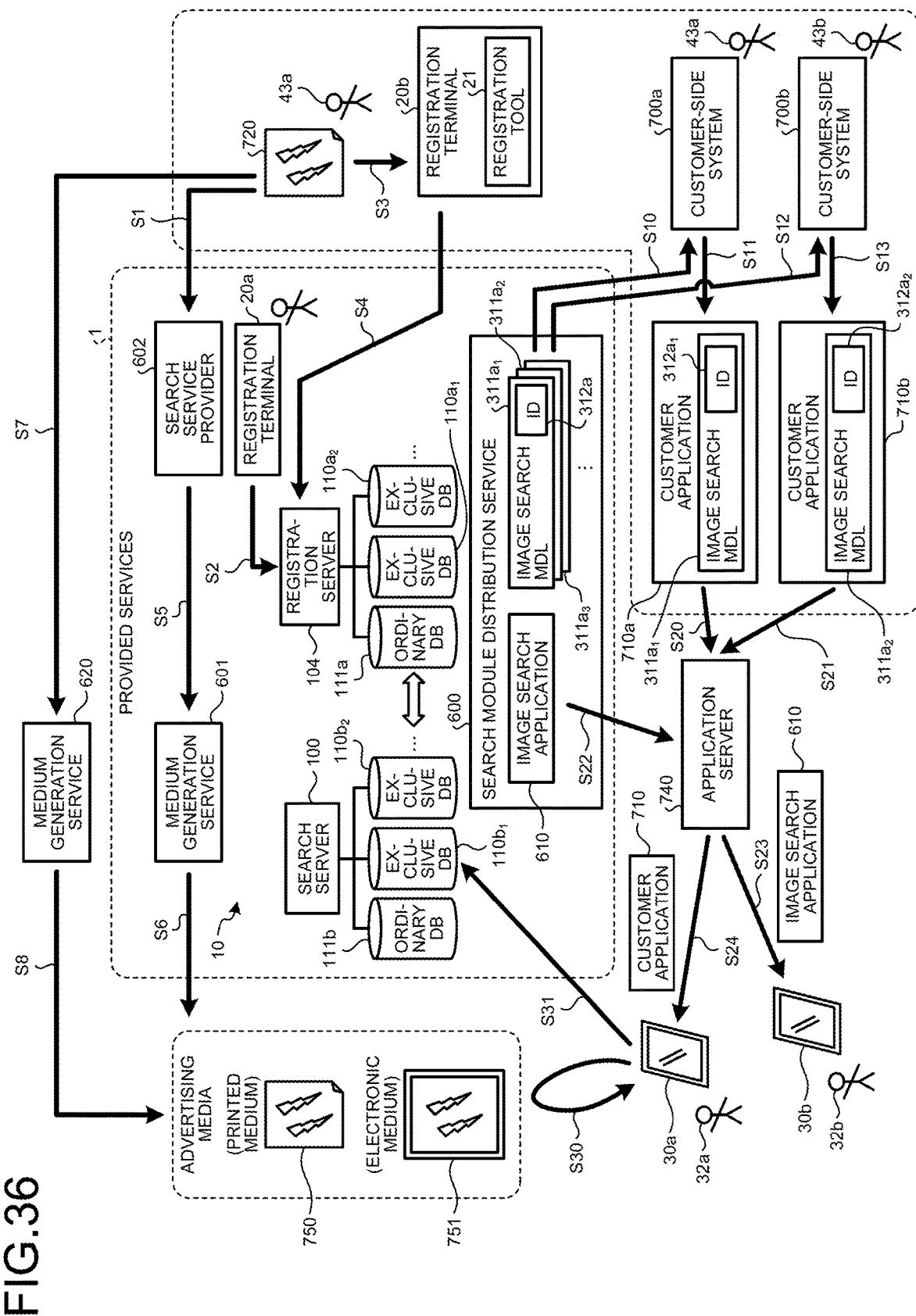
FIG. 36 is a diagram for explaining an example of the procedure of processing in an information processing system according to the embodiments.

FIG. 36 illustrates an example of the information processing system according to the embodiments along with a surrounding configuration thereof and explains an example of the procedure of processing in an information processing system according to the embodiments. In FIG. 36, the same reference numerals are assigned to the same components as those in FIG. 1 or FIG. 3 explained above, and detailed description thereof is omitted.

In FIG. 36, a provided service 1 schematically represents a service provided by a search service provider 602 who provides an image search service using the image search system 10 described above. The provided service 1 not only includes the image search service that is provided using the image search system 10, but also includes a search module distribution service 600 and a medium generation service 601.

As in the example described above, the image search system 10 includes the search server 100 and the registration server 104, and an ordinary DB 111a, and a plurality of exclusive DBs $110a_1$, $110a_2$, and so on are connected to the registration server 104. An ordinary DB 111b and a plurality of exclusive DBs $110b_1$, $110b_2$, and so on that correspond to the ordinary DB 111a, and the exclusive DBs $110a_1$, $110a_2$, and so, respectively, are connected to the search server 100.

The search module distribution service 600 functions as a module distributing unit that distributes image search modules (MDL) $311a_1$, $311a_2$, $311a_3$, and so on, for example, through a system including one or more information processing apparatuses, the image search modules each corresponding to the image search module 311a described above. Unique module IDs 312a are assigned to the respective image search modules $311a_1$, $311a3$, $311a_3$, and so on.

The search module distribution service 600 distributes, through the system, an image search application 610 having an image search module 311a incorporated therein. This image search application 610 is, for example, capable of running independently on an OS and usable for general purposes and uses, for example, a fixed value as the corresponding module ID 312a. The image search application 610 needs not necessarily have a module ID 312a incorporated therein.

The medium generation service 601 uses, for example, a system including one or more information processing apparatuses and a printing apparatus to generate an advertising medium from a content (image) provided thereto, the advertising medium being made of a print medium 750 such as a poster or a magazine article. This example is not limiting, and the medium generation service 601 may generate, from the content, an advertising medium made of an electronic medium 751 such as a signage or image information on the Internet.

The provided service 1 further includes a registration terminal 20a, and, for example, registers a content (image) in the registration server 104 in response to a request from a customer.

The procedure of processing for the provided service 1 described above is described here. On the customer side, each customer (for example, a customer 43a) prepares a content (image) 720 that the customer wants to use for advertising, and then registers this content 720 in the registration server 104. The customer 43a can, for example, request the search service provider 602 to perform processing for registering the content 720 in the registration server 104 (Step S1). In response to this request, the search service provider 602 registers the content 720 in the registration server 104 using the registration terminal 20a (Step S2).

The search service provider 602 can, for example, charge the customer 43a a fee in compensation for the registration of the content 720 in the registration server 104. The search service provider 602 can further charge the customer 43a fees in compensation for maintenance of the content 720 registered in the registration server 104 and transfer of the content 720 to the search server 100.

However, the customer 43a can, for example, rent the registration terminal 20b from the provided service 1 side and operate the rented registration terminal 20b (Step S3) to register the content 720 in the registration server 104 by itself (Step S4). This example is not limiting, and the customer 43a can receive the registration tool 21 from the provided service 1 side, install the received registration tool 21 on an information processing apparatus usable by the customer, and use the information processing apparatus having the registration tool 21 installed thereon (Step S3) to register the content 720 in the registration server 104 (Step S4).

The search service provider 602 can charge the customer 43a fees for lending the registration terminal 20b and providing the registration tool 21 from the provided service 1 side to the customer 43a.

The customer 43a can request the search service provider 602 to perform the processing for generating an advertising media from the content 720. The search service provider 602 can charge the customer a fee in compensation for this request, and transfers the contents 720 to the medium generation service 601 in response to the request (Step S5). Based on the content 720 received from the search service provider 602, the medium generation service 601 generates an advertising medium in the form of the print medium 750 or the electronic medium 751 (Step S6).

This example is not limiting. The customer 43a can also request a medium generation service 620 external to the provided service 1 to perform the processing for generating an advertising media. In this case, the customer 43a transfers, to the medium generation service 620 external to the provided service 1, the content 720 from which the customer 43a desires to generate an advertising medium, and requests this medium generation service 620 to generate the advertising medium (Step S7). In response to the request from the customer 43a, the medium generation service 620 generates an advertising medium (such as the print medium 750 or the electronic medium 751) based on the content 720 (Step S8).

The respective customers 43a and 43b are assumed to include customer-side systems 700a and 700b. The customer-side systems 700a and 700b may be built of a plurality of information processing apparatuses connected through a network, or may be built of one information processing apparatus.

For example, the customer-side system 700a receives the image search module $311a_1$ distributed from the search module distribution service 600 in the provided service 1 and including the module ID $312a_1$ (Step S10), and incorporates the received image search module 311a, into an application program of the customer 43a to generate a customer application 710a as a customized application (Step S11). Likewise, the customer-side system 700b receives the image search module $311a_2$ distributed from the search module distribution service 600 and including the module ID $312a_2$ (Step S12), and customizes and incorporates, into an application program of the customer 43b, the received image search module $311a_2$ to generate a customer application $710b$ (Step S13). The respective customer applications $710a$ and $710b$ may include user IDs 313.

In the example of FIG. 36, the respective customer-side systems $700a$ and $700b$ upload the generated customer applications $710a$ and $710b$ onto the application server 740 (Step S20 and Step S21). The search module distribution service 600 also uploads the image search application 610 onto the application server 740 (Step S22). Here, the application server 740 and either or both of the customer-side systems $700a$ and $700b$ can collectively constitute a customer-side system.

General users $32a$ and $32b$ download the image search application 610 and a customer application 710 such as the customer application $710a$ or $710b$ onto their terminal devices from the application server 740 (Step S23 and Step S24). The general users $32a$ and $32b$ install, on their respective terminal devices, the image search application 610 and the customer application 710 that have been downloaded. This installation enables these users to use these respective terminal devices as search terminals $30a$ and $30b$ on which an image search is performed using the search server 100.

For example, an image of the print medium 750 is captured by use of the search terminal $30a$ having the customer application 710 installed thereon (Step S30), and a search request including the captured image and a module ID included in the customer application 710 (for example, the customer application $710a$ from the customer $43a$) is transmitted to the search server 100 (Step S31).

In accordance with the search request transmitted from the search terminal $30a$, the search server 100 selects a DB corresponding to the module ID included in the search request from among the ordinary DB $111b$ and the exclusive DBs $110b_1$, $110b_2$, and so on, searches the DB for a similar image, and transmits linkage information associated with this similar image as a search result to the search terminal $30a$. Depending on how the general user $32a$ reacts to the linkage information transmitted to the search terminal $30a$, the customer $43a$ can receive a compensation.

Here, in the information processing system according to the embodiments, the search module distribution service 600 distributes the image search modules $311a_1$, $311a_2$, and $311a_3$ to the customer-side systems $700a$ and $700b$ while assigning thereto the respective unique module IDs $312a$. The search server 100 selects a search target DB from among the ordinary DB $111b$ and the exclusive DBs $110b_1$, $110b_2$, and so on in accordance with the module ID $312a$ included in the search request transmitted from the search terminal $30a$ having the image search application 610 installed thereon that includes, for example, the image search module $312a_1$ to which this module ID $312a$ is assigned.

The configuration as described above of the information processing system according to the embodiments enables each of the customers $43a$ and $43b$ to have, in selection of a search target of the search terminal $30a$, a DB selected in which each customer has registered the content 720 from among the ordinary DB $111b$ and the exclusive DBs $110b_1$, $110b2$, and so on. As a result, in image search based on an advertising medium generated from this content 720, a search result that suits the advertising intent of each of the customers $43a$ and $43b$ is more unerringly obtained, so that each of the customers $43a$ and $43b$ is enabled to efficiently obtain compensations.

The search module distribution service 600 can distribute a plurality of image search modules having different ones of the module IDs $312a$ assigned thereto, that is, the image search modules $311a$, and $311a_2$, to one of the customer-side systems, that is, the customer-side system $700a$. In this case, the customer $43a$ that operates the customer-side system $700a$ can perform image search on a plurality of exclusive DBs, that is, the exclusive DBs $110b_1$, and $110b_2$.

Usage patterns of Information Processing System According to Embodiments

Here, a consideration is given to usage patterns of the information processing system according to the embodiments. The customers $43a$ and $43b$ make certain contracts with the search service provider 602 to enable themselves, for example, to register the contents 720 in the ordinary DB $111b$ and the exclusive DBs $110b_1$, $110b_2$, and so on, to use the exclusive DBs $110b_1$, $110b_2$, and so on, and to use the image search modules $311a_1$, $311a_2$, and so on.

The following describes usage patterns of the information processing system that depend on patterns of contract (contract patterns). The contract patterns herein relate to registration of the contents 720 in public DBs (the ordinary DB $111b$ and the exclusive DBs DB$110b_1$, and $110b_2$, and so on) and usage of the image search module $311a$, and differ from the contract types described above. In the following description, the customers $43a$ and $43b$ are collectively represented by the customer $43a$ unless otherwise state.

In the embodiments, the four contract patterns, which are first to fourth contract patterns described below, are presented as the contract patterns for the information processing system.

(1) The first contract pattern is a contract pattern that enables registering the content 720 in a public DB, using the image search module $311a$, and using the exclusive DBs $110b_1$, $110b_2$, and so on from among the ordinary DB $111b$ and the exclusive DBs $110b_1$, $110b_2$, and so on. This first contract pattern enables the customer $43a$ to register the content 720 in any of the exclusive DBs $110b_1$, and $110b_2$, and so on. For example, each of the module IDs $312a$ that are uniquely assigned to the respective image search modules $311a_1$, $311a_2$, and so on is associated with the exclusive DBs $110b_1$, $110b_2$, and so on.

(2) The second contract pattern is a contract pattern that enables registering the content 720 in a public DB, using the image search module $311a$, and using only the ordinary DB $111b$ from among the ordinary DB $111b$ and the exclusive DBs $110b_1$, $110b_2$, and so on. This second contract pattern enables the customer $43a$ to register the content 720 only in the ordinary DB $111b$. The module ID $312a$ included in the image search module $311a$ is associated with, for example, the ordinary DB $111b$.

(3) The third contract pattern is a contract pattern that forbids registering the content 720 in a public DB or enables the registering with a fee charged each time the content 720 is registered, and that enables using the image search module $311a$. This third contract pattern is an example of a case in which the customer $43a$ has not yet made a contract with the search service provider 602. The image search module $311a$ does not include the module ID $312a$ or includes the module ID $312a$ that indicates that no contract has been made.

(4) The fourth contract pattern is a contract pattern that enables registering the content 720 in a public DB as well as using the image search module $311b$. As the public DB, any one of the ordinary DB $111b$ and the exclusive DBs $110b_1$, $110b_2$, and so on can be used. The image search module $311b$ that the fourth contract pattern enables the customer to use can permit content acquisition on a search terminal 30 that satisfies certain conditions, the content acquisition being pursuant to the linkage information found in search performed by the image search system 10 based on an image transmitted from another search terminal 30 that has the image search module 311b incorporated therein.

Next, exemplary usage patterns of the information processing system according to the embodiments is described, the usage patterns being enabled by (1) the first contract pattern, (2) the second contract pattern, (3) the third contract pattern, and (4) the fourth contract pattern.

Figure 37:
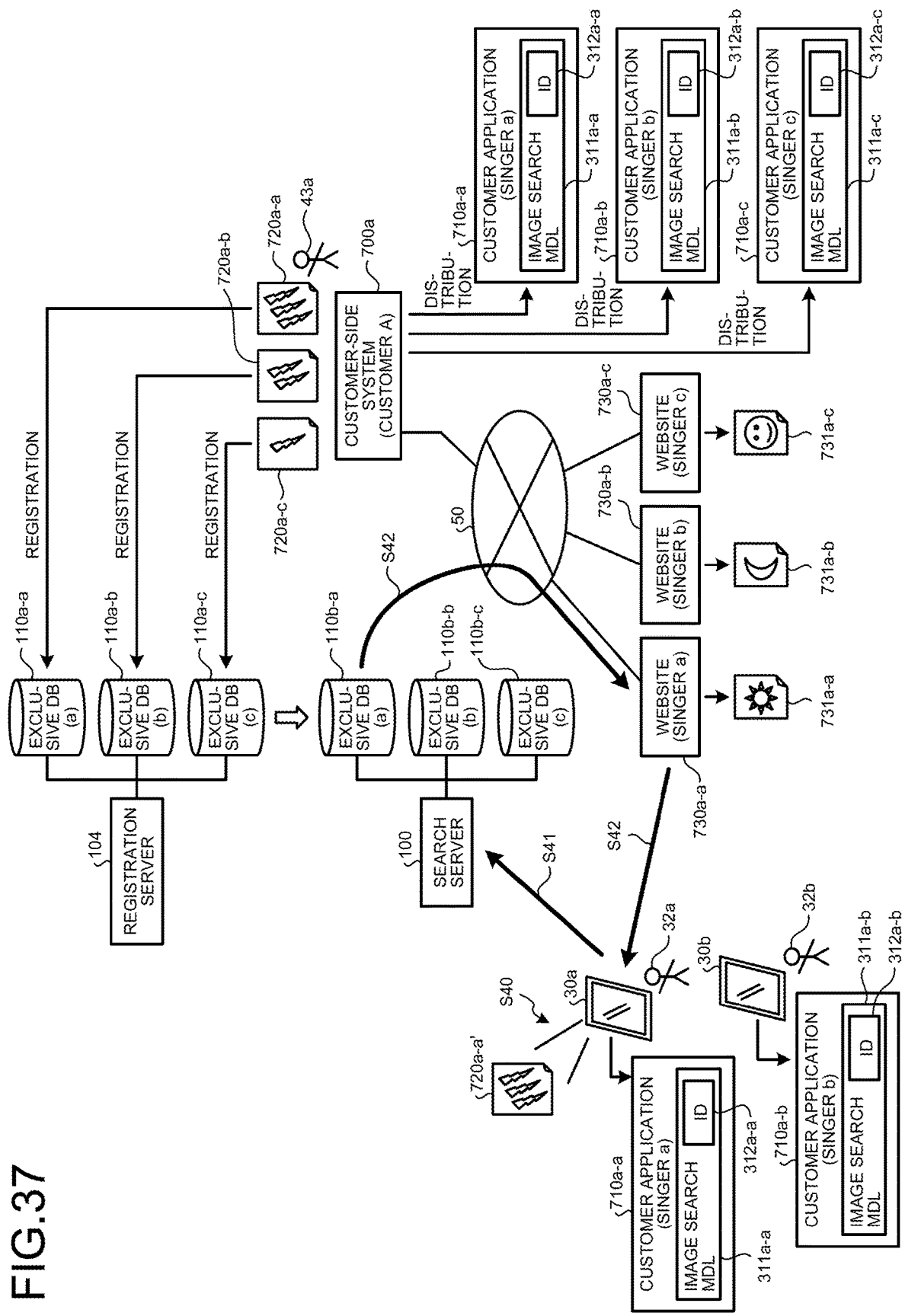
FIG. 37 is a diagram for explaining an example of a usage pattern according to the embodiments that is enabled by a first contract pattern.

Exemplary Usage Pattern Enabled by First Contract Pattern According to Embodiments Using FIG. 37, (1) an exemplary usage pattern enabled by the first contract pattern according to the embodiments is described. In FIG. 37, the same reference numerals are assigned to the same components as those in FIG. 36 explained above, and detailed description thereof is omitted.

In FIG. 37, the customer 43a is assumed to use the customer-side system 700a to operate websites 730a-a, 730a-b, and 730a-c on the network 50 that is the Internet. These websites 730a-a, 730a-b, and 730a-c provide contents 731a-a, 731a-b, and 731a-c, respectively, to users who have accessed these websites.

Here, the customer 43a is assumed to run a music production company to which a singer a, a singer b, and a singer c belong. The customer 43a is assumed to have an intention to cause fans of the singer a, the singer b, and the singer c to access the respective websites 730a-a, 730a-b, and 730 a-c of the singer a, the singer b, and the singer c and provide thereto the contents 731a-a, 731a-b, and 731a-c that are different for the singer a, the singer b, and the singer c.

Under a contract formulated as the first contract pattern, the customer 43a is enabled to use exclusive DBs 110a-a, 110a-b, and 110a-c that are private DBs, and exclusive DBs 110b-a, 110b-b, and 110b-c that are public DBs. The customer 43a transmits advertising contents 720a-a, 720a-b, and 720a-c corresponding to the singer a, the singer b, and the singer c, respectively, to the content registration server 104, and registers the contents 720a-a, 720a-b, and 720a-c in the exclusive DBs 110a-a, 110a-b, and 110a-c in association with pieces of the linkage information. As the pieces of the linkage information, the Uniform Resource Locators (URLs) of the respective websites 730a-a, 730a-b, and 730a-c are used.

Registered contents in the exclusive DBs 110a-a, 110a-b, and 110a-c are transferred to the search server 100 at a certain timing to be moved to the exclusive DBs 110b-a, 110b-b, and 110b-c, thereby being brought to the disclosed state.

Based on the contents 720a-a, 720a-b, and 720a-c, the customer 43a generates advertising media for these respective contents.

Image search modules 311a-a, 311a-b, and 311a-c including module IDs 312a-a, 312a-b, and 312a-c, respectively, that correspond to the respective exclusive DBs 110b-a, 110b-b, and 110b-c are distributed from the search module distribution service 600 (refer to FIG. 36) to the customer-side system 700a operated by the customer 43a. The customer 43a generates, using the customer-side system 700a, customer applications 710a-a, 710a-b, and 710a-c obtained by incorporating the respective image search modules 311a-a, 311a-b, and 311a-c. These customer applications 710a-a, 710a-b, and 710a-c serve as customized applications for the singer a, the singer b, and the singer c, respectively.

The customer 43a distributes the customer applications 710a-a, 710a-b, and 710a-c to fans of the singer a, the singer b, and the singer c, respectively, from the customer-side system 700a, for example, via the application server 740 (refer to FIG. 36). For example, the customer 43a distributes the customer application 710a-a for the singer a to the general user 32a who is a fan of the singer a and distributes the customer application 710a-b for the singer b to the general user 32b who is a fan of the singer b.

The general user 32a installs the distributed customer application 710a-a, for example, on a terminal device owned by this general user. This installation configures this terminal device as the search terminal 30a from which an image search is performed using the search server 100. Likewise, the general user 32b also installs the distributed customer application 710a-b on a terminal device owned by this general user, so that this terminal device is configured as the search terminal 30b from which an image search is performed using the search server 100.

For example, the general user 32a uses the search terminal 30a to capture an image of an advertising medium containing a content 720a-a' related to the singer a (Step S40). The search terminal 30a transmits a search request to the search server 100 (Step S41), the search request including: the captured image containing the content 720a-a'; and the module ID 312a-a included in the customer application 710a-a installed on the search terminal 30a.

In accordance with the module ID 312a-a included in the search request, the search server 100 selects the exclusive DB 110b-a corresponding thereto as a search request DB and searches the DB for a similar image to the captured image. As a result, the search server 100 determines that the content 720a-a registered therein is similar to the captured image, and transmits the linkage information associated with the content 720a-a, that is, the URL of the website 730a-a to the search terminal 30a (Step S42). Thus, the general user 32a can access the website 730a-a from the search terminal 30a and acquire the content 731a-a.

Likewise, the search terminal 30b transmits a search request to the search server 100, the search request including: a captured image; and the module ID 312a-b included in the customer application 710a-b installed on the search terminal 30b. In response, the search server 100 selects the exclusive DB 110b-b corresponding to the module ID 312a-b as a search request DB, determines as a search result that the content 720a-b registered therein is similar to the captured image, and transmits the URL of the website 730a-b, as the linkage information associated with the content 720a-b, to the search terminal 30b. Thus, the general user 32b can access the website 730a-b from the search terminal 30a and acquire the content 731a-b.

Thus, the first contract pattern enables distributing, to each of the general users 32a and 32b, the customer applications 710a-a, 710a-b, and 710a-c corresponding to the two or more module IDs 312a-a, 312a-b, and 312a-c to the two or more respective exclusive DBs 110b-a, 110b-b, and 110b-c. As a result, the general users 32a and 32b can acquire the respective contents 731a-a and 731a-b as desired, based on the captured images.

The first contract pattern further enables identifying the respective search terminals 30a and 30b by using the application IDs 310a that are uniquely assigned to the respective customer applications 710a-a, 710a-b, and 710a-c. The search service provider 602 can charge the customers 43a and 43b fees for such use of the application IDs 310a.

Figure 38:
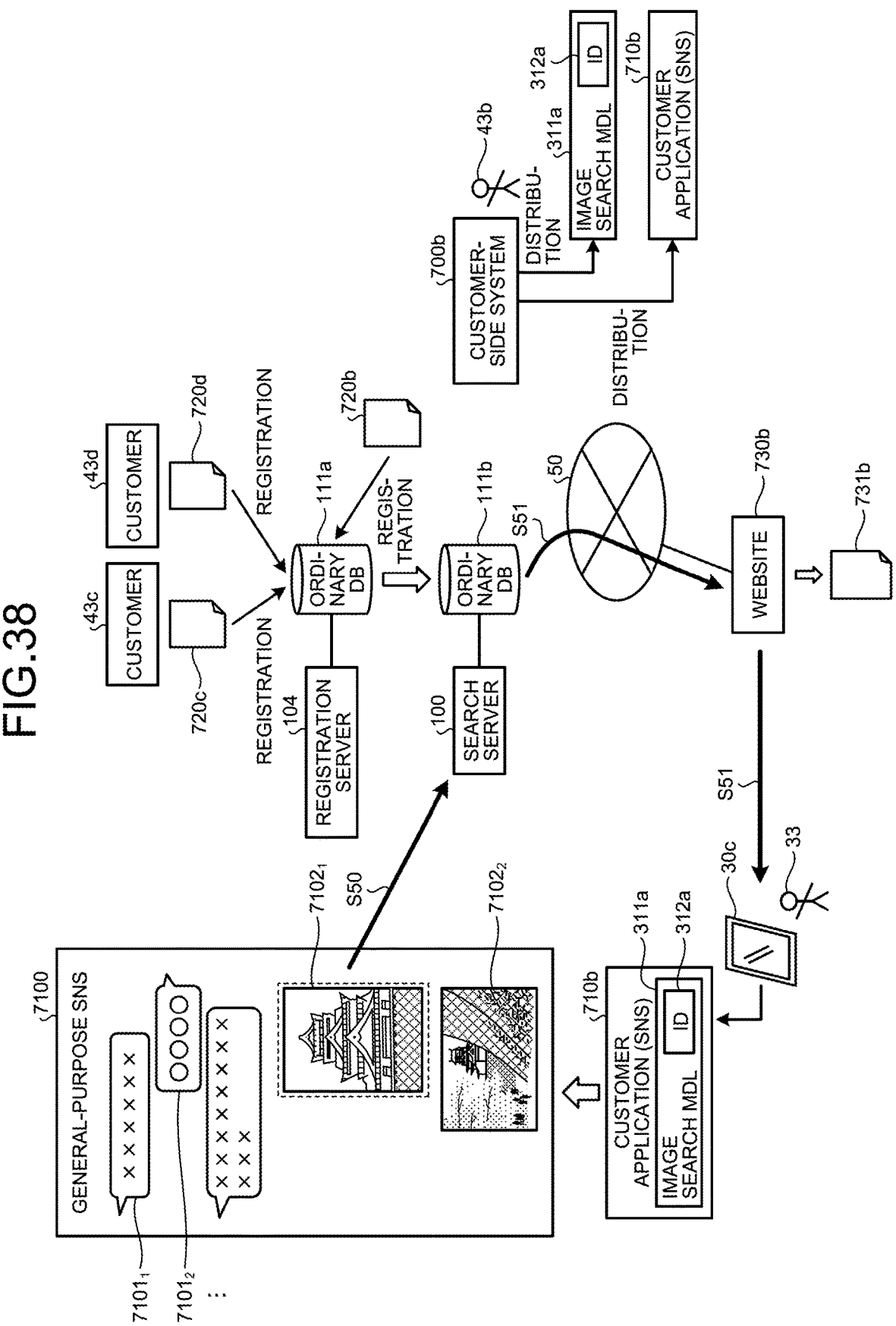
FIG. 38 is a diagram for explaining an example of a usage pattern according to the embodiments that is enabled by a second contract pattern.

Exemplary Usage Pattern Enabled by Second Contract Pattern According to Embodiments Using FIG. 38, (2) an exemplary usage pattern enabled by the second contract pattern according to the embodiments is described. In FIG. 38, the same reference numerals are assigned to the same components as those in FIG. 36 explained above, and detailed description thereof is omitted.

In FIG. 38, the customer 43b is assumed to operate an SNS using the customer-side system 700b or a system provided separately therefrom. The customer 43b prepares the customer application 710b as an application program corresponding to this SNS. Each member who participates in this SNS installs the customer application 710b on a terminal device owned by the member and runs the installed customer application 710b on the terminal device. The members are thus enabled to exchange messages and images on the SNS among the members.

In the upper left part of FIG. 38, an exemplary message display screen 7100 displayed on a terminal device by this customer application 710b is illustrated. In this example, messages $7101_1$, $7101_2$, and so on and images $7102_1$, $7102_2$, and so on transmitted by the SNS members are displayed on the message display screen 7100 successively in chronological order.

Under a contract formulated as the second contract pattern, the customer 43b is enabled to use the ordinary DB 111a that is a private DB, and the ordinary DB 111b that is a public DB. The customer 43b transmits a desired content 720b to the registration server 104 and registers the content 720b in the ordinary DB 111a while associating therewith, for example, the URL of the website 730b operated by the customer 43b as the linkage information. Registered contents in the ordinary DB 111a are transferred to the search server 100 at a certain timing to be moved to the ordinary DB 111b, thereby being brought to the disclosed state.

In the ordinary DB 111a, the other customers 43c, 43d, and so on register contents 720c, 720d, and so on. Each of these contents 720c, 720d, and so on registered in the ordinary DB 111a are moved at a certain timing to the ordinary DB 111b that is a public DB, thereby being brought to the disclosed state. That is, the ordinary DB 111b is searched for a content from among those including not only the content 720b of the customer 43b but also the contents 720c, 720d, and so on of the other customers 43c, 43d, and so on.

An image search module (MDL) 311a including the module ID 312a corresponding to the ordinary DB 111b is distributed from the search module distribution service 600 (refer to FIG. 36) to the customer-side system 700b operated by the customer 43b. This image search module 311a is distributed as a plug-in program for the customer application 710b prepared by the customer 43b, for example, via the application server 740 (refer to FIG. 36), and is then incorporated into the customer application 710b and executed on the terminal device. By having the image search module 311a incorporated, the terminal device owned by a participating member 33 and having the customer application 710b installed thereon is configured as a search terminal 30c from which an image search is performed using the search server 100.

For example, the participating member 33 designates, using a certain method, an image $7102_1$ on the message display screen 7100 displayed on the search terminal 30c by the customer application 710b, the image $7102_1$ being indicated by a dotted-line frame in FIG. 38. The customer application 710b transfers the designated image $7102_1$ to the image search module 311a. The image search module 311a transmits, to the search server 100, a search request including: the transferred image $7102_1$; and the module ID 312a included in the image search module 311a (Step S50).

In accordance with the module ID 312a included in the search request, the search server 100 selects the ordinary DB 111b as a search request DB and searches the DB for a similar image to the image $7102_1$. If the content 720b registered therein by the customer 43b is determined to be similar to the image $7102_1$ as a result, the search server 100 transmits the linkage information that is associated with the content 720b, that is, the URL of the website 730b to the search terminal 30c (Step S51). Thus, the participating member 33 can access the website 730b from the search terminal 30c and acquire, for example, a content 731b provided from the website 730b.

Obviously, if the image $7102_1$ is similar to a content 720c and a content 720d other than the content 720b, the search server 100 transmits the linkage information that is associated with these content 720c and content 720d to the search terminal 30c.

The image search module 311a can thus be used by being incorporated into a general-purpose application program as represented by an application program corresponding to an SNS. In this case, the general-purpose application program that can have the image search module 311a incorporated therein is considered more highly value-added than a general-purpose application program that cannot, and the customer 43b who provides the general-purpose application program that can have the image search module 311a incorporated therein can earn revenue for an added value derived thereby.

Under the second contract pattern, the customer 43b associates the module ID 312a included in the image search module 311a with the ordinary DB 111b. This association enables the participating member 33 to acquire not only the linkage information associated with the content 720b registered by the customer 43b but also the linkage information associated with the contents 720c, 720d, and so on registered by the other customers 43c, 43d, and so on, thus being expected to turn image searches more enjoyable for the participating member 33.

Exemplary Usage Pattern Enabled by Third Contract Pattern According to Embodiments Next, (3) an exemplary usage pattern enabled by the third contract pattern according to the embodiments is described. As described above, the third contract pattern enables using the image search module 311a while forbidding registering the contents 720b to a public DB or enabling the registering with a fee charged each time registering the content 720b. This usage pattern can be configured to correspond to an example in which the usage pattern enabled by the second contract pattern described using FIG. 38 is altered such that the customer 43b merely uses the image search module 311a, that is, incorporates the image search module 311a into the customer application 710b while not registering the content 720b in the registration server 104 or while being charged with a fee each time registering the content 720b.

Even in this case, the participating member 33 can implement an image search based on the image $7102_1$ displayed by the customer application 710b within the message display screen 7100 provided by the SNS and acquire the linkage information as a search result. The customer 43b can earn revenue for an added value derived by providing the customer application 710b that can have the image search module 311a incorporated therein.

Exemplary Usage Pattern Enabled by Fourth Contract Pattern According to Embodiments Next, (4) an exemplary usage pattern enabled by the fourth contract pattern according to the embodiments is described. As described above, the fourth contract pattern enables using the image search module 311b and using any public DB from among the ordinary DB 111b and the exclusive DBs $110b_1$, $110b_2$, and so on.

An image search application and an image search module that are applicable to the usage pattern enabled by the fourth contract pattern are described. To the usage pattern enabled by the fourth contract pattern, the image search module 311b is applied, and the image search application 301b that includes this image search module 311b and the user ID 313 is applied, as described above.

Figure 39:
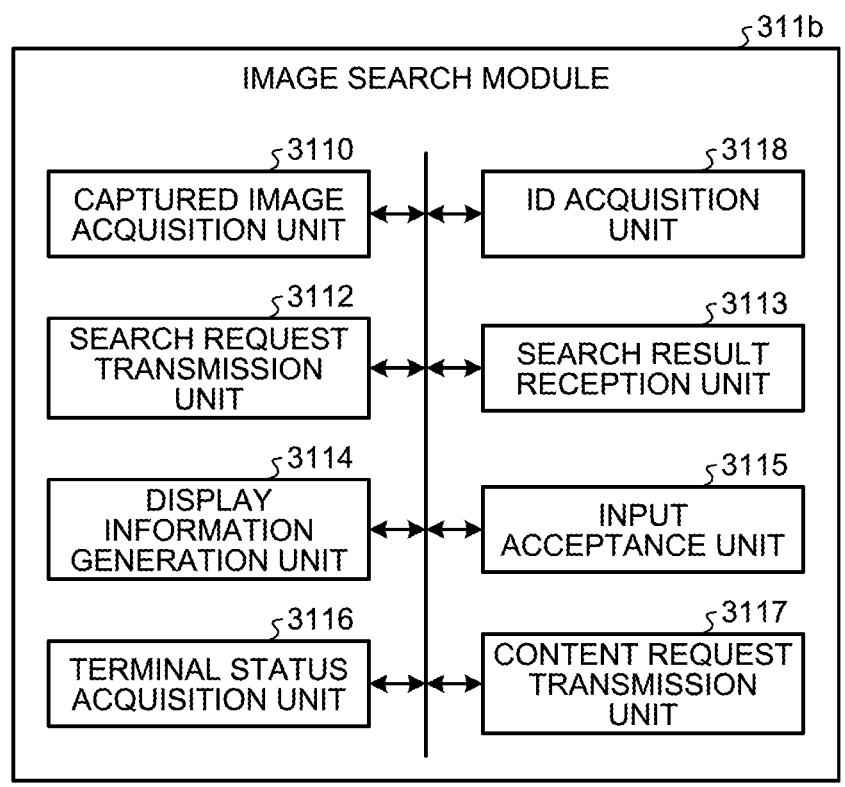
FIG. 39 is an exemplary functional block diagram for explaining functions of an image search module according to the embodiments.

FIG. 39 is an exemplary functional block diagram for explaining functions of the image search module 311b. In FIG. 39, the same reference numerals are assigned to the same components as those of the image search module 311a in FIG. 10 explained above, and detailed description thereof is omitted. The image search module 311b as illustrated in FIG. 39 is obtained by adding a terminal status acquisition unit 3116, a content request transmission unit 3117, and an ID acquisition unit 3118 to the image search module 311a of FIG. 10. The illustration of the image search module 311b omits the module ID storage unit 3111 included in the image search module 311a.

In FIG. 39, when locational information and temporal information are acquired by the locational information acquisition unit 337, the terminal status acquisition unit 3116 acquires the locational information and the temporal information as status information. The status information indicates a status regarding a search terminal 30 at the time of acquiring the locational information and the temporal information, the search terminal 30 having the image search application 301b installed thereon that includes the image search module 311b. The content request transmission unit 3117 transmits, onto the network 50, information about a content request.

Functions that the image search module 311b has are implemented as a result of execution on the CPU 3000 of an information processing program suited for the usage pattern by the fourth contract pattern. How to provide this information processing program and how to execute it on the CPU 3000 are the same as those in the case of the image search module 311a described above, and description thereof is therefore omitted.

In the usage pattern enabled by the fourth contract pattern, search terminals 30 that satisfy certain conditions can be exclusively permitted to acquire contents for the linkage information found in searches performed by the image search system 10 based on images captured by the respective search terminals 30 as described above. In one example, search terminals 30 that have captured, within a venue specially set up for an event, images of a content presented within the event are exclusively permitted to acquire a content according to the linkage information found in a search based on the captured images. The content is, for example, a leaflet handed out in the event.

With reference to FIG. 36 explained above, the organizer of this event, as the customer 43a, uses the provided service 1 under contract with the search service provider 602. The event organizer corresponding to the customer 43a registers an image of the leaflet to be handed out in the event, as the content 720, in the registration server 104. The content 720 is registered by the registration server 104 in any one of the ordinary DB 111a and the exclusive DBs $110a_1$, $110a2$, and so on depending on a request from the event organizer.

Additionally, the event organizer can request the search service provider 602 to generate an advertising medium based on the content 720. In response to this request, the search service provider 602 uses the medium generation service 601 to generate the advertising medium in the form of the print medium 750.

Furthermore, the event organizer can use the customer-side system 700a to receive the image search module 311b distributed from the search module distribution service 600 of the provided service 1. The event organizer incorporates this image search module 311b into an application program of the customer 43a, thereby generating, as an customized application, the customer application 710a corresponding to the image search application 301b.

For example, the customer-side system 700a uploads the generated customer application 710a onto the application server 740 and distributes the customer application 710a to, for example, the general users 32a and 32b as participants in the event.

First Usage Pattern Enabled by Fourth Contract Pattern According to Embodiments

Figure 40:
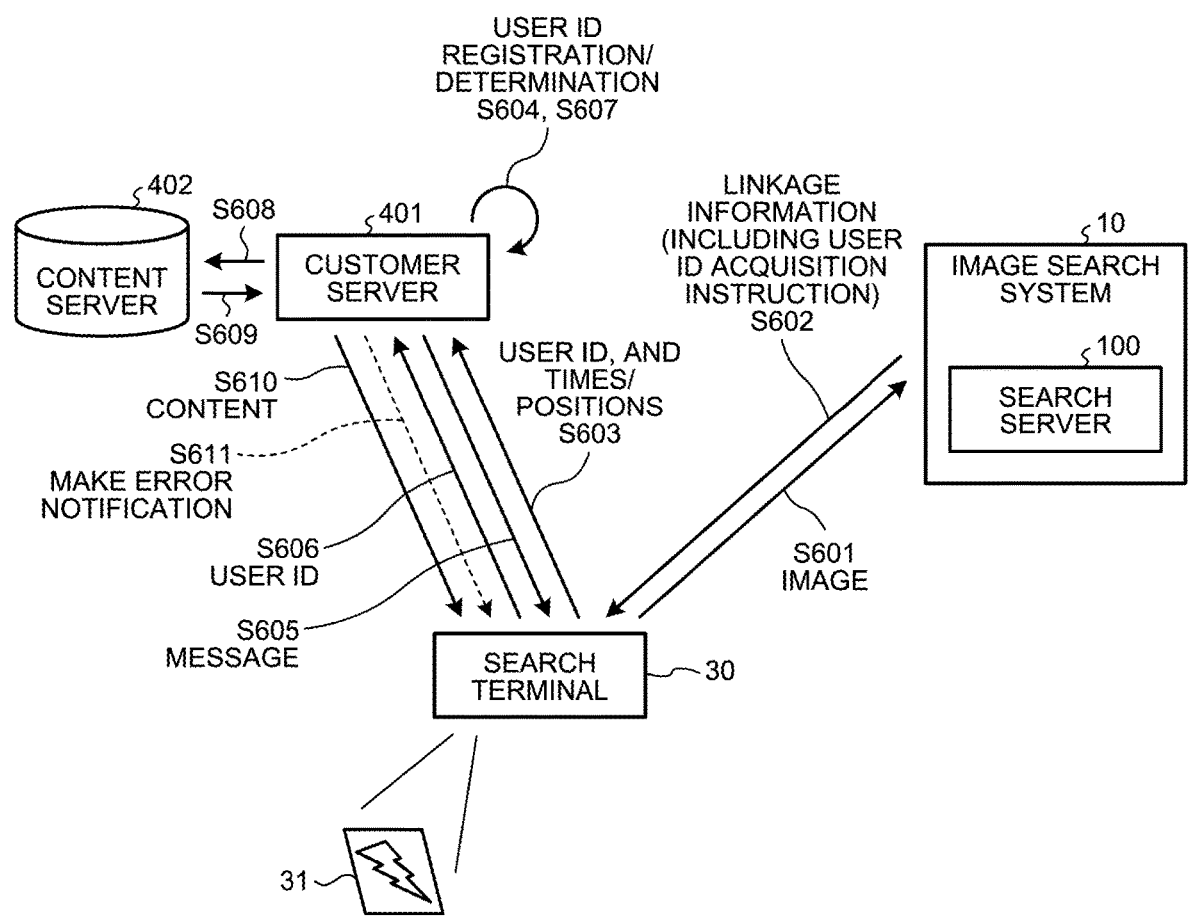
FIG. 40 is a block diagram schematically illustrating the procedure of content acquisition processing according to the embodiments and suited for a first usage pattern enabled by a fourth contract pattern.

The following describes, using FIG. 40 to FIG. 42, content acquisition control according to the embodiments and suited for a first usage pattern enabled by the fourth contract pattern. FIG. 40 schematically illustrates the procedure of content acquisition processing according to the embodiments and suited for a first usage pattern enabled by a fourth contract pattern. FIG. 41 and FIG. 42 illustrate examples of a browse screen 800 to be displayed on the search terminal 30 in the content acquisition processing according to the embodiments and suited for the fourth contract pattern. The browse screen 800 corresponds to the browse screen 5000 corresponding to FIG. 28 to FIG. 30.

The image search application 301b corresponding to the customer application 710a described above is installed on the search terminal 30 to be operated by a user. The search terminal 30 is assumed to have already gone through the first startup and have the user ID 313 assigned thereto from the management server 101. In the search terminal 30, the communication unit 333 receives the user ID 313 transmitted from the management server 101, and the storage unit 332 stores the received user ID 313 in the management area for the image search application 301b area in the storage 3005.

A customer (for example, the customer 43a) is assumed to hold an event at an event venue for a certain period and provide a service that allows the user to acquire, using the search terminal 30, an event-exclusive content by transmitting, within the period of the event, an image of a leaflet handed out in the event to the image search system 10 to have an image search performed.

With reference to FIG. 40, the user operates the search terminal 30 to capture an image of a photographic subject 31 using the image search application 301b, and transmits the captured image obtained thereby from the search terminal 30 to the image search system 10 (Step S601). When capturing the image of the photographic subject 31, the search terminal 30 uses the locational information acquisition unit 337 to control the GNSS unit 3010 so as to measure locational information and temporal information and uses the terminal status acquisition unit 3116 to acquire the measured locational information and temporal information. These locational information and temporal information thus acquired is stored in, for example, the RAM 3002. These locational information and temporal information are status information indicating a status regarding the search terminal 30 at the time when the search terminal 30 has captured an image of the photographic subject 31.

The transmitted captured image is received by the image search system 10 and transferred to the search server 100. The search server 100 performs an image search based on the transferred captured image and transmits linkage information obtained as a search result to the search terminal 30 that is the original transmitter of the captured image (Step S602). Here, the linkage information transmitted from the search server 100 has been generated in such a manner as to include a user ID acquisition instruction to be used for acquiring the user ID 313 from the search terminal 30. A specific example of the user ID acquisition instruction is to be described later.

The search terminal 30 receives the linkage information transmitted from the search server 100. On the search terminal 30, the image search application 301b causes the search terminal 30 to display a screen based on the received linkage information. In accordance with the user ID acquisition instruction included in the received linkage information, the image search application 301b uses the ID acquisition unit 3118 to acquire the user ID 313 stored in the storage 3005.

FIG. 41 (a) illustrates an example of the browse screen 800 based on the linkage information received from the search server 100 at Step S602. In the example of FIG. 41 (a), on the browse screen 800, tabs 8001, 8002a, and 8002b are displayed that correspond to different pieces of link information indicated as the linkage information. The tabs 8002a and 8002b are associated with, as the linkage information, pieces of link information that indicate links to event-exclusive contents. In this example, "Event report" and "Exclusive merchandise" appear on the tabs 8002a and 8002b, respectively, thus indicating that an event report on this event and information on limited merchandise are provided as the exclusive contents.

The tab 8001 is a tab for requesting permission for access to the exclusive contents from the tabs 8002a and 8002b. For example, a piece of link information indicating a link to a website that processes permission for access, as the linkage information, is associated with the tab 8001. In this example, "Thanks for Participation" appears on the tab 8001 so that the user can be prompted to acquire a greeting message regarding participation in the event from the event organizer, while its function to request permission for access to the exclusive contents is hidden.

The following description assumes that, while the URLs of the event-exclusive contents are URLs on the content server 402, the URL of the website that processes permission for access is a URL on the customer server 401. It is also assumed that the content server 402 is accessed via the customer server 401.

The following describes consequences of an operation by the user on the tab 8001 on the browse screen 800 appearing as in FIG. 41 (a). FIG. 41 (b) illustrates an exemplary consequence of having the tab 8001 operated by the user through a user operation on the search terminal 30. In the example of FIG. 41 (b), the tab 8001 being operated is highlighted.

In the search terminal 30, in response to the operation on the tab 8001, the image search application 301b uses the content request transmission unit 3117 to transmit a content request to the customer server 401 in accordance with the piece of link information corresponding to the tab 8001, the content request including: information indicating a website to be accessed suited for the link information; the user ID 313; and the locational information and the temporal information acquired by the search terminal 30 when the image of the photographic subject 31 (Step S603). Specifically, the content request is transmitted while being appended, as the parameter of a URL indicated by the piece of link information, to the URL.

Although the description herein assumes that the locational information and the temporal information to be transmitted to the customer server 401 are acquired when the image of the photographic subject 31 is acquired, this example is not limiting. For example, at Step S603, the image search application 301b may: use the terminal status acquisition unit 3116 to acquire locational information and temporal information at the time when the tab 8001 is operated; and then transmit them to the customer server 401.

In the customer server 401 (refer to FIG. 13), the content request transmitted from the search terminal 30 is received by the communication unit 4100 and transferred to the determination unit 4103. The determination unit 4103 determines, in accordance with a previously determined conditions, whether a user can be permitted to access the contents indicated by the pieces of link information that correspond to the tabs 8002a and 8002b based on either or both of the locational information and the temporal information included in the content request. Here, for descriptive purposes, the determination unit 4103 is assumed to determine whether the access can be permitted, in accordance with logical AND combinations of determinations based on the locational information and determinations based on the temporal information.

If determining that the access can be permitted based on the locational information and the temporal information, the determination unit 4103 transfers, to the registration unit 4102, the user ID 313 included in the content request received from the search terminal 30. The registration unit 4102 registers the user ID 313 transferred (Step S604). When there is the user ID 313 already registered, the registration unit 4102 may overwrites the user ID 313 already registered with the user ID 313 newly acquired, or may skip the registration. When the registration unit 4102 completes the registration of the user ID 313, the customer server 401 transmits a message to the search terminal 30 from which the user ID 313 has been transmitted (Step S605).

The message transmitted from the customer server 401 is received by and displayed on the search terminal 30. FIG. 41 (c) illustrates an example of a message display screen 801 on which the received message is displayed. In the example of FIG. 41 (c), the message display screen 801 has a greeting message 8010 to participants in the event displayed thereon. A certain operation on the search terminal 30 changes a displayed content, for example, from the message display screen 801 to the browse screen 800 illustrated in FIG. 41 (a).

The following describes states resulting from operations performed by the user with the tabs 8002a and 8002b after the display transitions from the message display screen 801 to the browse screen 800 in FIG. 41 (a). The operations with the tab 8002a and with the 8002b result in similar processing. The following therefore describes a case in which an operation is performed with the tab 8002a. FIG. 42 (a) illustrates an example of a state resulting from the operation performed on the search terminal 30 by the user with the tab 8002.

In the search terminal 30, when the operation is performed with the tab 8002a after the user ID 313 is registered in the customer server 401, the image search application 301b uses the content request transmission unit 3117 to transmit, to a URL displayed as the piece of link information corresponding to the tab 8002a, a content request for requesting a content. In this transmission, the content request transmission unit 3117 transmits the content request while including the user ID 313 therein (Step S606). This content request is received by the customer server 401 in line with the URL.

Upon receiving the content request that includes the user ID 313, the customer server 401 transfers the user ID 313 included in the received content request to the determination unit 4103. The customer server 401 uses the determination unit 4103 to determine, based on the user ID 313, whether the search terminal 30 that is the original transmitter of this user ID 313 is permitted to access the content as requested by the content request (Step S607).

More specifically, in the customer server 401, the determination unit 4103 inquires for whether the user ID 313 that is the same as the user ID 313 transferred thereto has already been registered by the registration unit 4102. If the user ID 313 has already been registered, the determination unit 4103 determines that access to the content is permitted as requested by the content request. The determination unit 4103 notifies the content processing unit 4101 of this determination result. In response to this notification, the content processing unit 4101 requests the content from the content server 402 in accordance with the content request (Step S608) and acquires the content (Step S609). The customer server 401 transmits the content acquired by the content processing unit 4101 to the search terminal 30 (Step S610).

The above processing enables the search terminal 30 to acquire the content corresponding to the tab 8002a selected on the browse screen 800. FIG. 42 (b) illustrates an example of a content display screen 802 on which the content corresponding to the tab 8002a is displayed on the search terminal 30.

If it is determined at Step S607 that the user ID 313 transferred thereto has not been registered by the registration unit 4102 and that access to the content is not permitted as requested by the content request, the determination unit 4103 transmits an error notification including a message indicating this determination result to the search terminal 30 (Step S611). The search terminal 30 receives this error notification and displays a content in line with the message included in the error notification.

FIG. 42 (c) illustrates an example of an error message display screen 803 on which this message is displayed. In this example, on a message display region 8030, a message is displayed indicating that check-in processing (registration processing for the user ID 313) using the tab 8001 has not been performed yet. An "OK" button 8031 is operated, so that the content displayed on the search terminal 30 is changed to, for example, the browse screen 800 in FIG. 41 (a) explained above.

Thus, in the first usage pattern enabled by the fourth contract pattern, whether to permit presentation of a particular content on the search terminal 30 can be controlled based on a status regarding the search terminal 30 at the time of capturing the image of the photographic subject 31. Consequently, only limited users can enjoy presentation of information obtained through image searches based on captured images of the photographic subject 31.

The tabs 8001, 8002a, and 8002b on the browse screen 800 described using drawings such as FIG. 41 (a) are set from the edit screen 480 on the registration terminal 20. With reference to FIG. 24, it is assumed, for example, that, while an image of a leaflet as a content to be presented within the event is displayed on the page edit region 484, the entire image of this leaflet is one target area.

In the link icon list region 487, the icon images 60 for setting pieces of the linkage information that are associated with the tabs 8001, 8002a, and 8002b, are prepared. As described above, a drag-and-drop operation is performed on each of the corresponding icon images 60, so that the icon image 60 is moved onto the leaflet image displayed on the page edit region 484 and is associated with the leaflet image. In the example illustrated in the drawings such as FIG. 41 (a), three of the icon images 60 are associated with the leaflet image in such a manner as to correspond to the three tabs 8001, 8002a, and 8002b that are associated with the respective pieces of the linkage information. Consequently, the three icon images 60 are displayed in the target area list region 486.

Figures 43, 44:
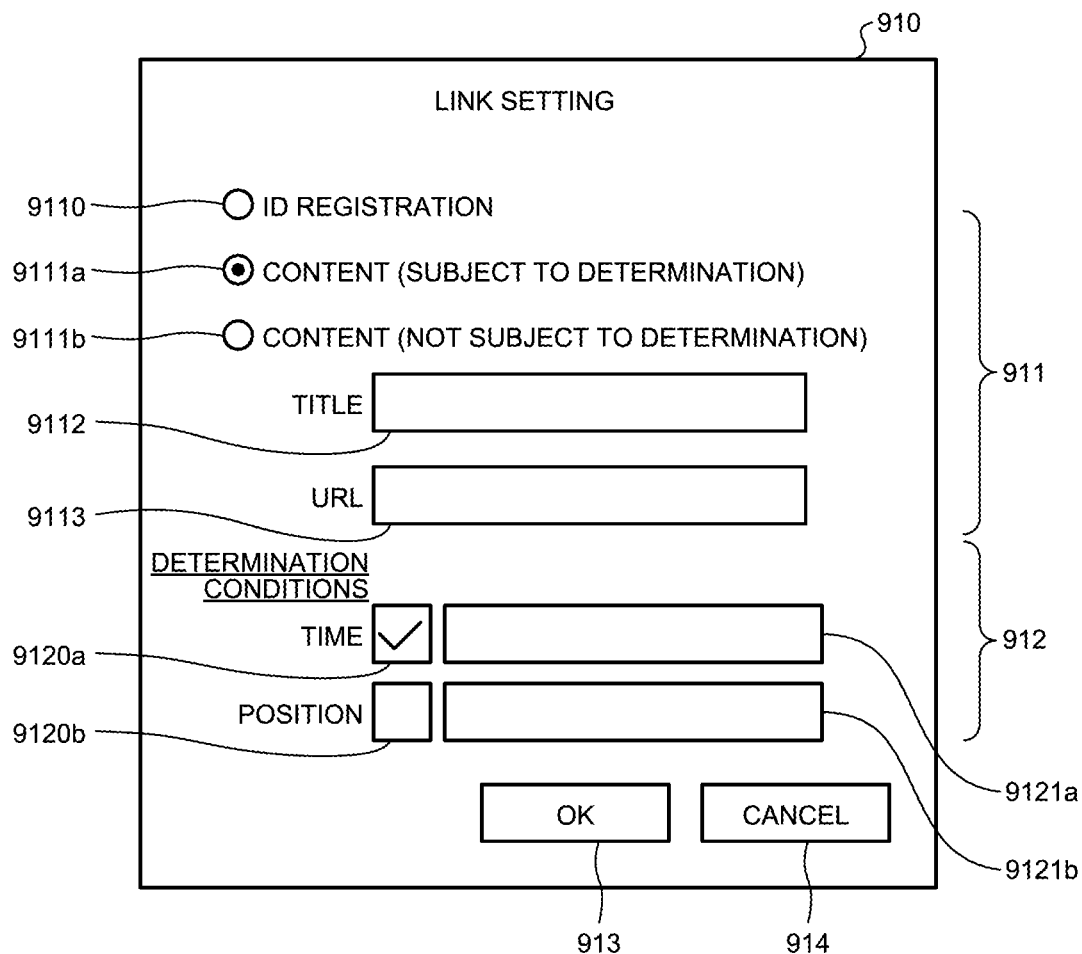
FIG. 43 is a diagram illustrating an example of a link setting screen according to the embodiments that is applicable to the first usage pattern enabled by the fourth contract pattern.
FIG. 44 is a diagram for explaining a method for setting up a user ID acquisition instruction according to the embodiments and applicable to the first usage pattern enabled by the fourth contract pattern.

For example, when one of the three icon images 60 displayed in the target area list region 486 is selected, the link setting screen is displayed. FIG. 43 is a diagram illustrating an example of a link setting screen 910 according to the embodiments that is applicable to the first usage pattern enabled by the fourth contract pattern. In FIG. 43, the link setting screen 910 includes a link information setting region 911, a determination condition setting region 912, an "OK" button 913, and "Cancel" button 914.

The link information setting region 911 includes radio buttons 9110, 9111a, and 9111b, and input regions 9112 and 9113. The radio buttons 9110, 9111a, and 9111b are buttons from which one is exclusively selectable, and any one of "ID registration", "Content (subject to determination)", and "Content (not subject to determination)" can be selected therefrom.

In one example, the radio button 9110 for "ID registration" sets the corresponding piece of the linkage information as a piece of the linkage information (for example, the tab 8001) that includes link information to a website (on the customer server 401) that registers and performs a determination on the user ID 313. The radio button 9111a for "Content (subject to determination)" sets the corresponding piece of the linkage information as a piece of the linkage information (for example, the tab 8002a and 8002b) that includes link information to which access is permitted after the user ID 313 is determined to have been registered. The radio button 9111b for "Content (not subject to determination)" sets the corresponding piece of the linkage information as an ordinary piece of the linkage information, that is, a piece of the linkage information that includes link information to which access is permitted without the user ID 313 registered.

In the input region 9112, a title for the linkage information set by a corresponding one of the radio buttons 9110, 9111a, and 9111b is entered. In the example in drawings such as FIG. 41 (a), a title such as "Thanks for Participation", "Event Report", or "Exclusive Merchandise" is entered in the input region 9112. In the input region 9113, link information (a URL) to be included in the linkage information set by the corresponding one of the radio buttons 9110, 9111a, and 9111b is entered.

The determination condition setting region 912 includes checkboxes 9120a and 9120b and input regions 9121a and 9121b that correspond to these respective checkboxes 9120a and 9120b. Entry to these checkboxes 9120a and 9120b and input regions 9121a and 9121b in the determination condition setting region 912 is enabled, for example, if the radio button 9110 that sets the linkage information for registering or determining the user ID 313 has been selected in the link information setting region 911 is specified.

The determination condition setting region 912 is a region in which conditions for determining whether access to a corresponding content can be permitted are set. In the checkbox 9120a and the input region 9121a, whether temporal information is set as a condition and temporal information (for example, a period) to be set as the condition are entered, respectively. Likewise, in the checkbox 9120b and the input region 9121*b*, whether locational information is set as a condition and locational information (for example, a range of coordinates) to be set as the condition are entered, respectively.

The "OK" bottom 913 reflects entries selected and entered in the link information setting region 911 and the determination condition setting region 912 to the linkage information. For example, for linkage to link information included in the linkage information set by either of the radio buttons 9110 and 9111*a* in the link information setting region 911, the user ID 313 needs to be transmitted to the customer server 401. For the transmission, a user ID acquisition instruction for acquisition of the user ID 313 is included in the link information.

For example, as illustrated in FIG. 44, the user ID acquisition instruction can be set up in a manner such that a file name ("idresist.html" in this example) in the corresponding URL is written with a parameter "?<uid>" following the file name. When the link information included in the linkage information has the parameter "?<uid>" added therein, the image search application 301*b* uses the ID acquisition unit 3118 to acquire the user ID 313 and replaces a part written as "<uid>" in the parameter "?<uid>" with the acquired user ID 313, for example.

The conditions set and entered in the determination condition setting region 912 are transmitted to the customer server 401. This example is not limiting, and an entry set and entered in the determination condition setting region 912 may be added as a parameter to a URL as described above.

The "Cancel" button 914 clears the link setting screen 910.

Figure 45:
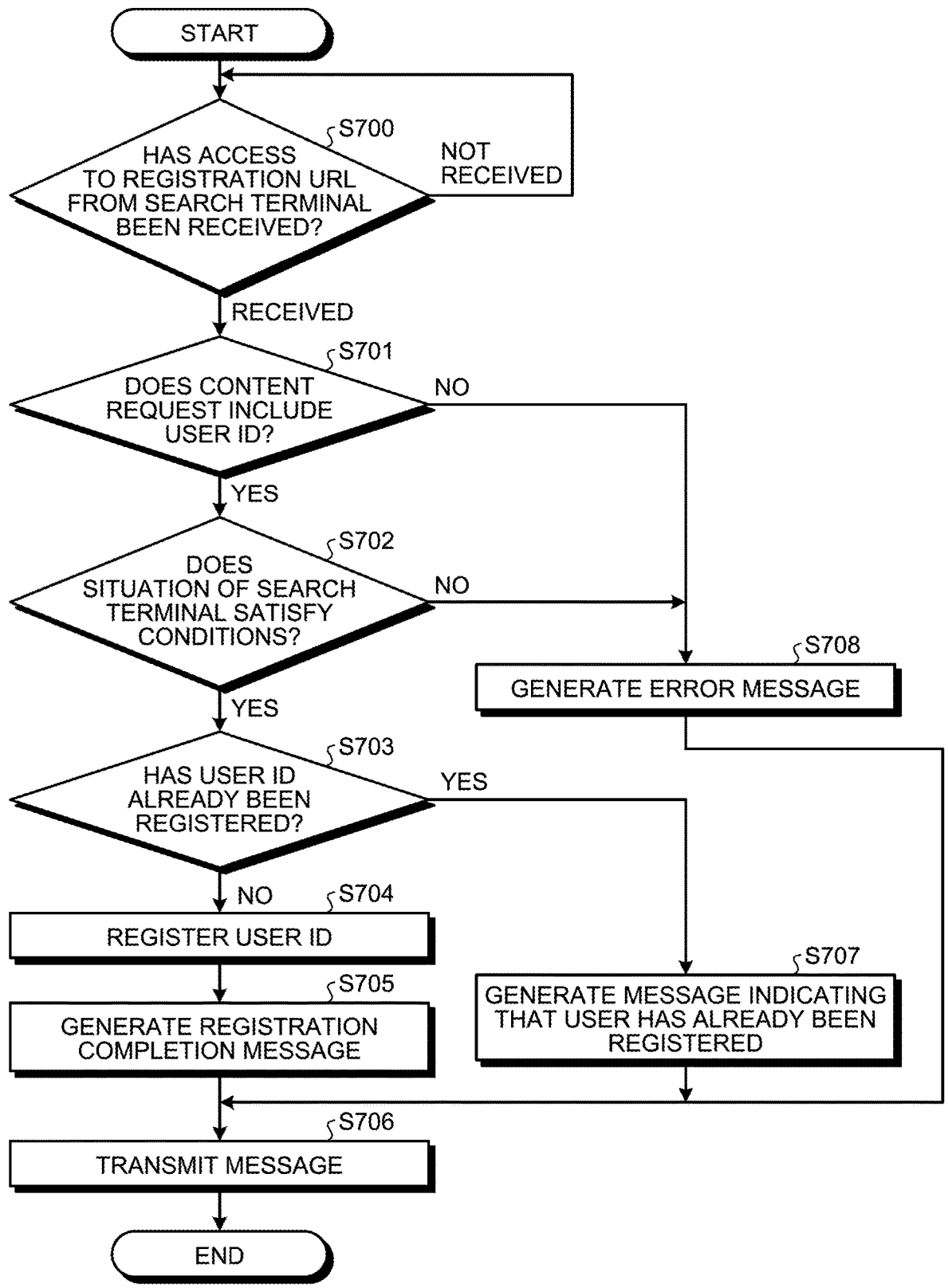
FIG. 45 is an exemplary flowchart illustrating user ID registration processing in the customer server according to the embodiments and applicable to the first usage pattern enabled by the fourth contract pattern.

FIG. 45 is an exemplary flowchart illustrating processing for registering the user ID 313 in the customer server 401 according to the embodiments and applicable to the first usage pattern enabled by the fourth contract pattern. At Step S700, the customer server 401 determines whether there has been received, from the search terminal 30, a content request for requesting access to the URL (hereinafter referred to as registration URL) of the website, on the customer server 401, that processes permission for access. If determining that a content request for requesting access to the registration URL has not been received from the search terminal 30 ("Not received" at Step S700), the customer server 401 repeats the processing at Step S700.

If determining instead that a content request for requesting access to the registration URL has been received from the search terminal 30 ("Received" at Step S700), the customer server 401 shifts the processing to Step S701. This content request includes the user ID 313, locational information, and temporal information as described in connection with Step S603 in FIG. 40.

At Step S701, the customer server 401 uses the determination unit 4103 to determine whether the content request transmitted from the search terminal 30 includes the user ID 313. If determining that the content request does not include the user ID 313 ("No" at Step S701), the customer server 401 shifts the processing to Step S708 to generate an error message.

If, instead, determining at Step S701 that the registration URL includes the user ID 313 ("Yes" at Step S701), the determination unit 4103 shifts the processing to Step S702.

At Step S702, the determination unit 4103 determines whether each piece of the status information included in the content request satisfies a certain condition. More specifically, the determination unit 4103 acquires the locational information and the temporal information from the content request, and determines whether the locational information and the temporal information thus acquired satisfy the conditions set in the above-described determination condition setting region 912 and transmitted to the customer server 401.

For example, when only a condition based on temporal information has been set in the determination condition setting region 912, the determination unit 4103 makes the determination using the temporal information of the locational information and the temporal information acquired. Likewise, when only a condition based on locational information has been set in the determination condition setting region 912, the determination unit 4103 makes the determination using only the locational information of the locational information and the temporal information acquired. For example, when conditions based on temporal information and locational information have been set in the determination condition setting region 912, the determination unit 4103 makes the determination based on logical AND combinations using the locational information and the temporal information acquired.

Figure 46:
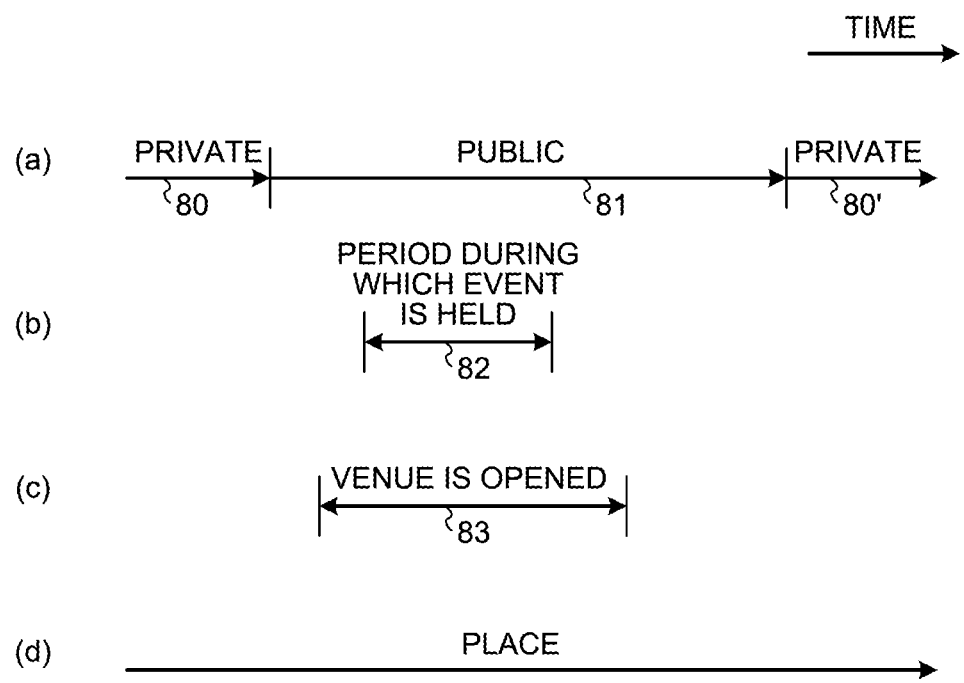
FIG. 46 is a diagram for explaining a condition-dependent determination based on locational information and temporal information according to the embodiments and suited for the first usage pattern enabled by the fourth contract pattern.

The following describes, using FIG. 46, condition-dependent determination based on locational information and temporal information according to the embodiments and suited for the first usage pattern enabled by the fourth contract pattern. In FIG. 46, time is assumed to progress from left to right. FIG. 46 (*a*) illustrates an example of a disclosed state of an image (feature information) corresponding to the photographic subject 31 and registered in the image DB 14 in the search server 100. As described already, a search from the search terminal 30 for an image registered in the image DB 14 is not enabled when the image is in the undisclosed state, and the search is enabled when the image is in the disclosed state. In the example of FIG. 46 (*a*), an image corresponding to the photographic subject 31 is caused to transition from the undisclosed state for a period 80 to the disclosed state for a period 81, and then transition again to the undisclosed state for a period 80' that follows these periods.

FIG. 46 (*b*) illustrates an example of a period during which an event related to the photographic subject 31 is held. In this example, a period 82 within the period 81 during which an image corresponding to the photographic subject 31 and registered in the image DB 14 is set as the period during which the event is held. The determination unit 4103 uses, for example, this period 82 during which this event is held as the condition based on temporal information; and, if the image of the photographic subject 31 has been captured during the period 82, determines the condition to be satisfied. In this case, the condition based on the locational information has not been set, which means that the determination is not affected by the location where the image of the photographic subject 31 has been captured.

FIG. 46 (*c*) illustrates an example of a period during which doors of a venue for the event related to the photographic subject 31 are open. In this example, a period 83 within the above-described period 81 is set as the period during which doors of the venue are open. For example, users can enter the venue during this period 83. For example, the determination unit 4103 uses, as the condition based on temporal information and the condition based on the locational information, this period 83 during which doors of the venue are open and the location of the venue. If the image of the photographic subject 31 has been captured during the period 83 and in the venue, the determination unit 4103 determines that the conditions are satisfied. In this case, it is also conceivable that the condition based on temporal information is further limited to the period 82 during which the event is held.

FIG. 46 (*d*) is an example of using a particular location itself as the condition based on locational information. For example, it is conceivable that a search using the search server 100 is made with a particular building or monument, or a scenery that can be viewed from a particular location, used as the photographic subject 31. In this case, a particular location itself for viewing the particular building or monument, or the particular location for viewing the certain scenery is used as the condition on locational information. In this case, the condition on temporal information is not set, which means that the determination is not affected by the time when the image of the photographic subject 31 has been captured. In contrast, during the periods 80 and 80' during which the image corresponding to the photographic subject 31 is in the undisclosed state, searches for an image corresponding to the photographic subject 31 are prohibited. Thus, it is also possible to temporally limit an image search based on the photographic subject 31 by using the disclosed and the undisclosed states of an image in the image DB 14.

Referring again to FIG. 45, if determining at Step S702 that the status information does not satisfy the certain condition ("No" at Step S702), the determination unit 4103 shifts the processing to Step S708 to generate an error message.

If, instead, determining at Step S702 that the status information satisfies the certain conditions ("Yes" at Step S702), the determination unit 4103 shifts the processing to Step S703. At Step S703, the determination unit 4103 acquires the user ID 313 included in the content request, and determines whether the acquired user ID 313 has already been registered. If determining that the user ID 313 has been already registered ("Yes" at Step S703), the determination unit 4103 shifts the processing to Step S707 to generate a message that it has already been registered.

If, instead, determining at Step S703 that the user ID 313 has not been registered yet ("No" at Step S703), the determination unit 4103 shifts the processing to Step S704. At Step S704, the customer server 401 uses the registration unit 4102 to register the user ID 313. At the next step S705, the registration unit 4102 generates a message to be displayed upon completion of registration of the user ID 313. This message is, for example, the greeting message 8010 that is displayed on the message display screen 801 in FIG. 41 (*c*).

The registration unit 4102 is capable of rendering the user ID 313 registered at Step S704 invalid after the elapse of a certain period of time.

At Step S706, the customer server 401 uses the communication unit 4100 to transmit the message generated at Step S705, Step S707, or Step S708*b* to the search terminal 30. After the message is transmitted at Step S706, the sequence of processing steps according to the flowchart of FIG. 45 ends.

The registration unit 4102 is capable of, while the user ID 313 has already been registered, rendering the already-registered user ID 313 invalid if it is determined at the above-described step S702 that the status information included in the content request does not satisfy the certain condition.

Figure 47:
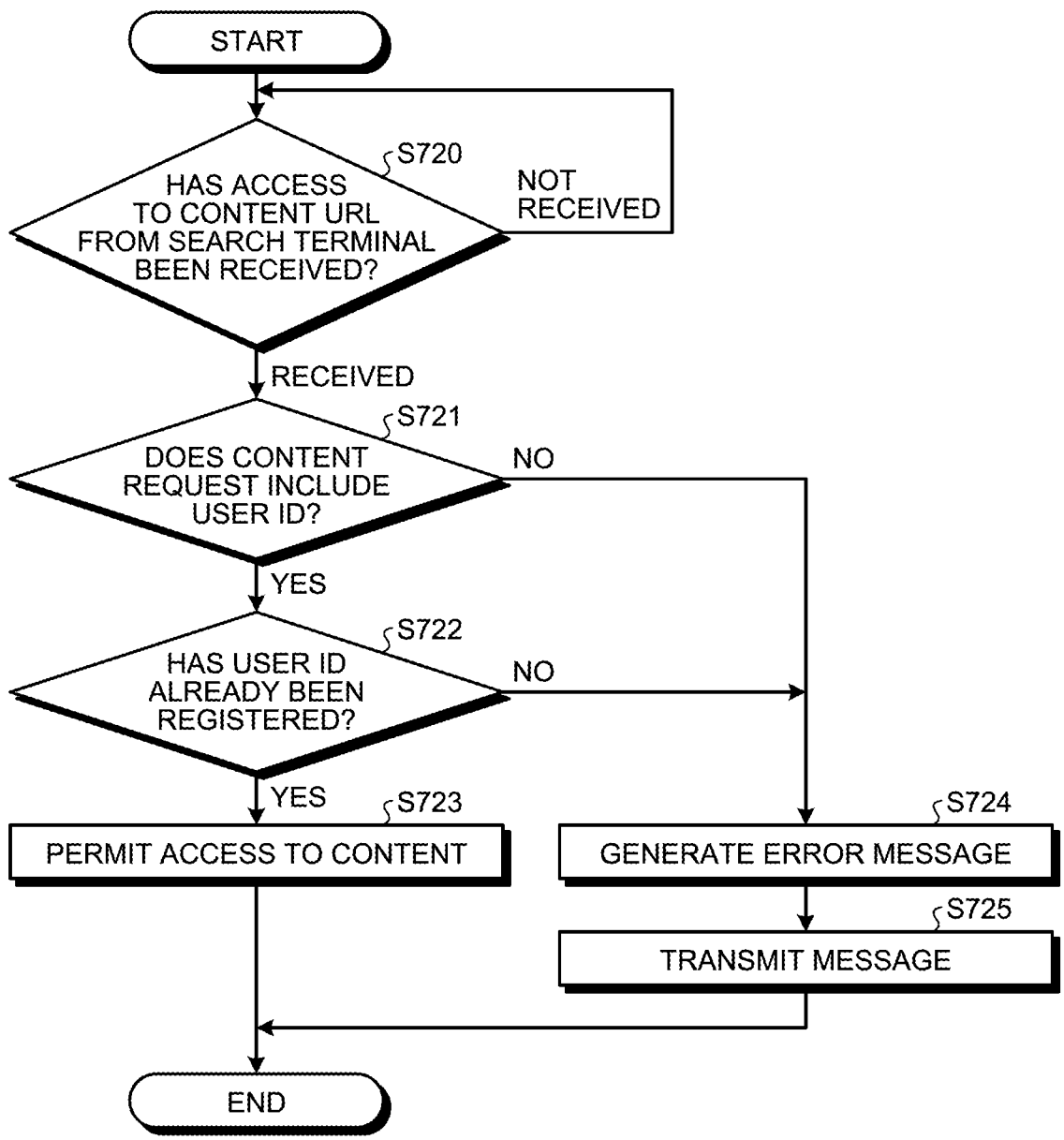
FIG. 47 is an exemplary flowchart illustrating permission processing in the customer server for access to a content according to the embodiments and suited for the first usage pattern enabled by the fourth contract pattern.

FIG. 47 is an exemplary flowchart illustrating permission processing in the customer server 401 for access to a content according to the embodiments and suited for the first usage pattern enabled by the fourth contract pattern. At Step S720, the customer server 401 determines whether there has been received, from the search terminal 30, a content request for requesting access to the URL (hereinafter referred to as content URL) of any content on the content server 402. If determining that the content request has not been received from the search terminal 30 ("Not received" at Step S720), the customer server 401 repeats the processing at Step S720.

If, instead, determining that the content request has been received from the search terminal 30 ("Received" at Step S720), the customer server 401 shifts the processing to Step S721. The received content request includes the user ID 313 as described in connection with Step S606 in FIG. 40.

At Step S721, the customer server 401 uses the determination unit 4103 to determine whether the content request transmitted from the search terminal 30 includes the user ID 313. If determining that the content request does not include the user ID 313 ("No" at Step S721), the customer server 401 shifts the processing to Step S724 to generate an error message. The generated error message is transmitted by the communication unit 4100 to the search terminal 30 at the next step S725, so that the sequence of processing steps according to the flowchart of FIG. 47 ends.

If, instead, determining at Step S721 that the content request includes the user ID 313 ("Yes" at Step S721), the determination unit 4103 shifts the processing to Step S722.

Next, at Step S722, the determination unit 4103 acquires the user ID 313 from the content request, and determines whether the same user ID as the acquired user ID 313 has already been registered by the registration unit 4102. If determining that the same user ID has not been registered ("No" at Step S722), the determination unit 4103 shifts the processing to Step S724 to generate an error message and transmits the generated error message to the search terminal 30 at the next step S725. The error message generated and transmitted here is, for example, the message explained using FIG. 42 (*c*) that indicates that check-in processing (registration processing for the user ID 313) has not been performed yet.

If, instead, determining at Step S722 that the user ID 313 has already been registered ("Yes" at Step S722), the determination unit 4103 shifts the processing to Step S723. At Step S723, the customer server 401 uses the content processing unit 4101 to permit access from the search terminal 30 to the content URL as requested by the content request. The search terminal 30 accesses the content URL to acquire the content and displays the acquired content as in the case of, for example, the content display screen 802 described using FIG. 42 (*b*).

After access to the content URL is permitted at Step S723, the sequence of processing steps according to the flowchart of FIG. 47 ends.

Second Usage Pattern Enabled by Fourth Contract Pattern According to Embodiments Next, a second usage pattern enabled by the fourth contract pattern according to the embodiments is described. In the foregoing first usage pattern enabled by the fourth contract pattern, the determinations based on the status information that indicates a status regarding the search terminal 30 is performed in the customer server 401. Instead, in the second usage pattern enabled by the fourth contract pattern, the determinations are performed in the search terminal 30.

Figure 48:
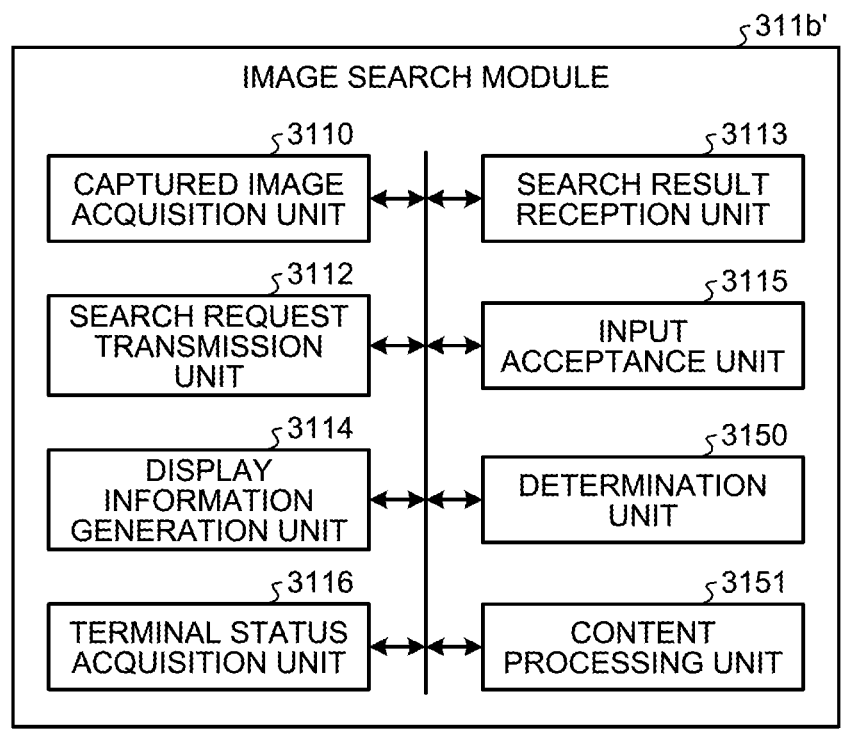
FIG. 48 is an exemplary functional block diagram for explaining functions of an image search module included in a search application installed on a search terminal, the functions according to the embodiments and being applicable to a second usage pattern enabled by the fourth contract pattern.

FIG. 48 is an exemplary functional block diagram for explaining functions of an image search module 311*b*' included in the image search application 301*b* installed on the search terminal 30, the functions according to the embodiments and being applicable to the second usage pattern enabled by the fourth contract pattern. In FIG. 48, the same reference numerals are assigned to the same components as those in FIG. 10 explained above, and detailed description thereof is omitted. In the second usage pattern enabled by the fourth contract pattern, the configurations described for the first usage pattern other than the configuration corresponding to that of the image search module 311b' illustrated in FIG. 48 are applicable, and description thereof is omitted here.

The image search module 311b' illustrated in FIG. 48 includes a determination unit 3150 and a content processing unit 3151 in addition to the units other than the ID acquisition unit 3118 in the image search module 311b illustrated in FIG. 39. The content processing unit 3151 corresponds to the content processing unit 4101 in the customer server 401 illustrated in FIG. 14.

The determination unit 3150 corresponds to the determination unit 4103 in the customer server 401 illustrated in FIG. 14 and performs determinations concerning permission for access from the search terminal 30 to a content. The determination unit 3150 suited for the second usage pattern enabled by the fourth contract pattern previously stores therein at least one condition for determination based on the status information of the search terminal 30, for example, either or both of a condition based on locational information and a condition based on temporal information.

Figure 49:
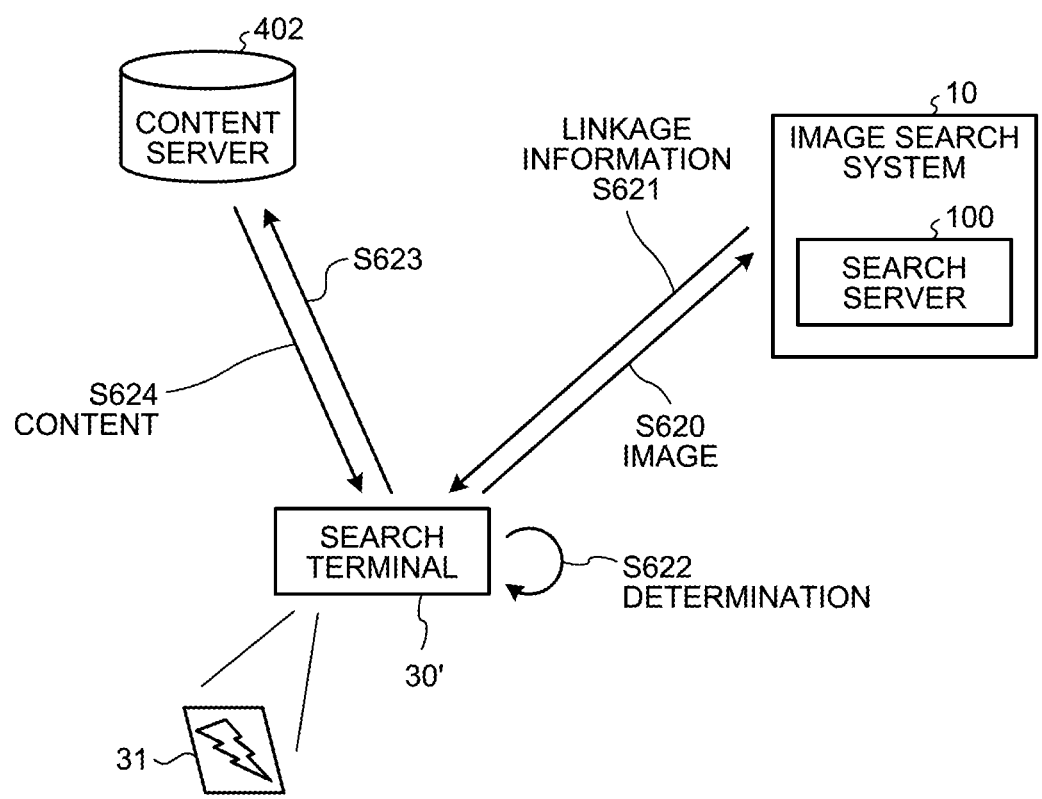
FIG. 49 is a block diagram schematically illustrating the procedure of content acquisition processing according to the embodiments and suited for the second usage pattern enabled by the fourth contract pattern.

FIG. 49 schematically illustrates the procedure of content acquisition processing according to the embodiments and suited for the second usage pattern enabled by the fourth contract pattern. In FIG. 49, the same reference numerals are assigned to the same components as those in FIG. 40 explained above, and detailed description thereof is omitted. In FIG. 49, a search terminal 30' has the image search application 301b (refer to FIG. 11) installed thereon that includes the image search module 311b'.

In FIG. 49, a user operates the search terminal 30' to capture an image of the photographic subject 31 using the image search application 301b and transmits, from the search terminal 30' to the image search system 10, the captured image (Step S620). The search terminal 30' measures locational information and temporal information, for example, when the image of the photographic subject 31 is captured, and stores the measured locational information and temporal information in, for example, the RAM 3002.

The captured image transmitted from the search terminal 30' is received by the image search system 10 and transferred to the search server 100. The search server 100 performs an image search based on the transferred captured image and transmits linkage information obtained as a search result to the search terminal 30 that is the original transmitter of the captured image (Step S621).

The search terminal 30' receives the linkage information transmitted from the search server 100 and displays thereon a screen based on the received linkage information. Here, based on the linkage information, the search terminal 30' is assumed to display the browse screen 800 described using FIG. 41 (a). That is, the tabs 8001, 8002a, and 8002b for accepting user operations are displayed on the browse screen 800. The tabs 8002a and 8002b are associated with, as the linkage information, pieces of link information that indicate links to event-exclusive contents.

The tab 8001 suited for the second usage pattern enabled by the fourth contract pattern is a tab for determining whether to permit access to the exclusive contents available using the tabs 8002a and 8002b.

The following describes consequences of an operation by the user on the tab 8001 on the browse screen 800 appearing as in FIG. 41 (a). In response to the operation on the tab 8001 by the user, the image search application 301b uses the determination unit 3150 to determine, based on the previously stored conditions and the locational information and temporal information that have been acquired by the search terminal 30' at the image capturing of the photographic subject 31, whether to permit access to the contents from the tabs 8002a and 8002b (Step S622).

If the determination unit 3150 determines that the locational information and the temporal information satisfy the conditions, the search terminal 30' permits access to the contents according to operations on the tabs 8002a and 8002b. The search terminal 30' then displays, for example, the message display screen 801 as illustrated in FIG. 41 (c).

The following describes consequences of, for example, having the tab 8002a operated by the user after the display transitions from the message display screen 801 to the browse screen 800 in FIG. 41 (a). In the search terminal 30', when the tab 8002a is operated after access to the contents is permitted at Step S622, the image search application 301b uses the content processing unit 3151 to transmit, to a URL indicated by the piece of link information corresponding to the tab 8002a, a content request for requesting the corresponding content (Step S623). In response to this content request, the content server 402 transmits the content to the search terminal 30' (Step S624).

Thus, also in the second usage pattern enabled by the fourth contract pattern, whether to permit presentation of a particular content on the search terminal 30' can be controlled based on a status regarding the search terminal 30 at the time of capturing an image of the photographic subject 31. Consequently, only limited users can enjoy presentation of information obtained through image searches based on captured images of the photographic subject 31.

In the second usage pattern enabled by the fourth contract pattern, the search terminal 30' itself determines whether to permit access based on the condition. Therefore, the user ID 313 and the status information do not need to be included in the content request when a content is requested.

Figure 50:
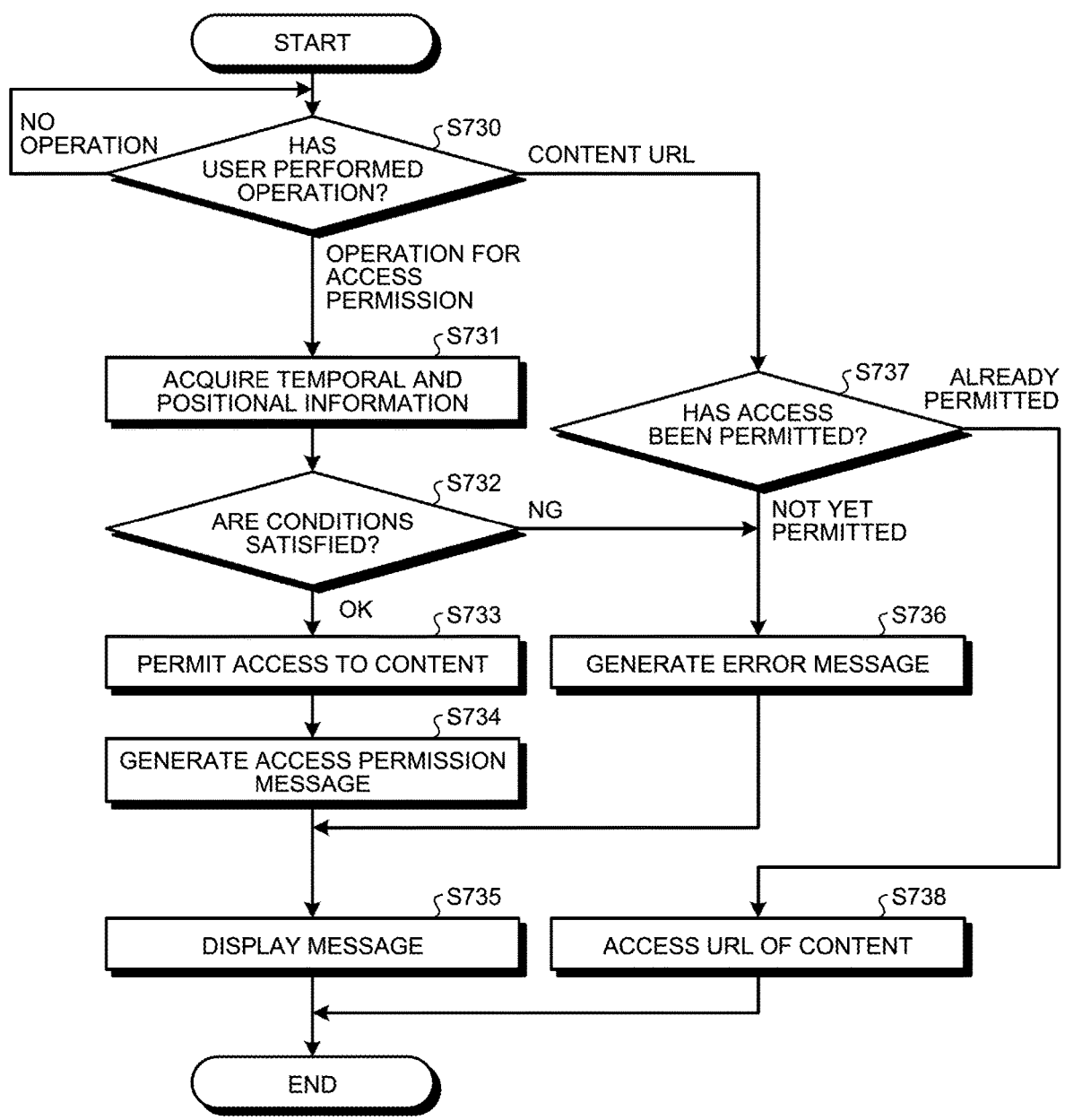
FIG. 50 is an exemplary flowchart illustrating processing to be executed by the search terminal, the processing according to the embodiments and being applicable to the second usage pattern enabled by the fourth contract pattern.

FIG. 50 is an exemplary flowchart illustrating processing to be executed by the search terminal 30', the processing according to the embodiments being applicable to the second usage pattern enabled by the fourth contract pattern. It is assumed that, prior to the processing according to the flowchart of FIG. 50, an image of the photographic subject 31 is captured by the search terminal 30, a search in the search server 100 is performed based on the captured image, and the browse screen 800 on which the tabs 8001, 8002a, and 8002b for accepting user operations are displayed is already displayed based on linkage information obtained as a search result. In the search terminal 30', when an image of the photographic subject 31 is captured, the terminal status acquisition unit 3116 acquires temporal information and locational information and stores the acquired information in, for example, the RAM 3002, the temporal information and locational information indicating a time and a location when and where the image is captured, respectively.

In FIG. 50, the search terminal 30' uses the image search application 301b to determine which of the following has been performed on the browse screen 800: an operation for access permission processing; an operation for selecting a content URL; and neither of these operations. If determining that neither of the operations has not been performed ("No operation" at Step S730), the image search application 301b repeats the processing at Step S730.

Instead, if the tab 8001 has been operated on the browse screen 800, the image search application 301b determines that an operation for permission processing for access has been performed ("Operation for access permission" at Step S730), and shifts the processing to Step S731. At Step S731, the search terminal 30' uses the determination unit 3150 to acquire temporal information and locational information that have been stored in the RAM 3002 and indicate the time when and the location where an image of the photographic subject 31 has been captured. This example is not limiting, and the temporal information and the locational information not necessarily need to be information obtained when an image of the photographic subject 31 is captured, and may be a time and a location that are obtained when the tab 8001 is operated.

The next step S732, the determination unit 3150 determines whether the temporal information and the locational information acquired at Step S731 satisfy the conditions previously stored in the determination unit 3150. If determining that the condition is not satisfied ("NG" at Step S732), the determination unit 3150 shifts the processing to Step S736 to generate an error message. After the error message is generated, the image search application 301*b* shifts the processing to Step S735 to display the error message, for example, as illustrated in FIG. 42 (*c*). After the message is displayed at Step S735, the sequence of processing steps according to the flowchart of FIG. 50 ends.

If, instead, determining at Step S732 that the condition is satisfied ("OK" at Step S732), the determination unit 3150 shifts the processing to Step S733. At Step S733, the content processing unit 3151 permits access to contents indicated by content URLs corresponding to the tabs 8002*a* and 8002*b*. At the next step S734, the content processing unit 3151 generates a message regarding access permission. After the message regarding access permission is generated, the image search application 301*b* shifts the processing to Step S735 to display the message, for example, as illustrated in FIG. 41 (*c*). After the message is displayed at Step S735, the sequence of processing steps according to the flowchart of FIG. 50 ends.

Instead, if the tab 8002*a* or 8002*b* has been operated on the browse screen 800 at the above-described step S730, the image search application 301*b* determines that an operation for selecting a content URL has been performed ("Content URL" at Step S730), and shifts the processing to Step S737.

At Step S737, the image search application 301*b* uses the content processing unit 3151 to determine whether access to content URLs corresponding to the tabs 8002*a* and 8002*b* has been permitted. If determining that the access has not yet been permitted ("Not yet permitted" at Step S737), the content processing unit 3151 shifts the processing to Step S736 to generate an error message. After the error message is generated, the image search application 301*b* shifts the processing to Step S735 to display the error message, for example, as illustrated in FIG. 42 (*c*). After the message is displayed at Step S735, the sequence of processing steps according to the flowchart of FIG. 50 ends.

If, instead, determining at Step S737 that the access has already been permitted ("Already permitted" at Step S737), the content processing unit 3151 shifts the processing to Step S738. At Step S738, the content processing unit 3151 accesses the content URL corresponding to the tab 8002*a* or 8002*b* determined to have been operated at Step S730. This step enables the search terminal 30' to, for example, acquire a content from the content server 402 and display the acquired content on the content display screen 802 as illustrated in FIG. 42 (*b*). Upon completion of access to the content URL at Step S738, the sequence of processing steps according to the flowchart of FIG. 50 ends.

Third Usage Pattern Enabled by Fourth Contract Pattern According to Embodiments

Next, a third usage pattern enabled by the fourth contract pattern according to the embodiments is described. The determinations based on the status information indicating a status regarding the search terminal 30 are performed in the customer server 401 in the first usage pattern enabled by the fourth contract pattern, and are performed in the search terminal 30 in the second usage pattern enabled by the fourth contract pattern. Instead, in the third usage pattern enabled by the fourth contract pattern, the determinations are performed in the image search system 10.

Figure 51:
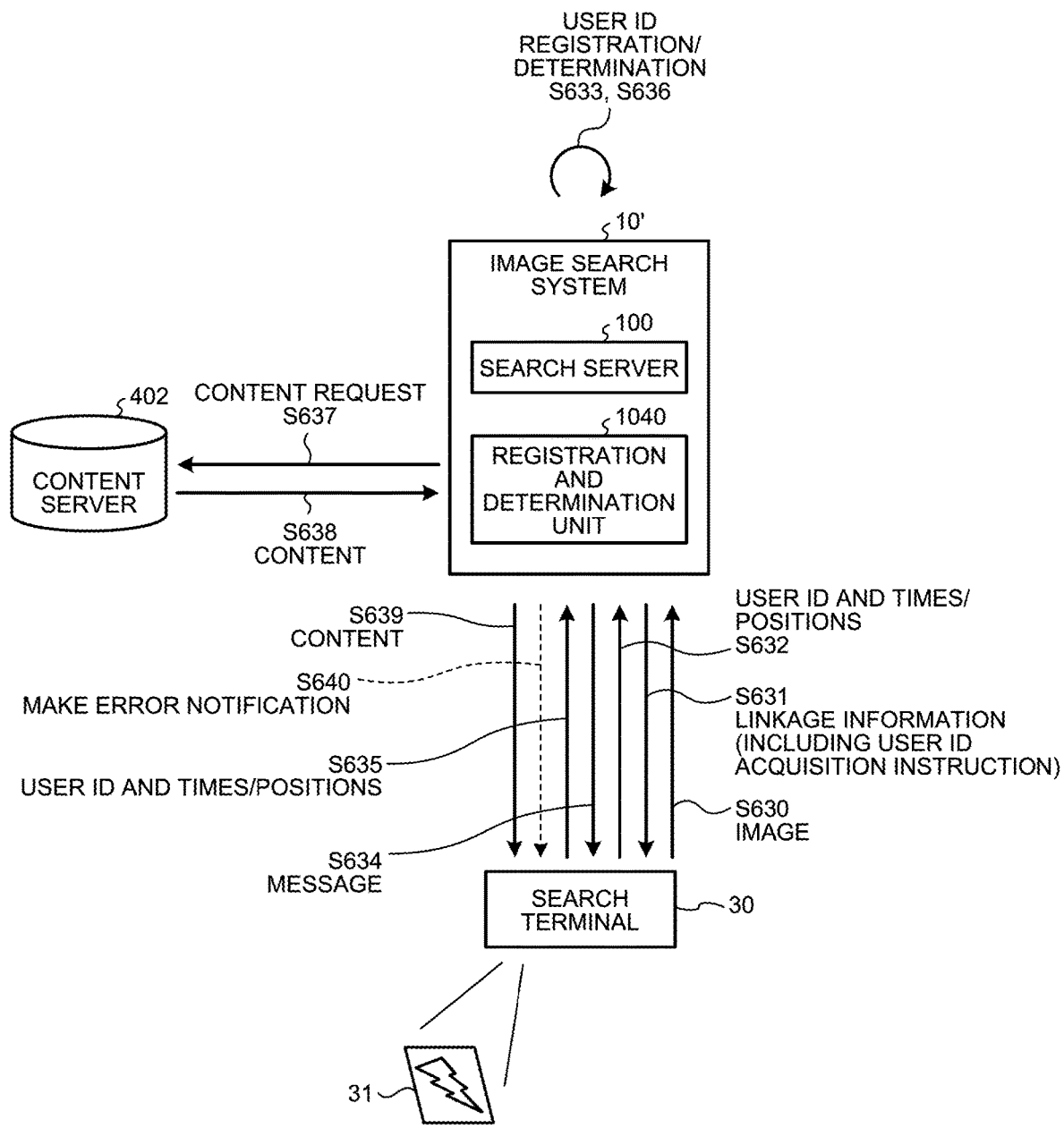
FIG. 51 is a block diagram schematically illustrating the procedure of content acquisition processing according to the embodiments and applicable to a third usage pattern enabled by the fourth contract pattern.

FIG. 51 schematically illustrates the procedure of content acquisition processing according to the embodiments and applicable to the third usage pattern enabled by the fourth contract pattern. In FIG. 51, the same reference numerals are assigned to the same components as those in FIG. 40 explained above, and detailed description thereof is omitted. In FIG. 51, an image search system 10' includes a registration and determination unit 1040 in addition to the units in the image search system 10 suited for the first usage pattern.

Figure 52:
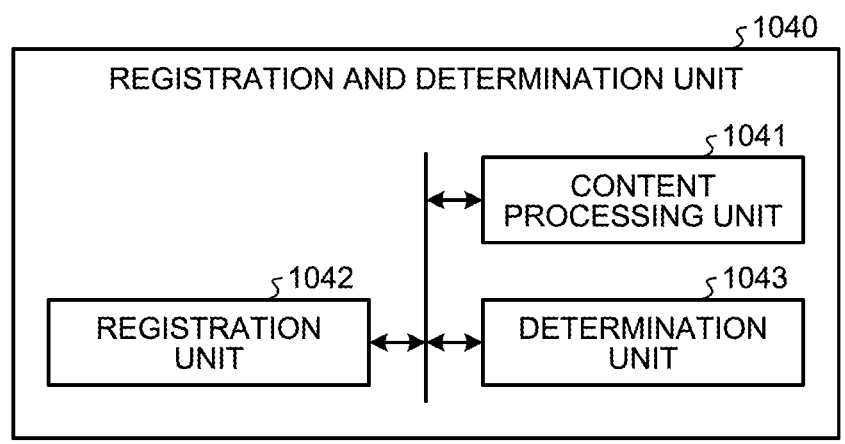
FIG. 52 is an exemplary functional block diagram for explaining functions of a registration and determination unit according to the embodiments and applicable to the third usage pattern enabled by the fourth contract pattern.

FIG. 52 is an exemplary functional block diagram for explaining functions of the registration and determination unit 1040 according to the embodiments and applicable to the third usage pattern enabled by the fourth contract pattern. The registration and determination unit 1040 includes a content processing unit 1041, a registration unit 1042, and a determination unit 1043. The content processing unit 1041, the registration unit 1042, and the determination unit 1043 here have functions corresponding to the content processing unit 4101, the registration unit 4102, and the determination unit 4103, respectively, in the customer server 401 that are described using FIG. 14.

In FIG. 51, a user operates the search terminal 30' to capture an image of the photographic subject 31 using the image search application 301*b* and transmits the captured image from the search terminal 30 to the image search system 10' (Step S630). The search terminal 30 measures locational information and temporal information, for example, when the image of the photographic subject 31 is captured, and stores the measured locational information and temporal information in, for example, the RAM 3002.

The captured image transmitted from the search terminal 30 is received by the image search system 10' and transferred to the search server 100. The search server 100 performs an image search based on the transferred captured image and transmits linkage information obtained as a search result to the search terminal 30 that is the original transmitter of the captured image (Step S631). Here, the linkage information transmitted from the search server 100 has been generated in such a manner as to include a user ID acquisition instruction to be used for acquiring the user ID 313 from the search terminal 30.

The search terminal 30 receives the linkage information transmitted from the search server 100 and displays thereon a screen based on the received linkage information. Here, based on the linkage information, the search terminal 30' is assumed to display the browse screen 800 described using FIG. 41 (*a*) on which the tabs 8001, 8002*a*, and 8002*b* for accepting user operations are displayed. While the tabs 8002*a* and 8002*b* are associated with, as the linkage information, pieces of link information that indicate links to event-exclusive contents, the tab 8001 is a tab for requesting permission for access to the exclusive contents from the tabs 8002*a* and 8002*b*.

When a user performs an operation on the browse screen 800 in the state of FIG. 41 (*a*), for example, with the tab 8001, the image search application 301*b* transmits a content request to the image search system 10' in accordance with the piece of link information corresponding to the tab 8001. The content request includes: the user ID 313; and the locational information and the temporal information acquired by the search terminal 30 when the image of the photographic subject 31 has been captured (Step S632).

The content request transmitted from the search terminal 30 is received by the image search system 10' and transferred to the registration and determination unit 1040. The registration and determination unit 1040 uses the determination unit 1043 to determine, in accordance with previously determined conditions, whether a user can be permitted to access the contents indicated by the pieces of link information that correspond to the tabs 8002*a* and 8002*b*, based on either or both of the locational information and the temporal information included in the content request.

If the determination unit 1043 determines that the access can be permitted based on the locational information and the temporal information, the registration and determination unit 1040 uses the registration unit 1042 to register the user ID 313 included in the content request received from the search terminal 30 (Step S633). After the registration unit 1042 completes registration of the user ID 313, the image search system 10' transmits a message to the user ID 313 that is the original transmitter of the search terminal 30 (Step S634). In accordance with this message, the search terminal 30 displays, for example, the message display screen 801 as illustrated in FIG. 41 (*c*).

The following describes consequences of an operation performed by the user on the tab 8002*a* or 8002*b* on the search terminal 30 after the display transitions from the message display screen 801 to the browse screen 800 in FIG. 41 (*a*). If, for example, the tab 8002*a* is operated, the search terminal 30 uses the content request transmission unit 3117 to transmit, while including the user ID 313 in a content request for requesting a content from the URL indicated by a piece of link information that corresponds to the tab 8002*a* (Step S635).

Upon receiving the content request that includes the user ID 313, the image search system 10' transfers the user ID 313 included in the received content request to the registration and determination unit 1040. The registration and determination unit 1040 uses the determination unit 1043 to inquire for whether the transferred user ID 313 has already been registered by the registration unit 1042, and determines, based on the result of the inquiry, whether the search terminal 30 that is the original transmitter of the user ID 313 is permitted to access the content as requested by the content request (Step S636).

If the user ID 313 has already been registered, the determination unit 1043 determines that access to the content as requested by the content request is permitted. The determination unit 1043 notifies the content processing unit 1041 of this determination result. In response to this notification, the content processing unit 1041 requests the content from the content server 402 in accordance with the content request (Step S637), and acquires the content (Step S638). The image search system 10' transmits the content acquired by the content processing unit 1041 to the search terminal 30 (Step S639).

If, instead, determining at Step S636 that the transferred user ID 313 has not been registered by the registration unit 1042 and that access to the content is not permitted as requested by the content request, the determination unit 1043 transmits an error notification including a message indicating this determination result to the search terminal 30 (Step S640).

Thus, also in the third usage pattern enabled by the fourth contract pattern, whether to permit presentation of a particular content on the search terminal 30 can be controlled based on a status regarding the search terminal 30 at the time of capturing an image of the photographic subject 31. Consequently, information obtained through image searches based on captured images of the photographic subject 31 can be presented only to limited users.

Figure 53:
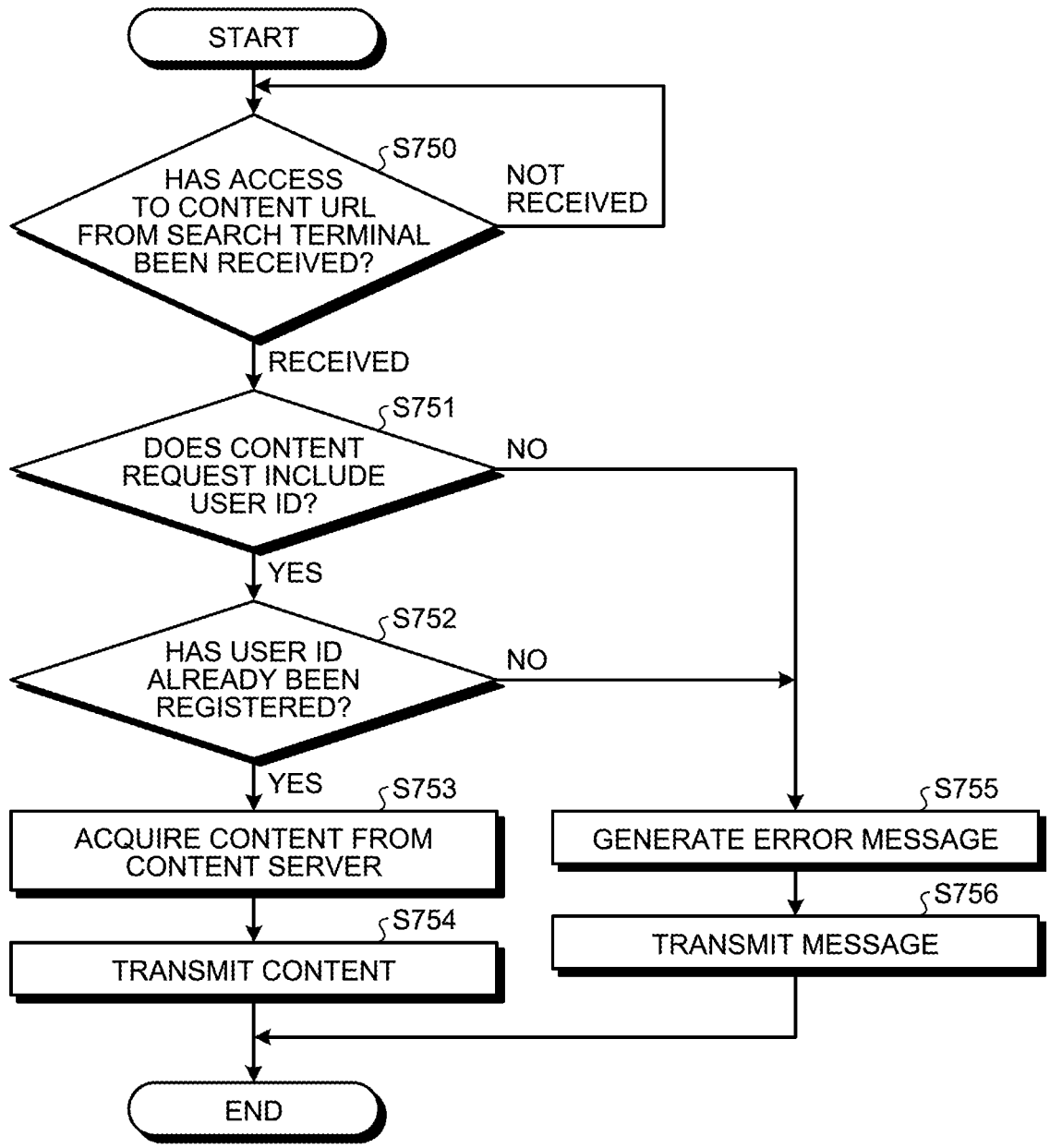
FIG. 53 is an exemplary flowchart illustrating permission processing in an image search system for access to a content according to the embodiments and applicable to the third usage pattern enabled by the fourth contract pattern.

FIG. 53 is an exemplary flowchart illustrating permission processing in the image search system 10' for access to a content, according to the embodiments and being applicable to the third usage pattern enabled by the fourth contract pattern. Registration processing for the user ID 313 in the image search system 10' is the same as the registration processing in the customer server 401 described using FIG. 45 except that a different entity performs the processing. Description of the processing is therefore omitted here.

The permission processing in the image search system 10' for access to a content is substantially the same as the permission processing in the customer server 401 described using FIG. 47. In FIG. 53, in the image search system 10', the registration and determination unit 1040 determines at Step S750 whether there has been received, from the search terminal 30, a content request for requesting access to the URL (hereinafter referred to as content URL) of any content on the content server 402. If determining that the content request has not been received from the search terminal 30 ("Not received" at Step S750), the registration and determination unit 1040 repeats the processing at Step S750.

If, instead, determining that the content request has been received from the search terminal 30 ("Received" at Step S750), the registration and determination unit 1040 shifts the processing to Step S751. Here, the received content request includes the user ID 313 as described in connection with Step S606 in FIG. 40.

At Step S751, the registration and determination unit 1040 uses the determination unit 1043 to determine whether the content request transmitted from the search terminal 30 includes the user ID 313. If the content request is determined not to include the user ID 313 ("No" at Step S751), the registration and determination unit 1040 shifts the processing to Step S755 to generate an error message. The generated error message is transmitted to the search terminal 30 at the next step S756, so that the sequence of processing steps according to the flowchart of FIG. 53 ends.

If, instead, the content request is determined to include the user ID 313 at Step S751 ("Yes" at Step S751), the determination unit 1043 shifts the processing to Step S752.

At Step S752, the determination unit 1043 acquires the user ID 313 included in the content request, and determines whether the same user ID as the acquired user ID 313 has already been registered by the registration unit 1042. If determining that the same user ID has not been registered ("No" at Step S752), the determination unit 1043 shifts the processing to Step S755 to generate an error message and transmits the generated error message to the search terminal 30 at the next step S756.

If, instead, determining at Step S752 that the user ID 313 has already registered ("Yes" at Step S752), the determination unit 1043 shifts the processing to Step S753. At Step S753, the registration and determination unit 1040 uses the content processing unit 1041 to acquire the content from the content server 402 in accordance with the content request. At the next step S754, the content processing unit 1041 transmits the acquired content to the search terminal 30.

After the content is transmitted to the search terminal 30 at Step S754, the sequence of processing steps according to the flowchart of FIG. 53 ends.

Fourth Usage Pattern Enabled by Fourth Contract Pattern According to Embodiments Next, a fourth usage pattern enabled by the fourth contract pattern according to the embodiments is described. In the foregoing first to third usage patterns enabled by the fourth contract pattern, accessing a URL results in acquiring a content indicated by another URL. In contrast, in the fourth usage patterns enabled by the fourth contract pattern, accessing a plurality of URLs results in acquiring a content indicated by another URL.

In the following, the foregoing system configuration suited for the first usage pattern enabled by the fourth contract pattern is adoptable as a system configuration for the fourth usage pattern enabled by the fourth contract pattern. Description thereof is therefore omitted. This example is not limiting, and the foregoing system configuration suited for the second usage pattern or the third usage pattern enabled by the fourth usage pattern may be adopted as the system configuration for the fourth usage pattern enabled by the fourth contract pattern.

Figure 54:
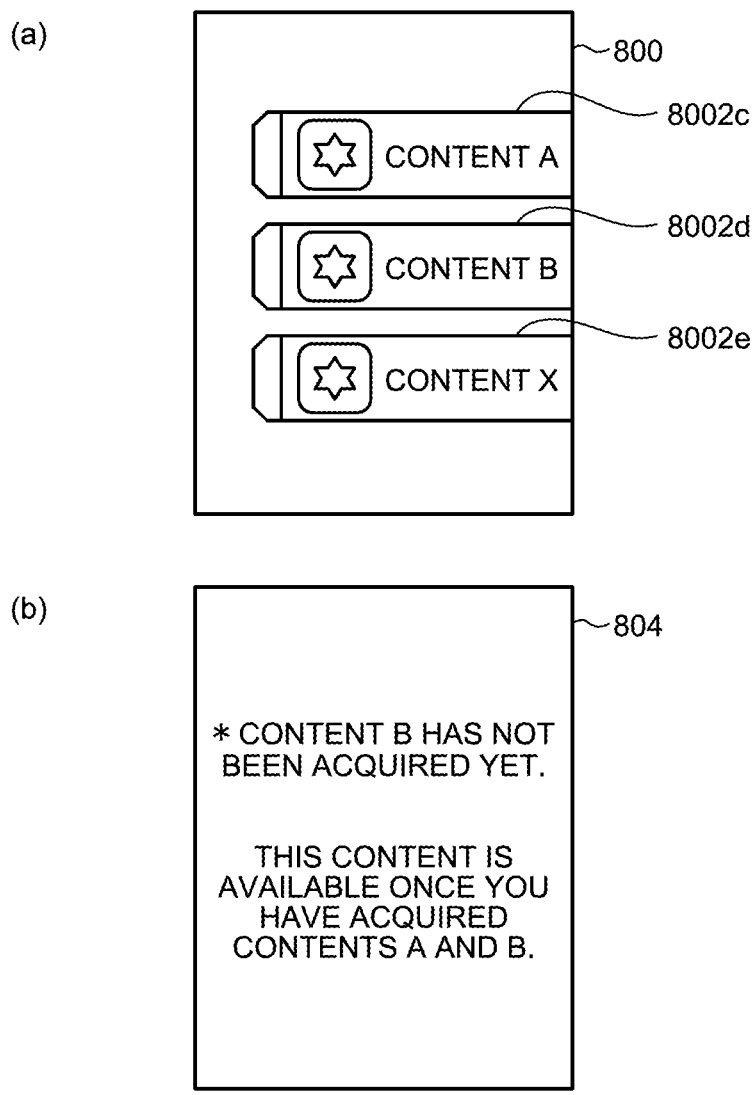
FIG. 54 illustrates an example of a screen displayed in the content acquisition processing according to the embodiments that is applicable to a fourth usage pattern enabled by the fourth contract pattern.

FIG. 54 illustrates an example of a screen displayed on the search terminal 30 in the content acquisition processing according to the embodiments that is applicable to the fourth usage pattern enabled by the fourth contract pattern. FIG. 54 (*a*) illustrates an example of the browse screen 800 based on linkage information transmitted from the image search system 10 as a result of a search using a captured image of the photographic subject 31 transmitted from the search terminal 30. In the example of FIG. 54 (*a*), tabs 8002c, 8002d, and 8002e are displayed that correspond to different pieces of link information indicated as the linkage information. For example, the respective tabs 8002c, 8002d, and 8002e are associated with pieces of link information that indicate links to event-exclusive contents A, B, and X.

Here, the content X is assumed to be a content that can be acquired only if both of the contents A and B have been acquired. That is, even when the tab 8002e is operated, acquisition of the content X is not enabled while at least either of the contents A and B is yet to be obtained.

For example, while the content B is yet to be obtained after the content A has been acquired with the tab 8002c operated, a message display screen 804 containing an error message as illustrated in FIG. 54 (*b*) appears on the search terminal 30 when the tab 8002e corresponding to the content X is operated. In the example of FIG. 54 (*b*), information indicating conditions for acquisition of the content X and any condition yet to be satisfied in this acquisition conditions is contained as the error message.

When any one of the tabs 8002c, 8002d, and 8002e is operated, the search terminal 30 generates a content request while including therein the content request, the User ID 313 and locational information and temporal information that have been acquired at the time of capturing the image of the photographic subject 31, the content request requesting a content corresponding to link information corresponding to the operated tab.

Although the example of FIG. 54 (*a*) assumes that the content X can be acquired only if the two contents A and B have been acquired, this example is not limiting. For example, the conditions for acquisition of the content X may be set to acquisition of three or more contents, or a plurality of contents may be acquired by satisfaction of acquisition conditions.

Hereinafter, the foregoing content X that can be acquired only if a plurality of contents have been acquired is referred to as the cross content, and the contents A and B the acquisition of which is set as conditions for acquisition of the cross content are referred to as condition contents.

Figure 55:
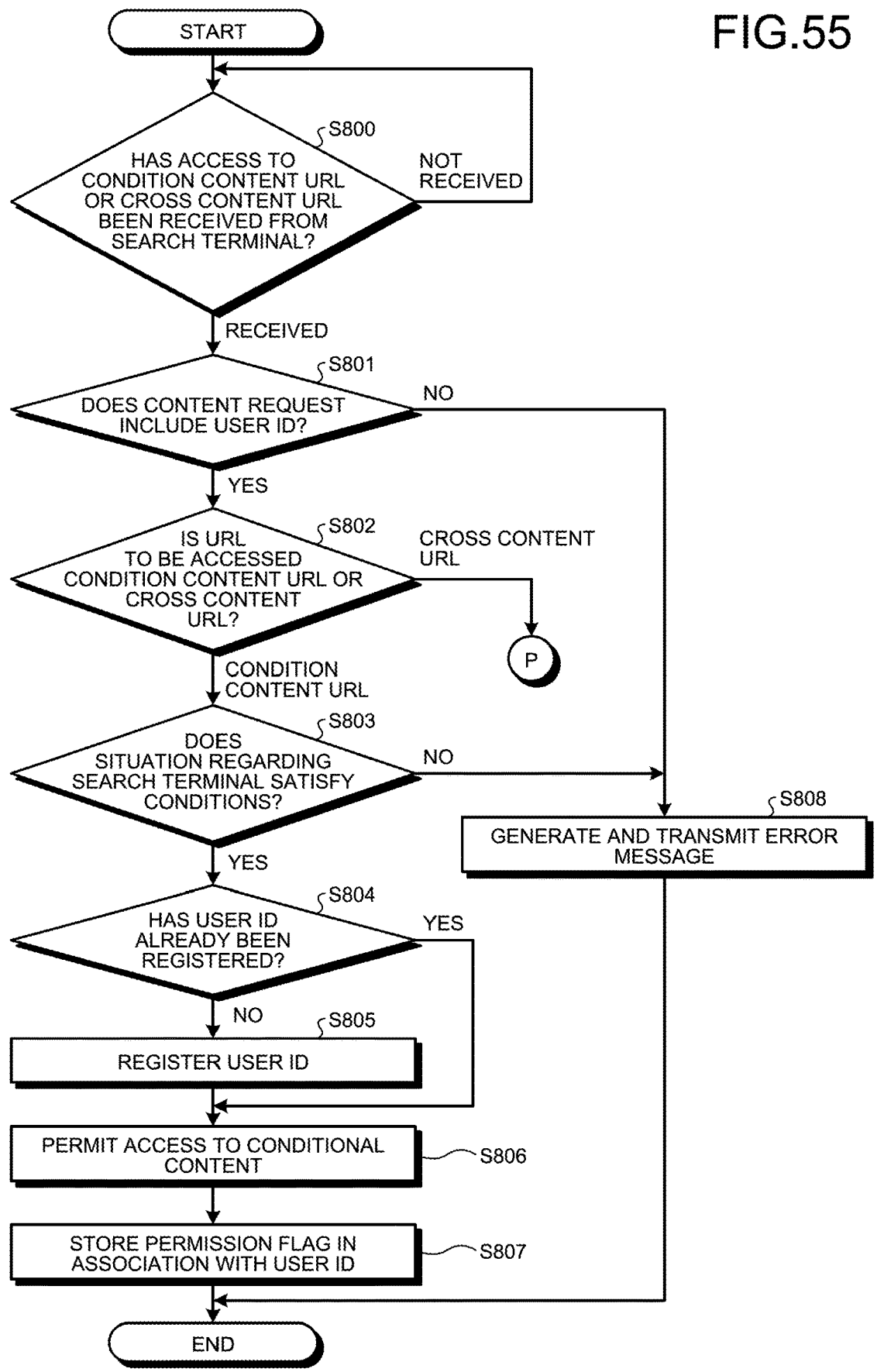
FIG. 55 is an exemplary flowchart illustrating permission processing in the customer server for access to condition contents and a cross content according to the embodiments and applicable to the fourth usage pattern enabled by the fourth contract pattern.
Figure 56:
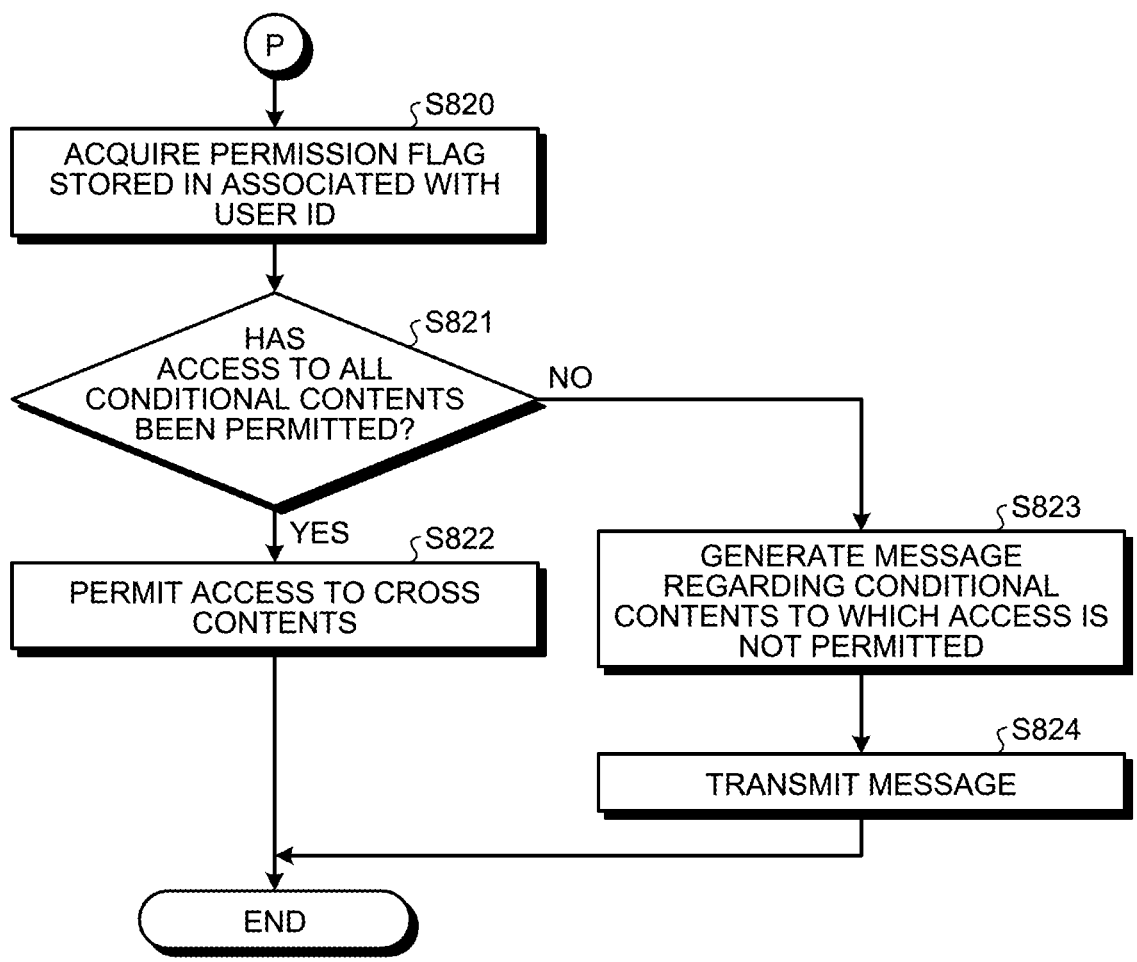
FIG. 56 is an exemplary flowchart illustrating permission processing in the customer server for access to condition contents and a cross content according to the embodiments and applicable to the fourth usage pattern enabled by the fourth contract pattern.

FIG. 55 and FIG. 56 are exemplary flowcharts illustrating permission processing in the customer server 401 for access to the condition contents and the cross content suited for the fourth usage pattern enabled by the fourth contract pattern. Reference signs "P" in FIG. 55 and FIG. 56 means that the processing is shifted from reference sign "P" to corresponding reference sign "P" from FIG. 55 to FIG. 56.

At Step S800, the customer server 401 determines whether there has been received, from the search terminal 30, a content request requesting access to any one of the URLs of the condition contents and the cross content (hereinafter referred to as condition content URLs and cross content URL, respectively) on the content server 402. If determining that the content request has not been received from the search terminal 30 ("Not received" at Step S800), the customer server 401 repeats the processing at Step S800.

If, instead, determining that the content request has been received from the search terminal 30 ("Received" at Step S800), the customer server 401 shifts the processing to Step S801.

At Step S801, the customer server 401 determines whether the content request transmitted from the search terminal 30 includes the user ID 313. If the content request is determined not to include the user ID 313 ("No" at Step S801), the customer server 401 shifts the processing to Step S808 to generate an error message and transmits the generated error message. After the error message is transmitted, the sequence of processing steps according to the flowchart of FIG. 55 ends.

If, instead, the content request is determined to include the user ID 313 ("Yes" at Step S801), the customer server 401 shifts the processing to Step S802.

At Step S802, the customer server 401 determines whether a URL to be accessed as requested by the content request received at Step S800 is any one of the condition content URL or the cross content URL. If the URL to be accessed is determined to be the cross content URL ("Cross content URL" at Step S802), the customer server 401 shifts the processing to Step S820 in FIG. 56 in accordance with reference signs "P". The processing according to the flowchart of FIG. 56 is to be described later.

If, instead, the URL to be accessed is determined to be the condition content URL at Step S802 ("Condition content URL" at Step S802), the customer server 401 shifts the processing to Step S803. Here, for descriptive purposes, access to the condition content A of the condition contents A and B illustrated in FIG. 54 (*a*) is assumed to be requested. At Step S803, the customer server 401 determines whether the status information (for example, the locational information and the temporal information) included in the content request satisfies certain conditions.

The customer server 401 may set the conditions differently for different condition content URLs. For example, it is possible to set temporal information A and locational information A as the conditions for the condition content URL of the condition content A and set temporal information B as the condition for the condition content URL of the condition content B.

If the status information is determined not to satisfy the certain condition at Step S803 ("No" at Step S803), the customer server 401 shifts the processing to Step S808 to generate an error message and transmits the generated error message. After the error message is transmitted, the sequence of processing steps according to the flowchart of FIG. 55 ends.

If, instead, the status information is determined to satisfy the certain condition at Step S803 ("Yes" at Step S803), the customer server 401 shifts the processing to Step S804. Next, at Step S804, the customer server 401 acquires the user ID 313 from the content request, and determines whether the same user ID as the acquired user ID 313 has already been registered. If the same user ID is determined to have been registered ("Yes" at Step S804), the customer server 401 shifts the processing to Step S806.

If the same user ID as the user ID 313 is determined not to have been registered at Step S804 ("No" at Step S804), the customer server 401 shifts the processing to Step S805. At Step S805, the customer server 401 registers the user ID 313 acquired from the condition content URL. After the completion of registration of the user ID 313, the customer server 401 shifts the processing to Step S806.

At Step S806, the customer server 401 permits access from the search terminal 30 to the condition content URL that is the URL to be accessed as requested by the content request received at Step S800. This step enables the search terminal 30 to access this condition content URL to, for example, acquire the condition content A and display the acquired condition content A.

At the next step S807, the customer server 401 stores a permission flag in association with the user ID 313 acquired at Step S801, the permission flag indicating that access to this condition content URL has been permitted. In this example, the customer server 401 stores the permission flag for the condition content URL of the condition content A while associating the permission flag with the user ID 313. Upon completion of association of the permission flag with the user ID 313, the sequence of processing steps according to the flowchart of FIG. 55 ends.

Next, the processing according to the flowchart of FIG. 56 is described. As described above, at Step S802 in the flowchart of FIG. 55, if the URL to be accessed as requested by the content request is determined to be the cross content URL ("Cross content URL" at Step S802), the processing is shifted to Step S820 in FIG. 56.

At Step S820, the customer server 401 acquires the permission flag or flags associated with the user ID 313 acquired at Step S801 in the flowchart of FIG. 55. At the next step S821, based on the permission flag or flags acquired at Step S820, the customer server 401 determines whether access to all of the condition contents has been permitted. For example, with reference to FIG. 54 (a), the customer server 401 determines whether the permission flags for the respective condition contents A and B have been associated with the same user ID 313.

If access to all of the condition contents is determined to have been permitted ("Yes" at Step S821), the customer server 401 shifts the processing to Step S822. At Step S822, the customer server 401 permits access from the search terminal 30 to the cross content URL. The search terminal 30 accesses the cross content URL to acquire the cross content and, for example, displays the acquired cross content.

After access to the cross content URL is permitted at Step S822, the sequence of processing steps according to the flowchart of FIG. 56 ends.

At Step S821, if, instead, access to at least one of all of the condition contents is determined not to have been permitted ("No" at Step S821), the customer server 401 shifts the processing to Step S823. At Step S823, based on the permission flag or flags acquired at Step S820, the customer server 401 generates a message regarding the condition content or contents yet to be acquired.

At the next step S824, the customer server 401 transmits the message generated at Step S823 to the search terminal 30. The search terminal 30 displays thereon the message display screen 804 that contains the message transmitted from the customer server 401.

The fourth usage pattern enabled by the fourth contract pattern thus enables the customer server 401 to permit access to the cross content based on permission to access from the search terminal 30 to the two or more condition contents. This usage pattern therefore can be adapted, for example, for events like a stamp rally and for an event such that users who have accessed any condition content every day during the period of the event are permitted to access a cross content as a privilege.

Summarization of First to Fourth Usage Patterns Enabled by Fourth Contract Pattern According to Embodiments The following summarizes the information processing system according to the embodiments and suited for each of the first to fourth usage patterns enabled by the fourth contract pattern. Such an information processing system includes an image search system configured to: search, for an image to be found, databases in accordance with a search request and based on similarity thereof to a search key image, the databases having the image to be found and linkage information registered therein in association with each other; and transmit the linkage information associated with the image to be found to a transmitter of the search request when the image to be found is found. The information processing system has functional units that execute the following processing.

That is, the information processing system includes:

a functional unit configured to execute processing for performing a search in accordance with a search request and transmitting linkage information to a transmitter of the search request, the linkage information including acquisition information indicating how to acquire a content;

a functional unit configured to execute processing for transmitting an acquisition request and status information, the acquisition request requesting acquisition of the content as indicated by the acquisition information included in the linkage information, the status information indicating a status corresponding to the acquisition request; and a functional unit configured to execute processing for determining, based on the status information, whether to permit acquisition of the content as requested by the acquisition request.

In some cases, in an image search system that searches a database having images of certain photographs or printed materials each registered in association with various pieces of linkage information for similar images using captured images of these photographs or printed materials and presents the pieces of linkage information that are associated with the similar images, these pieces of linkage information that are obtained by the image search need to be presented to limited users who satisfy a particular condition. Examples of such a case include a case where, for a certain period, linkage information acquired in an image search based on an image that can be acquired within a venue for some event is presented to users limited to those who have participated in the event.

In an image search system to which none of the first to fourth usage patterns enabled by the fourth contract pattern is applied, linkage information based on some image is available to any user who has acquired the same image no matter who the user is, which means that, when the image is communicated or distributed among users, it is difficult to present the linkage information exclusively to the participants. For example, in the image search system to which none of the first to fourth usage patterns enabled by the fourth contract pattern is applied, a user other than the event participants can acquire the linkage information by using the image acquired outside the event venue after the event has ended.

In each of the first to fourth usage patterns enabled by the fourth contract pattern, as described above, it is possible to present linkage information obtained as a result of an image search to limited users because: a search is performed in accordance with a search request; linkage information including acquisition information indicating how to acquire a content is transmitted to a transmitter of the search request; an acquisition request and status information are transmitted, the acquisition request requesting acquisition of the content as indicated by the acquisition information included in the linkage information, the status information indicating a status corresponding to the acquisition request; and, based on the status information, whether to permit acquisition of the content as requested by the acquisition request is determined.

According to the embodiments of the present invention, it is possible to provide a mechanism that enables efficient operation of the image search system.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. An information processing system, comprising:
an image search system including processing circuitry configured to search for a particular image in a plurality of databases, in accordance with a search request and based on similarity thereof to a search key image, the plurality of databases having a plurality of images, each registered in association with linkage information, and transmit the linkage information associated with the particular image to a transmitter of the search request, when the particular image is found; and
a customer-side system operated by a customer of the image search system,
wherein the processing circuitry of the image search system is further configured to
distribute a particular search module of a plurality of search modules, and particular module identification information of a plurality of pieces of module identification information to the customer-side system while associating the particular search module and the particular module identification information with each other, the particular search module being configured to cause a terminal device to transmit the search request, the particular module identification information identifying the particular search module; and
as a result of causing the particular search module to run on the terminal device, execute the searching of a particular database of the plurality of databases, the particular database being determined by the particular module identification information included in the search request transmitted from the terminal device,
the processing circuitry is further configured to distribute, to the customer-side system, those search modules associated with the plurality of pieces of module identification information,
the plurality of databases include
first databases to be searched when searches corresponding to the plurality of pieces of module identification information are performed, and
second databases to be searched when a search commonly possible for any of the plurality of pieces of module identification information is performed, and
based on the particular module identification information and type information indicating a search pattern, which are included in the search request, the processing circuitry is further configured to select whether to use one of the first databases or one of the second databases as the particular database to be searched.

2. The information processing system according to claim 1, wherein, when none of the plurality of pieces of module identification information is included in the search request, the processing circuitry is further configured to select one of the second databases as the particular database to be searched.

3. The information processing system according to claim 1, wherein the customer-side system comprises customer-side circuitry configured to distribute, to the terminal device, a first application program generated in a manner such that the first application program includes the particular search module and the particular module identification information that are distributed by the customer-side circuitry.

4. The information processing system according to claim 3, wherein the customer-side circuitry is further configured to distribute, to the terminal device, the first application program, which is generated so as to be independently executable.

5. The information processing system according to claim 3, wherein the customer-side circuitry is further configured to distribute, to the terminal device, the first application program, which is generated so as to be executed after being incorporated into a second application program.

6. The information processing system according to claim 1, wherein the processing circuitry is further configured to generate a medium to be used for presenting an image including the particular image.

7. The information processing system according to claim 1, wherein the processing circuitry is further configured to register the particular image and the linkage information in the plurality of databases.

8. The information processing system of claim 1, wherein the processing circuitry is further configured to transmit, over a network, the particular search module, which is an image search application executable on the terminal device.

9. An information processing method for an information processing system including an image search system and a customer-side system, the image search system being configured to search for a particular image in a plurality of databases, in accordance with a search request and based on similarity thereof to a search key image, the plurality of databases having a plurality of images, each registered in association with linkage information, and transmit the linkage information associated with the particular image to a transmitter of the search request, when the particular image is found, the customer-side system being operated by a customer of the image search system, the information processing method comprising:
  distributing a particular search module of a plurality of module identification information and particular module identification information of a plurality of module identification information to the customer-side system while associating the particular search module and the particular module identification information with each other, the particular search module being configured to cause a terminal device to transmit the search request, the particular module identification information identifying the particular search module; and
  as a result of causing the particular search module to run on the terminal device, executing the searching of a particular database of the plurality of databases, the particular database being determined by the particular module identification information included in the search request transmitted from the terminal device, wherein
  the step of distributing the particular search module includes distributing, to the customer-side system, those search modules associated with the plurality of pieces of module identification information,
  the plurality of databases include
    first databases to be searched when searches corresponding to the plurality of pieces of module identification information are performed, and
    second databases to be searched when a search commonly possible for any of the plurality of pieces of module identification information is performed, and
  the executing step includes selecting, based on the particular module identification information and type information indicating a search pattern included in the search request, one of the first databases or one of the second databases as the particular database to be searched.

10. The information processing method according to claim 2, wherein the executing step includes, when none of the plurality of pieces of module identification information is included in the search request, selecting one of the second databases as the particular database to be searched.

11. The information processing method according to claim 9, further comprising:
  distributing, by the customer-side system to the terminal device, a first application program generated in a manner such that the first application program includes the particular search module and the particular module identification information that are distributed in the step of distributing the particular search module.

12. The information processing method according to claim 11, wherein the step of distributing the first application program includes distributing, to the terminal device, the first application program, which is generated so as to be independently executable.

13. The information processing method according to claim 11, wherein the step of distributing the first application program includes distributing, to the terminal device, the first application program, which is generated so as to be executed after being incorporated into a second application program.

14. The information processing method according to claim 9, further comprising:
  generating by the image search system, a medium to be used for presenting an image including the particular image.

15. The information processing method according to claim 9, further comprising:
  registering the particular image and the linkage information in the plurality of databases.

* * * * *